(12) United States Patent
Getman

(10) Patent No.: US 11,948,703 B2
(45) Date of Patent: Apr. 2, 2024

(54) METHODS AND DEVICES FOR ELECTRICALLY INSULATING A POWER LINE

(71) Applicant: Anya L. Getman, Sandy, OR (US)

(72) Inventor: Anya L. Getman, Sandy, OR (US)

( * ) Notice: Subject to any disclaimer, the term of this patent is extended or adjusted under 35 U.S.C. 154(b) by 162 days.

(21) Appl. No.: 17/585,266

(22) Filed: Jan. 26, 2022

(65) Prior Publication Data
US 2022/0392672 A1  Dec. 8, 2022

Related U.S. Application Data

(63) Continuation of application No. PCT/US2021/021588, filed on Mar. 9, 2021, which is a continuation-in-part of application No. 16/994,618, filed on Aug. 16, 2020, now abandoned, which is a continuation-in-part of application No. 16/837,071, filed on Apr. 1, 2020, now Pat. No. 11,818,956, and a continuation-in-part of application No. 16/836,704, filed on Mar. 31, 2020.

(Continued)

(51) Int. Cl.
| | | |
|---|---|---|
| *B64D 47/00* | (2006.01) | |
| *B64C 39/02* | (2023.01) | |
| *B64D 1/02* | (2006.01) | |
| *H01B 13/16* | (2006.01) | |
| *B64F 1/222* | (2024.01) | |
| *B64U 80/86* | (2023.01) | |

(52) U.S. Cl.
CPC ......... *H01B 13/165* (2013.01); *B64C 39/024* (2013.01); *B64D 1/02* (2013.01); *B64D 47/00* (2013.01); *B64F 1/222* (2013.01); *B64U 80/86* (2023.01)

(58) Field of Classification Search
CPC ...... H01B 13/165; B64C 39/024; B64D 1/02; B64D 47/00; B64U 10/13; B64U 50/19; B64U 50/34; B64U 80/25
See application file for complete search history.

(56) References Cited

U.S. PATENT DOCUMENTS

| | | | |
|---|---|---|---|
| 5,761,626 | A | 6/1998 | Tascillo et al. |
| 6,014,447 | A | 1/2000 | Kohnen et al. |

(Continued)

FOREIGN PATENT DOCUMENTS

| | | | |
|---|---|---|---|
| CN | 205176666 U | | 4/2016 |
| JP | 2018531177 A6 | | 12/2018 |

(Continued)

OTHER PUBLICATIONS

NPL71: "Robot Trajectory Control Employing a Novel Neural Architecture," Getman, Anna L., Engineering Master's Thesis: Rensselaer Polytechnic Institute, Troy, NY, Dec. 1992.

(Continued)

*Primary Examiner* — Justin M Benedik
(74) *Attorney, Agent, or Firm* — Enterprise Patent LLC

(57) ABSTRACT

An insulation application assembly for applying insulation to a power line employs an open-ended enclosure to partly surround a segment of the power line. The assembly employs an insulation material conveying mechanism to move insulation material from insulation storage to the insulation material applicator connected to the interior surface of the open-ended enclosure.

42 Claims, 16 Drawing Sheets

Related U.S. Application Data

(60) Provisional application No. 63/133,069, filed on Dec. 31, 2020, provisional application No. 62/988,914, filed on Mar. 13, 2020, provisional application No. 62/887,893, filed on Aug. 16, 2019, provisional application No. 62/827,195, filed on Apr. 1, 2019, provisional application No. 62/827,193, filed on Apr. 1, 2019, provisional application No. 62/827,215, filed on Apr. 1, 2019.

(56) References Cited

U.S. PATENT DOCUMENTS

| | | | |
|---|---|---|---|
| 6,020,560 A * | 2/2000 | Kamel | H02G 7/00 174/138 R |
| 6,236,908 B1 | 5/2001 | Cheng et al. | |
| 6,272,426 B1 | 8/2001 | Tascillo | |
| 6,314,342 B1 | 11/2001 | Kramer et al. | |
| 6,322,578 B1 | 11/2001 | Houle et al. | |
| 6,392,332 B1 | 5/2002 | Sung | |
| 6,480,102 B1 | 11/2002 | Miller et al. | |
| 6,658,355 B2 | 12/2003 | Miller et al. | |
| 6,807,448 B1 | 10/2004 | Suzuki et al. | |
| 6,811,515 B2 | 11/2004 | Ibamoto et al. | |
| 7,054,727 B2 | 5/2006 | Kemp et al. | |
| 7,058,488 B2 | 6/2006 | Kemp et al. | |
| 7,161,472 B2 | 1/2007 | Strumolo et al. | |
| 8,165,770 B2 | 4/2012 | Getman et al. | |
| 8,387,921 B2 | 3/2013 | Taylor et al. | |
| 8,862,288 B2 | 10/2014 | Vavrina et al. | |
| 8,888,035 B2 | 11/2014 | Lind et al. | |
| 9,026,310 B2 * | 5/2015 | Tran | B60G 17/01908 367/908 |
| 9,371,133 B2 * | 6/2016 | Mays | G05D 1/0094 |
| 9,387,930 B2 * | 7/2016 | Dornwald | B64D 1/06 |
| 9,421,869 B1 * | 8/2016 | Ananthanarayanan | B60L 53/38 |
| 9,540,103 B2 * | 1/2017 | Long | B64C 39/024 |
| 9,555,716 B2 * | 1/2017 | Martin | B60L 53/126 |
| 10,023,057 B2 | 7/2018 | Rodriguez | |
| 2004/0068416 A1 * | 4/2004 | Solomon | G05D 1/0295 446/454 |
| 2004/0085196 A1 | 5/2004 | Miller et al. | |
| 2007/0233361 A1 | 10/2007 | Shaffer et al. | |
| 2007/0252035 A1 * | 11/2007 | Hubbard | G05D 1/105 244/75.1 |
| 2009/0014596 A1 * | 1/2009 | Pearson | B64C 39/024 244/46 |
| 2009/0093928 A1 | 4/2009 | Getman et al. | |
| 2009/0234517 A1 | 9/2009 | Feuillebois et al. | |
| 2010/0264251 A1 * | 10/2010 | Facciano | F42B 10/00 310/317 |
| 2012/0168224 A1 * | 7/2012 | Seifert | H01B 9/065 174/161 R |
| 2013/0075484 A1 | 3/2013 | Rhee et al. | |
| 2014/0076604 A1 | 3/2014 | Frye | |
| 2016/0083084 A1 * | 3/2016 | Wang | B64C 27/54 244/17.23 |
| 2016/0214714 A1 * | 7/2016 | Sekelsky | B60L 53/32 |
| 2016/0364989 A1 | 12/2016 | Speasl et al. | |
| 2018/0027772 A1 | 2/2018 | Gordon et al. | |
| 2018/0072414 A1 | 3/2018 | Cantrell et al. | |
| 2018/0075760 A1 | 3/2018 | Thompson et al. | |
| 2018/0089622 A1 | 3/2018 | Burch et al. | |
| 2018/0142951 A1 | 5/2018 | Momem et al. | |
| 2018/0364740 A1 | 12/2018 | Collins et al. | |
| 2019/0100108 A1 | 4/2019 | Davis et al. | |
| 2019/0135425 A1 | 5/2019 | Moore et al. | |
| 2019/0178659 A1 | 6/2019 | DeLuca et al. | |
| 2019/0340569 A1 | 11/2019 | Prager | |
| 2020/0301427 A1 | 9/2020 | Restifo et al. | |
| 2020/0305739 A1 | 10/2020 | Getman | |
| 2020/0313066 A1 | 10/2020 | Getman | |

FOREIGN PATENT DOCUMENTS

| | | |
|---|---|---|
| KR | 101724581 | 4/2017 |
| KR | 20170104186 A | 9/2017 |
| WO | 2018013193 A2 | 1/2018 |

OTHER PUBLICATIONS

"A new drone can change its shape to fly through a narrow gap" NCCR Robotics (Dec. 19, 2018) retrieved Sep. 21, 2021.

"A tether-less legged piezoelectric miniature robot for bidirectional motion" Hariri (Dec. 28, 2016) retrieved Sep. 21, 2021 from https://www.youtube.com/watch?v=i4hORCb2sfs, pp. 3.

"An Automated Network for Detecting Diesel Engine Misfire" Getman et al. (Aug. 12, 2007) retrieved Sep. 21, 2021 from https://ieeexplore.ieee.org/stamp/stamp.jsp?tp=&arnumber=4371441, pp. 5.

"An SPN-Neural Planning Methodology for Coordination of two Robotic Hands with Constrained Placement" Bourbakis et al., Journal of Intelligent and Robotic Systems, Bourbakis, 19(3):321-337, (Jan. 25, 1997), retrieved Sep. 21, 2021 from https://link.springer.com/article/10.1023/A:1007985805475, pp. 6.

"Charging from the power lines" Kreosan, (Oct. 31, 2016) retrieved Sep. 18, 2021 from https://www.youtube.com/watch?v=ZyfXvFicp8M, pp. 4.

"Chicken Powered Steadicam" SmarterEveryDay (Dec. 8, 2010) retrieved Sep. 21, 2021 from https://www.youtube.com/watch?v=UytSNIHw8J8, pp. 3.

"Dead Battery" The Conversation, Ketchell, (Jun. 11, 2014) retrieved Sep. 20, 2021 from http://theconversation.com/dead-battery-charge-it-with-your-clothes-26097, pp. 3.

Detection of Mobile Machine Damage Using Accelerometer Data and Prognostic Health Monitoring Techniques, Getman et al., (Mar. 30, 2009), Paper #15026 in Computational Intelligence in Vehicles and Vehicular Systems, IEEE Workshop on CIVVS/SSCI '09, retrieved Sep. 21, 2021 from https://ieeexplore.IEEE.org/document/4938730, pp. 2.

"DGPS/INS integration using neural network methodology" Ibrahim et al.,retrieved Sep. 20, 2021 from "DGPS/INS Integration using neural network methodology," Ibrahim, et al., ICTAI 2000: 114-121 [-] 1990-1999, pp. 8.

"DroneMobile" retrieved Sep. 18, 2021 from https://www.dronemobile.com, pp. 4.

"Energy Harvesting 'Piezo-tree' Concept" AENews (Jan. 2006) retrieved Sep. 18, 2021 from https://www.alternative-energy-news.info/energy-harvesting-piezo-tree-concept/, pp. 9.

"Expert System" (Aug. 6, 2021) retrieved Sep. 20, 2021 from https://en.wikipedia.org/wiki/Expert_system, pp. 12.

"Generating Ultrasound with Piezo Components" Piezo Technology, retrieved Sep. 21, 2021 from https://www.piceramic.com/en/piezo-technology/generating-ultrasound-with-piezo-components/, pp. 7.

"Giant Superelastic Piezoelectricity in Flexible Ferroelectric BaTiO3 Membranes" Elangovan et al. (Apr. 9, 2020) retrieved Sep. 21, 2021 from https://arxiv.org/ftp/arxiv/papers/2002/2002.08166.pdf, pp. 24.

"High-Speed Deformable Mirror for Laser Beam Focus Control in Cutting & Welding Applications" Physik Instrumente, retrieved Sep. 21, 2021 from https://www.pi-usa.us/en/tech-blog/laser-beam-focus-control-in-cutting-welding-applications-with-high-speed-deformable-mirror/, pp. 7.

"How does the Piezoelectric Effect Work for Motion" Physik Instrumente USA—Precision Motion Control (Sep. 8, 2011) retrieved Sep. 21, 2021 from https://www.youtube.com/watch?v=fHp95e-CwWQ, pp. 3.

"How to charge a phone from the rail tracks" Kreosan (Jul. 17, 2015) retrieved Sep. 18, 2021 from https://www.youtube.com/watch?v=oeYVjOdkUEc, pp. 3.

"Inference Engine" (Jul. 29, 2021) retrieved Sep. 20, 2021 from https://en.wikipedia.org/wiki/Inference_engine, pp. 3.

"Lego Mindstorms NXT Robot controlled by Android Bluetooth" (Jun. 6, 2010) retrieved Sep. 18, 2021 from https://www.bing.com/

(56) References Cited

OTHER PUBLICATIONS videos/search?q=cell+phone+navigate+lego+robot+ap&view=detail&mid=7E15053A83A4839063FE7E15053A83A4839063FE&FORM=VIRE, pp. 3.

"NASA Is Working on Origami Solar Arrays That Unfurl in Space" Gizmodo, Zhang, (Aug. 15, 2014) retrieved Sep. 21, 2021 from https://gizmodo.com/nasa-is-working-on-origami-solar-arrays-that-unfurl-in-1622328583, pp. 5.

"New Autonomous Flying Drones Don't Require GPS to Navigate" Gadgets 360, Press Trust of India, (May 27, 2015) retrieved Sep. 18, 2021 from https://gadgets.ndtv.com/others/news/new-autonomous-flying-drones-dont-require-gps-to-navigate-696750, pp. 14.

"Packaging and Deployment of Large Planar Spacecraft Structures" Arya, California Institute of Technology,(May 2, 2016) retrieved Sep. 21, 2021 from https://pdfs.semanticscholar.org/d703/9c7a2b6eb8fff98cd19085fc210cd5e5a603.pdf, pp. 131.

"Piezo Actuated mouse intracytoplasmic sperm" Yoshida et al, Nature Publishing Group, (Mar. 1, 2007) retrieved Sep. 20, 2021 from https://www.ncbi.nlm.nih.gov/pubmed/17406589, pp. 1-9.

"Piezo Buzzers" APC International, Ltd., retrieved Sep. 21, 2021 from https://www.americanpiezo.com/standard-products/buzzers.html, pp. 4.

"Piezoelectric driver finds buzzer's resonant frequency" EDN, Ozbek, (Aug. 7, 2008) retrieved Sep. 21, 2021 from https://www.edn.com/piezoelectric-driver-finds-buzzers-resonant-frequency/, pp. 6.

"Piezoelectric Materials in RF Applications" Benech et al. (Nov. 13, 2015) retrieved Sep. 21, 2021 from https://www.Intechopen.com/books/piezoelectric-materials/piezoelectric-materials-in-rf-applications, pp. 34.

"Polymer Nanocomposites" Materials Research Institute, retrieved Sep. 21, 2021 from https://www.mri.psu.edu/mri/research-capabilities/traditional-research/polymeric-systems/polymer-nanocomposites, pp. 2.

Resonance mode and sound pressure produced by circular diaphragms of electrostatic and piezoelectric speakers Chiang et al., Applied Acoustics (Jan. 1, 2018) retrieved Sep. 21, 2021 from https://www.sciencedirect.com/science/article/abs/pii/S0003682X17302712, pp. 2.

"Resonance-Driven Passive FoldingUnfolding Flapping Wing Actuator" Applied Sciences MDPI, Ozaki et al. May 29, 2020) retrieved Sep. 21, 2021 from https://www.mdpi.com/2076-3417/10/11/3771/htm, page.

Robotic Piece picking gets more flexible with AI-enabled adaptive tooling retrieved Sep. 21, 2021 from https://www.therobotreport.com/robotic-piece-picking-more-flexible-ai-enabled-adaptive-tooling/,pp. 15.

"The Stabilization Power of Chicken Heads Featured in New Commercials" (Oct. 4, 2013) retrieved Sep. 21, 2021 from https://www.youtube.com/watch?v=LEGZ7hGaMNI, pp. 3.

The usefulness of a piezo-micromanipulator in intracytoplasmic sperm injection in humans Yanagida et al., Human Reproduction vol. 14 No. 2 pp. 448-453, 1998 (Feb. 1, 1999) retrieved Sep. 21, 2021 from https://www.ncbi.nlm.nih.gov/pubmed/10099992, pp. 6.

"This wind turbine generates power without blades" Wener-Fligner, Quartz, (May 19, 2015) retrieved Sep. 18, 2021 from https://qz.com/406984/this-wind-turbine-generates-power-without-blades/, pp. 2.

"University Scientists Unveil Device That Uses Proteins to Generate Electricity 'Out of Thin Air'" Good News Network (Feb. 18, 2020) retrieved Sep. 18, 2021 from https://www.goodnewsnetwork.org/device-uses-protein-to-generate-electricity-from-thin-air/, pp. 5.

"Velodyne Powers New NavVis VLX Mapping System" (May 12, 2020) retrieved Sep. 18, 2021 from https://velodynelidar.com/press-release/velodyne-lidar-puck-lite-navvis-vlx-mapping-system/, pp. 15.

"PowerFilm" retrieved Nov. 17, 2020 from https://www.powerfilmsolar.com , pp. 2.

"NeurReg: Neural Registration and Its Application to Image Segmentation" Zhu et al. Cornell University arXiv:1910.01763v1 [cs.CV] (Oct. 4, 2019) 10 pages.

NPL-38: "These clothes can wirelessly charge your phone", Parija, (Jun. 28, 2016), retrieved Sep. 30, 2021 from https://money.cnn.com/2016/06/28/technology/baubax-wireless-charging-clothing-kickstarter/, pp. 5.

NPL-39: "Wireless Charging Apparel", (Aug. 10, 2016), retrieved Sep. 30, 2021 from https://www.kickstarter.com/projects/baubax/worlds-smartest-wireless-charging-apparel-baubax?token=4b43c783, pp. 2.

NPL-40: "This travel jacket does 15 things at once", Parija, (Aug. 27, 2015), retrieved Sep. 30, 2021 from https://money.cnn.com/2015/07/07/smallbusiness/baubax-travel-jacket-15-features/?id=EL, pp. 6.

L-41: "Phone-charging boots", Leslle, (Jun. 18, 2010), retrieved Sep. 30, 2021 from https://www.cnet.com/news/phone-charging-boots-walk-a-lot-to-talk/, pp. 3.

NPL-42: "The World's First Phone-Charging Pants Are Here", Daniel, (2014), retrieved Sep. 30, 2021 from https://www.businessinsider.com/fashion-designer-adrien-sauvage-and-microsoft-create-first-wireless-phone-charging-pants-2014-6, pp. 8.

NPL-43: "Belmint Back Stretching Electric Mat", retrieved Sep. 30, 2021 from https://www.amazon.com/dp/B07NK7Z46Z, pp. 11.

NPL-44: "Ultrasound Cavitation Machines", retrieved Sep. 30, 2021 from https://www.bestreviews.guide/cavitation-machines, pp. 4.

NPL-45: "Artificial synesthesia via sonification: A wearable augmented sensory system", Foner, (Mar. 1999), retrieved Sep. 30, 2021 from https://link.springer.com/article/10.1023/A:1019178210975, pp. 4.

NPL-46: "Fundamentals of Wearable Computers and Augmented Reality", retrieved Sep. 30, 2021 from https://www.amazon.com/s?k=9781482243512, pp. 2.

NPL-47: "The wearable robot that helps people walk again", Arjun, retrieved Sep. 30, 2021 from https://www.cnbc.com/2015/04/29/the-bionic-suit-that-helps-paralyzed-people-walk-again.html, pp. 4.

NPL-48: "Piezoelectric Actuators", Carter et al., retrieved Sep. 30, 2021 from https://piezo.com/pages/piezoelectric-actuators, pp. 27.

NPL-49: "PHT Magnetics", retrieved Sep. 30, 2021 from http://phtmagnetics.com/, p. 1.

NPL-50: "Veredus Magnetik Rug", retrieved Sep. 30, 2021 from https://www.smartpakequine.com/pt/veredus-magnetik-rug-10755, p. 1.

NPL-51: "Faraday Blanket With Pocket EMF Protective 40GHz Tested", retrieved Sep. 30, 2021 from https://www.smart-safe.com/products/electromagnetic-radiation-protective-blanket, pp. 5.

NPL-52: "Blackhawk Under the Radar Cell Phone Pouch Black", retrieved Sep. 30, 2021 from https://www.walmart.com/ip/Blackhawk-Under-the-Radar-Cell-Phone-Pouch-Black/39989685, p. 1.

NPL-53: "GoDark Faraday Bags", retrieved Sep. 30, 2021 from https://godarkbags.com/products/godark-faraday-bags-stop-hacking-and-location-tracking-of-your-cell-phone-and-tablet, pp. 11.

NPL-54: "Compex Edge 3.0 Muscle Stimulator With Tens Kit", retrieved Sep. 30, 2021 from https://www.compex.com/compex-edge-2-0-muscle-stimulator-kit-with-tens, pp. 6.

NPL-55: "EMG ECG Foam Solid Gel Electrodes", retrieved Sep. 30, 2021 from https://shop.openbci.com/products/skintact-f301-pediatric-foam-solid-gel-electrodes-30-pack?variant=29467659395, p. 1.

NPL-56: "Octopus Suction Cups", Greg, retrieved Sep. 30, 2021 from https://pixels.com/featured/octopus-suction-cups-greg-ochocki.html, pp. 3.

NPL-57: "TENS Unit Pad Placement", retrieved Sep. 30, 2021 from https://omronhealthcare.com/2014/01/10-tips-for-tens-pad-placement/, pp. 2.

NPL-58: "Pain Management", retrieved Sep. 30, 2021 from https://omronhealthcare.com/tens-units/, pp. 5.

NPL-59: "Pad Placement Guide", retrieved Sep. 30, 2021 from https://ib0k33wyb0z22kedo19bkqd1-wpengine.netdna-ssl.com/wp-content/uploads/PM3030-PAD-GUIDE-08062012.pdf, p. 1.

NPL-60: "Patient Aid Full Body Mesh Patient Lift Sling", retrieved Sep. 30, 2021 from https://www.amazon.com/Patient-Sling-Weight-Capacity-Medium/dp/B0757DZRJB, pp. 7.

(56) References Cited

OTHER PUBLICATIONS

NPL-61: "Cabaret Stretch Mesh Fabric", retrieved Sep. 30, 2021 from https://www.fabricwholesaledirect.com/products/cabaret-stretch-mesh-fabric?variant=15499387462, pp. 5.
NPL-62: "Ottertex Solution Dyed Acrylic Waterproof Fabric", retrieved Sep. 30, 2021 from https://www.fabricwholesaledirect.com/products/ottertex-solution-dyed-acrylic-waterproof-fabric, pp. 9.
NPL-63: "MIT Engineers Create a Programmable Digital Fiber" https://scitechdaily.com/mit-engineers-create-a-programmable-digital-fiber-with-memory-sensors-and-ai/, pp. 5.
NPL64: (Abstract Only) Detection of Mobile Machine Damage Using Accelerometer Data and Prognostic Health Monitoring Techniques, Getman et al., (2009), Paper #15026 in Computational Intelligence in Vehicles and Vehicular Systems, IEEE Workshop on CIVVS/SSCI '09, retrieved Sep. 21, 2021 from https://ieeexplore.ieee.org/document/4938730, pp. 2.
NPL65: "DigiKey", retrieved Sep. 30, 2021 from https://www.digikey.com/product-detail/en/te-connectivity-measurement-specialties/1004308-2/223-1872-ND/279650, pp. 4.
NPL66: "Piezo Cables", retrieved Sep. 30, 2021 from https://www.te.com/USA-en/product-CAT-PFS0001.html, pp. 3.
NPL67: (Abstract Only) "Resonance mode and sound pressure produced by circular diaphragms of electrostatic and piezoelectric speakers" retrieved Sep. 21, 2021 from https://www.sciencedirect.com/science/article/abs/pii/S0003682X17302712, pp. 2.
NPL68: "An SPN-Neural Planning Methodology for Coordination of two Robotic Hands with Constrained Placement" Bourbakis et al., Journal of Intelligent and Robotic Systems 19(3):321-337, (1997), retrieved Sep. 21, 2021 from https://link.springer.com/article/10.1023/A:1007985805475, pp. 6.
NPL69: English-Translation-of-KR101724581 (Apr. 7, 2017) from Google Patents. Downloaded Sep. 6, 2021.
INPL70: International Search Report for PCT/US2021/21588.
NPL-57: "TENS Unit Pad Placement", retrieved Sep. 30, 2021 from https://omronhealthcare.com/2014/01/10-tips-for-lens-pad-placement/, pp. 2.
NPL72: Falanga et al. "The Foldable Drone A Morphing Qadcopter That Can Squeeze and Fly" (Year: 2018).

\* cited by examiner

METHODS AND DEVICES FOR ELECTRICALLY INSULATING A POWER LINE

CROSS REFERENCE TO RELATED APPLICATION

This application is a continuation of International Application No. PCT/US2021/021588, which was filed on Mar. 9, 2021, the contents of which are herein incorporated by reference in their entirety for all purposes. International Application No. PCT/US2021/021588 claims priority from and is a non-provisional application of U.S. Provisional Application No. 63/133,069, which was filed on Dec. 31, 2020, the contents of which are herein incorporated by reference in their entirety for all purposes. International Application No. PCT/US2021/021588 claims priority from and is a continuation-in-part application of U.S. Patent Application No. 16/994,618, which was filed on Aug. 16, 2020, the contents of which are herein incorporated by reference in their entirety for all purposes, and which claims priority from U.S. Provisional Application No. 62/988,914, which was filed on March 13, 2020, the contents of which are herein incorporated by reference in their entirety for all purposes. Moreover, International Application No. PCT/US2021/021588 also claims priority directly from U.S. Provisional Application No. 62/988,914, which was filed on Mar. 13, 2020.

This application is also a direct continuation-in-part application of U.S. patent application Ser. No. 16/994,618, which was filed on Aug. 16, 2020, the contents of which are herein incorporated by reference in their entirety for all purposes, and which claims priority from U.S. Provisional Application No. 62/988,914, which was filed on Mar. 13, 2020, the contents of which are herein incorporated by reference in their entirety for all purposes.

U.S. patent application Ser. No. 16/994,618 is also a non-provisional application of U.S. Provisional Application No. 62/887,893, which was filed on Aug. 16, 2019, the contents of which are herein incorporated by reference in their entirety for all purposes. U.S. patent application Ser. No. 16/994,618 is also a non-provisional application of U.S. Provisional Application No. 62/988,914, which was filed on Mar. 13, 2020, the contents of which are herein incorporated by reference in their entirety for all purposes. U.S. patent application Ser. No. 16/994,618 application is also a continuation-in-part application of U.S. patent application Ser. No. 16/837,071, which was filed on Apr. 1, 2020, the contents of which are herein incorporated by reference in their entirety for all purposes. U.S. patent application Ser. No. 16/837,071 is a non-provisional of U.S. Provisional Application No. 62/827,215, which was filed on Apr. 1, 2019, the contents of which are herein incorporated by reference in their entirety for all purposes. U.S. patent application Ser. No. 16/994,618 is also a continuation-in-part application of U.S. patent application Ser. No. 16/836,704, which was filed on Mar. 31, 2020, the contents of which are herein incorporated by reference in their entirety for all purposes. U.S. patent application Ser. No. 16/836,704 is a non-provisional of U.S. Provisional Application No. 62/827,193 and U.S. Provisional Application No. 62/827,195, which were filed on Apr. 1, 2019, the contents of which are herein incorporated by reference in their entirety for all purposes.

TECHNICAL FIELD

The field of this disclosure relates generally to power lines and, in particular, to methods and devices for insulating power lines.

BACKGROUND INFORMATION

Ninety percent of America's overhead power lines have no electrical insulation. The power lines are primarily aluminum and steel with perhaps a thin, non-insulating, weather coating. Birds, fruit eating bats, and small arboreal mammals are relatively safe as long as the electricity has no path from them to the ground. However, these animals are very frequently electrocuted when they touch two adjacent electric power lines or are sitting on top of a transformer and touch one power line. These unfortunate animals end up conducting more amps than their bodies can tolerate, and some literally catch on fire. 220-volt lines near fruit trees are the most common cause of these deaths. Endangered bat species babies are orphaned most by their mothers being electrocuted, even more often than collisions. The babies can also suffer burns to their lips or limbs, depending on the electrocution path across their mothers.

A number of unsettling videos of animals being electrocuted via power line have been available on the internet. In one video, a monkey is electrocuted when straddling two power lines that are running side by side. See (or don't see) https://www.youtube.com/watch?v=FsVMloLCRCU. In another video, three parrots are electrocuted when straddling two power lines that are running side by side. See (or don't see) https://www.youtube.com/watch?v=TIfg7hYUWpg. In yet another video, a crane just barely survives what appears to be touching the wire that goes into the transformer, while standing on top. See (or don't see) https://www.youtube.com/watch?v=p8HUj37nEJY. Moreover, interaction with transformers is substantial enough to threaten catching nearby materials on fire. See (or don't see) squirrel vs transformer: https://www.youtube.com/watch?v=EO_pIa4dWro.

Humans can also be killed by power lines, especially by downed power lines. Even if people never touch the lines, the ground or tree branches may carry harmful current (even without a break in the power line).

OVERVIEW OF DISCLOSURE

New power lines can be manufactured with desirable insulative coatings or layers. However, replacing a power line that has already been deployed is expensive and can put human retrofitters at risk. Applying insulation to a power line that has already been deployed may be less expensive but may also be problematic and risky. Some power lines traverse difficult terrain and are not accessible by conventional aerial work platforms (cherry pickers). Moreover, remote power lines may not have nearby electrical shut offs or may feed large populations and may cause too much inconvenience or strain on the grid to be shut off.

Accordingly, one aspect of this disclosure relates to methods and devices for insulating deployed or established power lines.

An alternative or additional aspect of this disclosure relates to a device for insulating deployed or established power lines.

In one embodiment, an insulation application assembly configured for applying insulation to a power line, comprises: an open-ended enclosure configured or configurable to partly or fully enclose a segment of the power line, wherein the open-ended enclosure has an interior surface; an insulation material applicator connected directly or indirectly to the interior surface of the open-ended enclosure; insulation storage configured for storing insulation material; an insulation material conveying mechanism configured for causing the insulation material to move from the insulation storage to the insulation material applicator; a communication network or port configured for conveying sensor information directly or indirectly from one or more of the sensors, for conveying instructions directly or indirectly to the insulation material conveying mechanism or the insulation material applicator, or for both conveying sensor information directly or indirectly from one or more of the sensors and for conveying instructions directly or indirectly to the insulation material conveying mechanism or the insulation material applicator; and an energy conveyance mechanism configured for conveying energy to the insulation material conveying mechanism and/or the insulation material applicator.

In some alternative, additional, or selectively cumulative embodiments, a drone comprises: multiple sensors or actuators; a wireless communication system; an on-board charge-receiving system configured to directly or indirectly connect with an external charging station operable to provide energy; an energy storage system directly or indirectly connected or connectable to the on-board charge-receiving system, wherein the energy storage system is configured to store energy provided by the external charging system; a flight mechanism powered by the energy storage system; and an insulation application assembly configured for applying insulation to a power line, wherein insulation application assembly comprises: an open-ended enclosure configured or configurable to partly or fully enclose a segment of the power line, wherein the open-ended enclosure has an interior surface; one or more sensors connected directly or indirectly to the open-ended enclosure; an insulation material applicator connected directly or indirectly to the interior surface of the open-ended enclosure; an insulation storage that is configured for storing insulation material; an insulation material conveying mechanism configured for causing the insulation material to move from the insulation storage to the insulation material applicator; a communication network or port configured for conveying sensor information directly or indirectly from one or more of the sensors, for conveying instructions directly or indirectly to the insulation material conveying mechanism or the insulation material applicator, or for both conveying sensor information directly or indirectly from one or more of the sensors and for conveying instructions directly or indirectly to the insulation material conveying mechanism or the insulation material applicator; and an energy conveyance mechanism configured for conveying energy to the insulation material conveying mechanism and/or the insulation material applicator.

In some alternative, additional, or selectively cumulative embodiments, a method for employing an insulation application assembly to insulate a location on a cable of an established power line comprises: positioning an open-ended enclosure of the insulation application assembly about the cable at the location, wherein the open-ended enclosure has opposing oval interior cover surfaces that are spaced apart from and partly surround the cable; applying an insulation material, from one or more insulation material applicators positioned in proximity to the interior surfaces of the open-ended enclosure, to the location on the cable; and displacing the insulation application assembly away from the cable.

In some alternative, additional, or selectively cumulative embodiments, a method for insulating a location on a cable of an established power line, comprises: positioning an open-ended enclosure of an insulation application assembly about the cable at the location, wherein the open-ended enclosure has opposing interior cover surfaces that are spaced apart from and partly surround the cable; applying an insulation material, from one or more insulation material applicators positioned in proximity to the interior surfaces of the open-ended enclosure, to the location on the cable; and displacing the insulation application assembly away from the cable.

In some alternative, additional, or selectively cumulative embodiments, a method for completing an operation with a drone, the drone having multiple sensors or actuators with at least one employing a piezoelectric structure, a wireless communication system, an on-board charge-receiving system configured to directly or indirectly connect with an external charging station operable to provide energy, an energy storage system directly or indirectly connected or connectable to the on-board charge-receiving system, wherein the energy storage system is configured to store energy provided by the external charging system; a flight mechanism powered by the energy storage system, and a self-energizing system operable to collect energy when disconnected from the external charging station, wherein the self-energizing system is directly or indirectly connected or connectable to the energy storage system, the method comprises: causing the drone to perform a task that depletes the energy storage system below a level that is sufficient for the drone to fly to the external charging station; causing the drone to deploy the self-energizing system from a passive configuration to an active configuration; causing the drone to utilize the self-energizing system to obtain sufficient energy for the drone to fly to the external charging station; causing the drone to return the self-energizing system from the active configuration to the passive configuration; and causing the drone to fly to the external charging station.

In some alternative, additional, or selectively cumulative embodiments, the insulation application assembly is configured to be deployed from a pole.

In some alternative, additional, or selectively cumulative embodiments, the insulation application assembly is configured to be integrated with a pole.

In some alternative, additional, or selectively cumulative embodiments, the insulation application assembly is configured to be deployed from a drone.

In some alternative, additional, or selectively cumulative embodiments, the insulation application assembly is configured to be integrated with a drone.

In some alternative, additional, or selectively cumulative embodiments, the interior surface comprises a partly concave, partly oval, or partly elliptical interior surface.

In some alternative, additional, or selectively cumulative embodiments, the interior surface comprises a partly elliptical surface.

In some alternative, additional, or selectively cumulative embodiments, the interior surface comprises a partly circular surface.

In some alternative, additional, or selectively cumulative embodiments, the power line has a circumference, and wherein the interior surface is configured to enclose greater than or equal to 10% of the circumference.

In some alternative, additional, or selectively cumulative embodiments, the power line has a circumference, and wherein the interior surface is configured to enclose greater than or equal to 20% of the circumference.

In some alternative, additional, or selectively cumulative embodiments, the power line has a circumference, and wherein the interior surface is configured to enclose greater than or equal to 30% of the circumference.

In some alternative, additional, or selectively cumulative embodiments, the power line has a circumference, and wherein the interior surface is configured to enclose greater than or equal to 40% of the circumference.

In some alternative, additional, or selectively cumulative embodiments, the power line has a circumference, and wherein the interior surface is configured to enclose greater than or equal to 50% of the circumference.

In some alternative, additional, or selectively cumulative embodiments, the power line has a circumference, and wherein the interior surface is configured to enclose greater than or equal to 60% of the circumference.

In some alternative, additional, or selectively cumulative embodiments, the power line has a circumference, and wherein the interior surface is configured to enclose greater than or equal to 70% of the circumference.

In some alternative, additional, or selectively cumulative embodiments, the power line has a circumference, and wherein the interior surface is configured to enclose greater than or equal to 80% of the circumference.

In some alternative, additional, or selectively cumulative embodiments, the power line has a circumference, and wherein the interior surface is configured to enclose greater than or equal to 10 degrees of the circumference.

In some alternative, additional, or selectively cumulative embodiments, the power line has a circumference, and wherein the interior surface is configured to enclose greater than or equal to 40 degrees of the circumference.

In some alternative, additional, or selectively cumulative embodiments, the power line has a circumference, and wherein the interior surface is configured to enclose greater than or equal to 90 degrees of the circumference.

In some alternative, additional, or selectively cumulative embodiments, the power line has a circumference, and wherein the interior surface is configured to enclose greater than or equal to 120 degrees of the circumference.

In some alternative, additional, or selectively cumulative embodiments, the power line has a circumference, and wherein the interior surface is configured to enclose greater than or equal to 150 degrees of the circumference.

In some alternative, additional, or selectively cumulative embodiments, the power line has a circumference, and wherein the interior surface is configured to enclose greater than or equal to 180 degrees of the circumference.

In some alternative, additional, or selectively cumulative embodiments, the power line has a circumference, and wherein the interior surface is configured to enclose greater than or equal to 210 degrees of the circumference.

In some alternative, additional, or selectively cumulative embodiments, the power line has a circumference, and wherein the interior surface is configured to enclose greater than or equal to 250 degrees of the circumference.

In some alternative, additional, or selectively cumulative embodiments, the power line has a circumference, and wherein the interior surface is configured to enclose greater than or equal to 280 degrees of the circumference.

In some alternative, additional, or selectively cumulative embodiments, the power line has a circumference, and wherein the interior surface is configured to enclose greater than or equal to 310 degrees of the circumference.

In some alternative, additional, or selectively cumulative embodiments, the one or more sensors comprise one or more of a pressure sensor, an optical sensor, a camera, a lidar mechanism, a wind speed sensor, and a wind direction sensor.

In some alternative, additional, or selectively cumulative embodiments, the one or more sensors are connected directly or indirectly with the interior surface of the open-ended enclosure.

In some alternative, additional, or selectively cumulative embodiments, the insulation material comprises one or more of: polymers, polymer films, Kevlar™, conformal coatings for circuit boards, Electrical Insulating Sealer 1601-C or 1602-R made by 3M™, Black Spray Liquid Tape by Gardner Bender, and coating materials having a base formulation of acrylic, polyurethane, copolymer (acrylate polyurethane), and/or silicone.

In some alternative, additional, or selectively cumulative embodiments, the insulation material comprises a fluid.

In some alternative, additional, or selectively cumulative embodiments, the insulation material comprises a liquid.

In some alternative, additional, or selectively cumulative embodiments, the insulation material comprises an uncured material.

In some alternative, additional, or selectively cumulative embodiments, the insulation material is configured for application by rolling onto the power line.

In some alternative, additional, or selectively cumulative embodiments, the insulation material is configured for application by spraying onto the power line.

In some alternative, additional, or selectively cumulative embodiments, the insulation material is configured for rolling onto the power line.

In some alternative, additional, or selectively cumulative embodiments, the insulation material applicator comprises a spray nozzle.

In some alternative, additional, or selectively cumulative embodiments, the insulation material applicator comprises a roller.

In some alternative, additional, or selectively cumulative embodiments, the insulation material applicator comprises a drone movement controller.

In some alternative, additional, or selectively cumulative embodiments, the insulation material applicator comprises an open-ended enclosure actuator.

In some alternative, additional, or selectively cumulative embodiments, the insulation storage is configured for storing insulation material on a roll.

In some alternative, additional, or selectively cumulative embodiments, the insulation storage comprises a storage tank.

In some alternative, additional, or selectively cumulative embodiments, the insulation storage is positioned in proximity to the open-ended enclosure.

In some alternative, additional, or selectively cumulative embodiments, the insulation storage is connected directly or indirectly to the open-ended enclosure.

In some alternative, additional, or selectively cumulative embodiments, the insulation storage comprises a storage tank that is configured for storing fluid insulation material.

In some alternative, additional, or selectively cumulative embodiments, the insulation storage comprises a storage tank that is configured for storing liquid insulation material.

In some alternative, additional, or selectively cumulative embodiments, the insulation storage comprises a storage tank that is configured for storing pressurized fluid insulation material.

In some alternative, additional, or selectively cumulative embodiments, the insulation storage is configured for providing heated insulation material.

In some alternative, additional, or selectively cumulative embodiments, the insulation storage is configured for providing uncured insulation material.

In some alternative, additional, or selectively cumulative embodiments, the insulation material conveying mechanism comprises a roller.

In some alternative, additional, or selectively cumulative embodiments, the insulation material conveying mechanism comprises a pump.

In some alternative, additional, or selectively cumulative embodiments, the insulation material conveying mechanism comprises a motor.

In some alternative, additional, or selectively cumulative embodiments, the insulation material conveying mechanism comprises an actuator.

In some alternative, additional, or selectively cumulative embodiments, the insulation material conveying mechanism comprises a pneumatic pump.

In some alternative, additional, or selectively cumulative embodiments, the insulation material conveying mechanism comprises a piezoelectric device.

In some alternative, additional, or selectively cumulative embodiments, the communication network or port comprises a wire or wire connector.

In some alternative, additional, or selectively cumulative embodiments, the communication network or port comprises a wireless communication system.

In some alternative, additional, or selectively cumulative embodiments, the energy conveyance mechanism comprises a wire.

In some alternative, additional, or selectively cumulative embodiments, the energy conveyance mechanism is connected directly or indirectly to an energy storage system that is connected directly or indirectly to the insulation storage.

In some alternative, additional, or selectively cumulative embodiments, an attachment interface is configured for directly or indirectly attaching the insulation application assembly to a positioning device.

In some alternative, additional, or selectively cumulative embodiments, the positioning device is a pole.

In some alternative, additional, or selectively cumulative embodiments, the positioning device is a drone.

In some alternative, additional, or selectively cumulative embodiments, the positioning device is any version of drone described herein.

In some alternative, additional, or selectively cumulative embodiments, the attachment interface comprises an energy connector configured for connecting the energy conveyance mechanism to an energy storage system.

In some alternative, additional, or selectively cumulative embodiments, the attachment interface comprises a communication port connector configured for connecting the communication port to a software processing system.

In some alternative, additional, or selectively cumulative embodiments, the attachment interface comprises a controller connector configured for connecting the insulation material conveying mechanism or the insulation material applicator to one or more controllers.

In some alternative, additional, or selectively cumulative embodiments, a human machine interface is directly or indirectly connected to the communication port.

In some alternative, additional, or selectively cumulative embodiments, the communication network or port is connected directly or indirectly to a neural network or AI processing software.

In some alternative, additional, or selectively cumulative embodiments, the power line comprises an established power line.

In some alternative, additional, or selectively cumulative embodiments, the open-ended enclosure includes two relatively moveable halves.

In some alternative, additional, or selectively cumulative embodiments, an on-board charge-receiving system is configured to directly or indirectly connect with an external charging station operable to provide energy; and an energy storage system is directly or indirectly connected to or connectable to the on-board charge-receiving system, wherein the energy storage system is configured to store energy provided by the external charging system.

In some alternative, additional, or selectively cumulative embodiments, one or more sensors are employed to collect data concerning one or more ambient conditions before applying the insulation material.

In some alternative, additional, or selectively cumulative embodiments, the insulation material is heated before applying the insulation material.

In some alternative, additional, or selectively cumulative embodiments, the insulation material is cured before or after applying the insulation material.

In some alternative, additional, or selectively cumulative embodiments, the insulation material is mixed before applying the insulation material.

In some alternative, additional, or selectively cumulative embodiments, the drone comprises: multiple sensors; a wireless communication system; a flight mechanism; and an energy storage system.

In some additional, alternative, or selectively cumulative embodiments, the drone comprises: multiple sensors; a wireless communication system; an on-board charge-receiving system configured to directly or indirectly connect with an external charging station operable to provide energy; an energy storage system directly or indirectly connected or connectable to the on-board charge-receiving system, wherein the energy storage system is configured to store energy provided by the external charging system; and a flight mechanism powered by the energy storage system.

In some additional, alternative, or selectively cumulative embodiments, the drone comprises: multiple sensors; a wireless communication system; an on-board charge-receiving system configured to directly or indirectly connect with an external charging station operable to provide energy; an energy storage system directly or indirectly connected or connectable to the on-board charge-receiving system, wherein the energy storage system is configured to store energy provided by the external charging system; a flight mechanism powered by the energy storage system; and a self-energizing system operable to collect energy when disconnected from the external charging station, wherein the self-energizing system is directly or indirectly connected or connectable to the energy storage system.

In some additional, alternative, or selectively cumulative embodiments, a drone capable of self-energizing, comprises: multiple sensors; a wireless communication system; an on-board charge-receiving system configured to directly or indirectly connect with an external charging station operable to provide energy; an energy storage system directly or indirectly connected or connectable to the on-board charge-receiving system, wherein the energy storage system is configured to store energy provided by the external charging system; a flight mechanism powered by the energy storage system; a self-energizing system operable to collect energy when disconnected from the external charging station, wherein the self-energizing system is directly or indirectly connected or connectable to the energy storage system; a piezoelectric structure configured to cooperate with the self-energizing system; and a controller directly or indirectly in communication with the wireless communication system and the piezo electric structure.

In some additional, alternative, or selectively cumulative embodiments, a drone operable to change between two or more visually distinguishable configurations, comprises: multiple sensors; a wireless communication system; an energy storage system; a flight mechanism powered by the energy storage system; and a piezoelectric structure operable to change the appearance of the drone between a first configuration and a second configuration, wherein the second configuration is visually distinguishable from the first configuration.

In some additional, alternative, or selectively cumulative embodiments, a drone operable for self-energizing, comprises: multiple sensors; a wireless communication system; an energy storage system; a flight mechanism powered by the energy storage system; and multiple solar cells, wherein the drone is operable to deploy the solar cells into a deployed state and operable to retract the solar cells into an undeployed state.

In some additional, alternative, or selectively cumulative embodiments, a drone for mounting on a ground-based vehicle, comprises: multiple sensors; a wireless communication system; an energy storage system; a flight mechanism powered by the energy storage system; and a drone docking system operable to connect to a vehicle docking system of the ground-based vehicle.

In some additional, alternative, or selectively cumulative embodiments, a drone for mounting on a ground-based vehicle, comprises: multiple scanners; a wireless communication system; a wireless inductive battery; a flight mechanism powered by the wireless inductive battery; and a drone docking system operable to connect to a vehicle docking system of the ground-based vehicle.

In some additional, alternative, or selectively cumulative embodiments, a method for completing an operation with a drone, wherein the drone has multiple sensors, a wireless communication system, an on-board charge-receiving system configured to directly or indirectly connect with an external charging station operable to provide energy, an energy storage system directly or indirectly connected or connectable to the on-board charge-receiving system, wherein the energy storage system is configured to store energy provided by the external charging system; a flight mechanism powered by the energy storage system, and a self-energizing system operable to collect energy when disconnected from the external charging station, wherein the self-energizing system is directly or indirectly connected or connectable to the energy storage system, and wherein the method comprises: causing the drone to perform a task that depletes the energy storage system below a level that is sufficient for the drone to fly to the external charging station; causing the drone to deploy the self-energizing system from a passive configuration to an active configuration; causing the drone to utilize the self-energizing system to obtain sufficient energy for the drone to fly to the external charging station; causing the drone to return the self-energizing system from the active configuration to the passive configuration; and causing the drone to fly to the external charging station.

In some additional, alternative, or selectively cumulative embodiments, an insulation application assembly configured for applying insulation to a power line, comprises: a roll holder; an insulation material applicator; an insulation material conveying mechanism configured for causing the insulation material to move from the roll holder to the insulation material applicator; one or more sensors associated with the insulation material applicator; a communication network or port configured for conveying sensor information directly or indirectly from one or more of the sensors, for conveying instructions directly or indirectly to the insulation material conveying mechanism or the insulation material applicator, or for both conveying sensor information directly or indirectly from one or more of the sensors and for conveying instructions directly or indirectly to the insulation material conveying mechanism or the insulation material applicator; and an energy conveyance mechanism configured for conveying energy to the insulation material conveying mechanism and/or the insulation material applicator.

In some additional, alternative, or selectively cumulative embodiments, a drone comprises: multiple sensors or actuators; a wireless communication system; an on-board charge-receiving system configured to directly or indirectly connect with an external charging station operable to provide energy; an energy storage system directly or indirectly connected or connectable to the on-board charge-receiving system, wherein the energy storage system is configured to store energy provided by the external charging system; a flight mechanism powered by the energy storage system; and an insulation application assembly configured for applying insulation to a power line, wherein insulation application assembly comprises: a roll holder; an insulation material applicator; an insulation material conveying mechanism configured for causing the insulation material to move from the roll holder to the insulation material applicator; one or more sensors associated with the insulation material applicator; a communication network or port configured for conveying sensor information directly or indirectly from one or more of the sensors, for conveying instructions directly or indirectly to the insulation material conveying mechanism or the insulation material applicator, or for both conveying sensor information directly or indirectly from one or more of the sensors and for conveying instructions directly or indirectly to the insulation material conveying mechanism or the insulation material applicator; and an energy conveyance mechanism configured for conveying energy to the insulation material conveying mechanism and/or the insulation material applicator.

In some additional, alternative, or selectively cumulative embodiments, a method for completing an operation with a drone, wherein the drone has multiple sensors, a wireless communication system, an on-board charge-receiving system configured to directly or indirectly connect with an external charging station operable to provide energy, an energy storage system directly or indirectly connected or connectable to the on-board charge-receiving system, wherein the energy storage system is configured to store energy provided by the external charging system; a flight mechanism powered by the energy storage system, and a self-energizing system operable to collect energy when disconnected from the external charging station, wherein the self-energizing system is directly or indirectly connected or connectable to the energy storage system, and wherein the method comprises: depleting the energy storage system below a level that is sufficient for the drone to fly to the external charging station; deploying the self-energizing system from a passive configuration to an active configuration; utilizing the self-energizing system to obtain sufficient energy for the drone to fly to the external charging station; returning the self-energizing system from the active configuration to the passive configuration; and flying the drone to the external charging station.

In some additional, alternative, or selectively cumulative embodiments, an autonomous ground-based vehicle, comprises: wheels; a cargo compartment supported directly or indirectly by the wheels; a vehicle energy storage system for storing energy; a motor or engine directly or indirectly connected to and powered by energy from the vehicle energy storage system; a vehicle computing system; vehicle sensors configured to interact directly or indirectly with the vehicle computing system; a vehicle wireless communication system configured to interact directly or indirectly with the vehicle computing system and/or a navigation system; and a drone charging station operable to provide energy to a drone through a drone charge-receiving system on the drone, wherein the drone charge-receiving system is directly or indirectly connected or connectable to a drone energy storage system in the drone, wherein the drone energy storage system is configured to store energy provided by the drone charging system, wherein the drone has a flight mechanism powered by the energy storage system, wherein the drone has a drone wireless communication system configured to interact directly or indirectly with the vehicle computing system and/or the navigation system, wherein the drone has drone sensors comprising piezoelectric structures, and wherein the drone sensors provide information directly or indirectly to the vehicle computing system and/or the navigation system.

In some additional, alternative, or selectively cumulative embodiments, the drone comprises a piezoelectric structure.

In some additional, alternative, or selectively cumulative embodiments, the piezoelectric structure comprises a piezoelectric actuator or a piezoelectric sensor.

In some additional, alternative, or selectively cumulative embodiments, the drone comprises a piezoelectric structure operable to change the functionality of the drone between a first configuration and a second configuration, wherein the second configuration is functionally distinguishable from the first configuration.

In some additional, alternative, or selectively cumulative embodiments, the drone comprises a piezoelectric structure operable to change the appearance of the drone between a first configuration and a second configuration, wherein the second configuration is visually distinguishable from the first configuration.

In some additional, alternative, or selectively cumulative embodiments, the energy storage system comprises a battery.

In some additional, alternative, or selectively cumulative embodiments, the energy storage system comprises a wireless inductive battery or a wireless capacitive battery.

In some additional, alternative, or selectively cumulative embodiments, the drone is configured to utilize a wireless inductive charging system or a wireless capacitive charging system.

In some additional, alternative, or selectively cumulative embodiments, the drone comprises multiple solar cells.

In some additional, alternative, or selectively cumulative embodiments, the drone comprises multiple solar cells, and wherein the drone is operable to deploy the multiple solar cells into a deployed state and operable to retract the multiple solar cells into an undeployed state.

In some additional, alternative, or selectively cumulative embodiments, the multiple solar cells are formed in one or more films.

In some additional, alternative, or selectively cumulative embodiments, the multiple solar cells are formed in one or more panels.

In some additional, alternative, or selectively cumulative embodiments, the multiple solar cells are formed in one or more foldable sheets.

In some additional, alternative, or selectively cumulative embodiments, the multiple solar cells are configured to be deployed from a rolled state.

In some additional, alternative, or selectively cumulative embodiments, the external charging station is connected to, or configured to connect to, a ground-based vehicle.

In some additional, alternative, or selectively cumulative embodiments, the drone comprises an on-board docking system.

In some additional, alternative, or selectively cumulative embodiments, the on-board docking system is connected to the on-board charging system.

In some additional, alternative, or selectively cumulative embodiments, the on-board docking system is configured to directly or indirectly connect with an external docking system of a ground-based vehicle.

In some additional, alternative, or selectively cumulative embodiments, the drone docking system is operable to connect to a vehicle docking system of the ground-based vehicle.

In some additional, alternative, or selectively cumulative embodiments, the vehicle docking system is mounted to an upper surface of the ground-based vehicle.

In some additional, alternative, or selectively cumulative embodiments, the vehicle docking system is mounted to a lower surface of the ground-based vehicle.

In some additional, alternative, or selectively cumulative embodiments, the drone docking system is mounted to an upper surface of the drone.

In some additional, alternative, or selectively cumulative embodiments, the drone docking system is mounted to a lower surface of the drone.

In some additional, alternative, or selectively cumulative embodiments, the drone has a maximum height dimension that is less than or equal to one foot.

In some additional, alternative, or selectively cumulative embodiments, the drone has a maximum height dimension that is less than or equal to six inches.

In some additional, alternative, or selectively cumulative embodiments, the drone has a length and/or width that is less than or equal to six inches.

In some additional, alternative, or selectively cumulative embodiments, the multiple sensors comprise a camera.

In some additional, alternative, or selectively cumulative embodiments, the multiple sensors comprise a visible light sensor.

In some additional, alternative, or selectively cumulative embodiments, the multiple sensors comprise an IR sensor.

In some additional, alternative, or selectively cumulative embodiments, the multiple sensors comprise a UV sensor.

In some additional, alternative, or selectively cumulative embodiments, the multiple sensors comprise an audible sound sensor.

In some additional, alternative, or selectively cumulative embodiments, the multiple sensors comprise a radio wave sensor.

In some additional, alternative, or selectively cumulative embodiments, the multiple sensors comprise an ultrasonic sensor.

In some additional, alternative, or selectively cumulative embodiments, the drone comprises a master controller that receives commands through the wireless communication system.

In some additional, alternative, or selectively cumulative embodiments, the master controller directly or indirectly communicates with the piezoelectric structure.

In some additional, alternative, or selectively cumulative embodiments, the multiple sensors are operable to communicate directly or indirectly with an artificial intelligence (AI) system.

In some additional, alternative, or selectively cumulative embodiments, the artificial intelligence (AI) system comprises one or more of a neural network, a probabilistic technique such as Bayes or Markov algorithm, a kernel method (like SVM, decision trees/random forest, Gaussians, PCA, can-cor . . . ), reinforcement learning that can have nothing to do with artificial neural networks, artificial reasoning a.k.a. "good old fashioned AI," many path-planning and intelligent control-systems methods that correspond to "classical AI" (not the same as GOFAI), alife (swarms, cellular automata . . . ), agents and chaos systems, and/or any algorithm or group of algorithms that optimize a value function (reinforcement learning and linear dynamic programming).

In some additional, alternative, or selectively cumulative embodiments, one or more of the multiple sensors are operable to provide depth information regarding water crossing in an intended path of the ground-based vehicle.

In some additional, alternative, or selectively cumulative embodiments, one or more of the multiple sensors are operable to provide flow information regarding water crossing in an intended path of the ground-based vehicle.

In some additional, alternative, or selectively cumulative embodiments, one or more of the multiple sensors are operable to provide animal information regarding an animal crossing in an intended path of the ground-based vehicle.

In some additional, alternative, or selectively cumulative embodiments, the self-energizing system comprises solar cells.

In some additional, alternative, or selectively cumulative embodiments, the self-energizing system comprises a wind generator.

In some additional, alternative, or selectively cumulative embodiments, the self-energizing system comprises a spark plug and an antenna.

In some additional, alternative, or selectively cumulative embodiments, the self-energizing system is configured to obtain energy from a light source.

In some additional, alternative, or selectively cumulative embodiments, the self-energizing system is configured to obtain energy from air flow.

In some additional, alternative, or selectively cumulative embodiments, the self-energizing system is configured to obtain energy from power lines.

In some additional, alternative, or selectively cumulative embodiments, the self-energizing system is configured to obtain energy from railroad tracks.

In some additional, alternative, or selectively cumulative embodiments, the wireless communication system employs a cellular device.

In some additional, alternative, or selectively cumulative embodiments, the wireless communication system is configured to communicate with one or more of a vehicle computer, a stationary computing system, a navigation system, an artificial intelligence system, or a cell phone.

In some additional, alternative, or selectively cumulative embodiments, the piezoelectric structure is configured to operate as a sensor.

In some additional, alternative, or selectively cumulative embodiments, the piezoelectric structure is configured to aim or focus laser light.

In some additional, alternative, or selectively cumulative embodiments, the piezoelectric structure is configured to produce sound.

In some additional, alternative, or selectively cumulative embodiments, the piezoelectric structure is configured to assist with video stabilization.

In some additional, alternative, or selectively cumulative embodiments, the piezoelectric structure is configured to assist ground-based movement.

In some additional, alternative, or selectively cumulative embodiments, the piezoelectric structure is configured to assist with grasping an object.

In some additional, alternative, or selectively cumulative embodiments, the piezoelectric structure is configured to assist with a vehicle maintenance operation.

In some additional, alternative, or selectively cumulative embodiments, the piezoelectric structure is configured to assist with stabilizing the drone in a secure position.

In some additional, alternative, or selectively cumulative embodiments, the piezoelectric structure is configured to assist with emission of a fluid.

In some additional, alternative, or selectively cumulative embodiments, the drone is configurable for hiding.

In some additional, alternative, or selectively cumulative embodiments, the drone is configured to assist with vehicle navigation.

In some additional, alternative, or selectively cumulative embodiments, the drone is configured for transmitting or recording audio or video.

In some additional, alternative, or selectively cumulative embodiments, the drone is configured for crawling into a confined space.

In some additional, alternative, or selectively cumulative embodiments, the drone is configured for hanging over a ledge.

In some additional, alternative, or selectively cumulative embodiments, the drone is configured for deploying a solar array at multiple tilt angles.

In some additional, alternative, or selectively cumulative embodiments, the flight mechanism comprises one or more rotors.

In some additional, alternative, or selectively cumulative embodiments, the drone has a body, and the rotors are configurable for positioning in multiple orientations with respect to the drone body.

In some additional, alternative, or selectively cumulative embodiments, the rotors have multiple blades, and at least one of the blades is retractable.

In some additional, alternative, or selectively cumulative embodiments, the rotors have multiple blades, and at least some of the blades are stackable.

In some additional, alternative, or selectively cumulative embodiments, the drone performs a task that involves avoiding or waiting out a storm.

In some additional, alternative, or selectively cumulative embodiments, the drone performs a task that involves an extended period of hiding.

In some additional, alternative, or selectively cumulative embodiments, the drone performs a task that involves an extended period of spying.

In some additional, alternative, or selectively cumulative embodiments, the drone performs a task that involves crawling into a confined space.

In some additional, alternative, or selectively cumulative embodiments, the drone performs a task that involves hanging over an edge.

In some additional, alternative, or selectively cumulative embodiments, the drone performs a task that involves protecting itself.

Selectively cumulative embodiments are embodiments that include any combination of multiple embodiments that are not mutually exclusive.

Additional aspects and advantages will be apparent from the following detailed description of example embodiments, which proceeds with reference to the accompanying drawings.

DETAILED DESCRIPTION OF EMBODIMENTS

Figure 1:
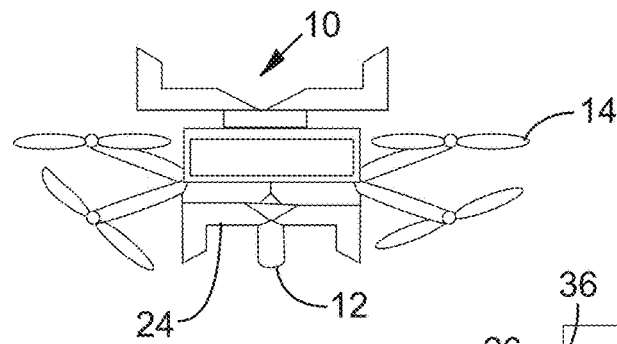
FIG. 1 illustrates a drone flying with a retracted tool.

Example embodiments are described below with reference to the accompanying drawings. Unless otherwise expressly stated in the drawings, the sizes, positions, etc., of components, features, elements, etc., as well as any distances therebetween, are not necessarily to scale, and may be disproportionate and/or exaggerated for clarity.

The terminology used herein is for the purpose of describing particular example embodiments only and is not intended to be limiting. As used herein, the singular forms "a," "an" and "the" are intended to include the plural forms as well, unless the context clearly indicates otherwise. It should be recognized that the terms "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. Unless otherwise specified, a range of values, when recited, includes both the upper and lower limits of the range, as well as any sub-ranges therebetween. Unless indicated otherwise, terms such as "first," "second," etc., are only used to distinguish one element from another. For example, one element could be termed a "first element" and similarly, another element could be termed a "second element," or vice versa. The section headings used herein are for organizational purposes only and are not to be construed as limiting the subject matter described.

Unless indicated otherwise, the terms "about," "thereabout," "substantially," etc. mean that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art.

Spatially relative terms, such as "right," left," "below," "beneath," "lower," "above," and "upper," and the like, may be used herein for ease of description to describe one element's or feature's relationship to another element or feature, as illustrated in the drawings. It should be recognized that the spatially relative terms are intended to encompass different orientations in addition to the orientation depicted in the figures. For example, if an object in the figures is turned over, elements described as "below" or "beneath" other elements or features would then be oriented "above" the other elements or features. Thus, the exemplary term "below" can, for example, encompass both an orientation of above and below. An object may be otherwise oriented (e.g., rotated 90 degrees or at other orientations) and the spatially relative descriptors used herein may be interpreted accordingly.

Unless clearly indicated otherwise, all connections and all operative connections may be direct or indirect. Similarly, unless clearly indicated otherwise, all connections and all operative connections may be rigid or non-rigid.

Like numbers refer to like elements throughout. Thus, the same or similar numbers may be described with reference to other drawings even if they are neither mentioned nor described in the corresponding drawing. Also, even elements that are not denoted by reference numbers may be described with reference to other drawings.

Many different forms and embodiments are possible without deviating from the spirit and teachings of this disclosure and so this disclosure should not be construed as limited to the example embodiments set forth herein.

Figure 2:
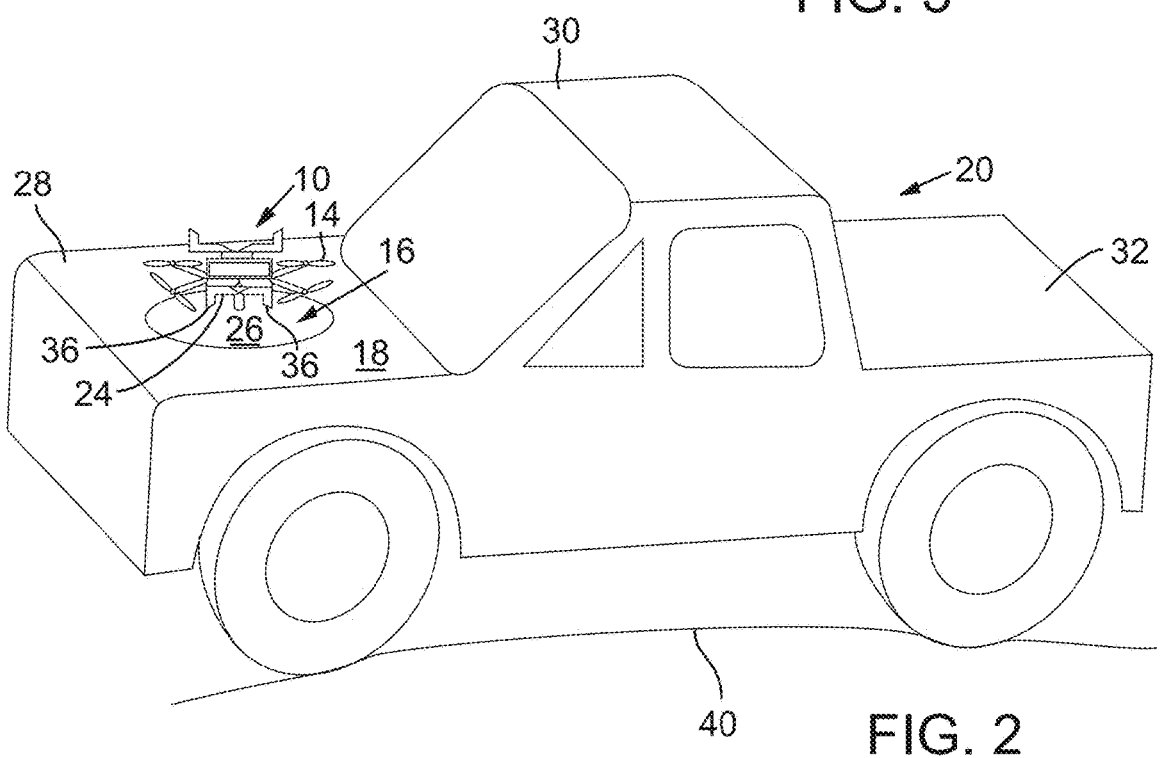
FIG. 2 illustrates an external docking system mounted on an upper surface of a ground-based vehicle that is mated to on-board docking system positioned on a lower surface of a drone.

FIG. 1 illustrates a drone 10 flying with a retracted tool 12, and FIG. 2 illustrates an example of an external docking system 16 that is mounted on an upper surface 18 of a ground-based vehicle 20 that is mated to on-board docking system 22 positioned on a lower surface 24 on the drone 10. The drone 10 includes a flight mechanism, such as one or more wings or one or more rotors 14, a motor 80 (FIG. 14) or engine to power propulsion, and an energy storage system, such as one or more batteries or a liquid fuel tank. One will appreciate that energy comes in many forms including radiation, chemical, gravitational potential, electrical potential, electricity, elevated temperature, latent heat and kinetic, and can be stored in different ways. See https://en.wikipedia.org/wiki/Energy_storage.

These drone elements are well known and available commercially. They can be employed as they are available off-the-shelf, or they can be configured or adapted to be harmonize with the other drone components.

In some embodiments, the energy storage system may employ one or more lithium-ion batteries, preferably located in a manner that a user, a robot, or another drone may access the batteries for replacement. Lithium-ion batteries may be sized to fit into small, irregular spaces. They can also be swapped out and fast charged as needed. The batteries may be rechargeable, such as by a DC power adapter, a USB power source, wirelessly on a recharging pad similar to how many mobile phones are now charged, or other battery charging methods known in the art.

The drone 10 may also include an on-board self-energizing system that permits the drone 10 to acquire energy when the drone is away from a mated external charging station, such as on a drone dock on a vehicle or at a stationary energy supply station. An example of on-board self-energizing system may include a solar-charging system that includes solar cells, such as arranged in one or more solar panels, solar fabrics, or solar films. Self-energizing may also be accomplished in a number of other ways. For example, scientists Jun Yao & Derek Lovely of UMass Amherst, have recently unveiled "Air-gen," a generator that uses a natural protein to create electricity from moisture in the air. See https://www.goodnewsnetwork.org/device-uses-protein-to-generate-electricity-from-thin-air/, which is incorporated herein by reference.

A drone 10 may employ a rotatable tube that has a wind generator in it. The tube may be turned to be oriented in the direction of travel of the wind to maximize air flow. The generator may be implemented in a small size that employs piezoelectric components. See https://qz.com/406984/this-wind-turbine-generates-power-without-blades/, which is incorporated herein by reference.

Alternatively, a piezoelectric material can be shaped like a flap, which may be deployed to hang off the edge of the drone 10. The piezoelectric material may vibrate in response to airflow and produce electricity. See https://www.alternative-energy-news.info/energy-harvesting-piezo-tree-concept/, which is incorporated herein by reference, for adaption for implementation.

The drone 10 may also be alternatively or additionally configured to obtain power from electric lines, directly (risky) and/or inductively (less risky). The drone 10 may employ a spark plug and an antenna and rest on a telephone pole a meter away from the electric lines. The technology presented in https://www.youtube.com/watch?v=ZyfXvFicp8M, which is incorporated herein by reference, regards charging a mobile phone wirelessly through magnetic induction from power lines, which is a method that can be adapted for wirelessly charging a drone 10 from power lines. The same person in the video has other videos showing other techniques for charging a cell phone, including how to charge a cell phone from railroad tracks. See https://www.youtube.com/watch?v=oeYVjOdkUEc, which is incorporated herein by reference.

The drone 10 may also include an on-board charge-receiving system 36 that is mated to a charging system of an external charging station. The connections between the on-board charge-receiving system 36 and the external charging station 26 can be wired, such as with any form of plug and socket (magnetic or nonmagnetic); or, these connections can be wireless. For example, Korean appl. No. KR101724581 and U.S. Pat. No. 10,023,057, which is herein incorporated by reference, discuss how drones 10 can be used in conjunction with wireless charging at a ground-based charging station. The on-board charge-receiving system 36 may coordinate with an on-board docking system 22, and the external charging station 26 may cooperate with an external docking system 16 on a vehicle 20 or at a stationary energy supply station. The on-board docking system 22 is mated to the external docking system 16.

The vehicle 20 may be any type of ground-based vehicle, including passenger vehicles and non-passenger vehicles. Passenger vehicles may include driver-based vehicles, self-driving vehicles, or vehicles that can be directed by a driver and a self-driving system. Non-passenger vehicles may be driver-based, autonomous, or vehicles that can be directed by a driver and an autonomous driving system. The non-passenger vehicles may include, but are not limited to commercial vehicles, trucks, freight vehicles, and large vehicles.

With reference to FIG. 2, an external charging station 26 can be mounted to the upper surface 18 of the vehicle 20, such as on the hood 28, on the roof 30 or cab, on the trunk 32 or in a clamshell at these locations. As previously noted, the external charging station 26 can be wireless charger, such as a wireless inductive charger or a wireless capacitive charger, that is mated to an on-board charge-receiving system 36. Wireless inductive chargers are well known. An example of a capacitive charger may be found at https://www.murata.com/en-us/about/newsroom/techmag/metamorphosis16/productsmarket/wireless, which is incorporated herein by reference.

Figure 3:
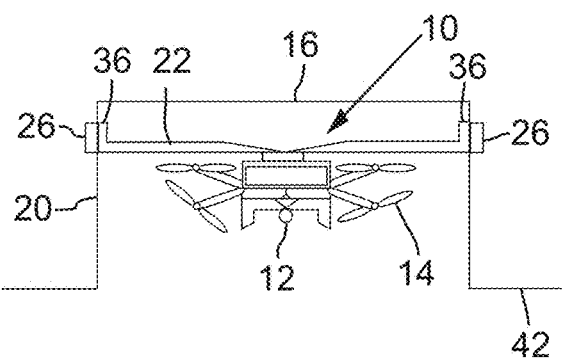
FIG. 3 illustrates an external docking system mounted on a lower surface mounted of a ground-based vehicle that is mated to an on-board docking system on an upper surface of the drone.

In another embodiment, FIG. 3 illustrates an external docking system 16 that includes an external charging station 26 a mounted on a lower surface 34, such as in or near a spare tire cavity, of a ground-based vehicle 20. The drone 10 may have an on-board docking system 22 on its upper surface 38 that is configured to cooperate with the on-board charge-receiving system 36. The on-board docking system 22 of the drone 12 is mated to the external docking system 16 of the vehicle 20.

This mounting configuration may decrease potential theft of the drone 12. The drone 12 may be configured to have a short height profile, such as less than or equal to one foot or less than or equal to six inches, to provide the drone 12 with extra flying clearance between a ground surface 40 and the lower surfaces 42 of the vehicle 20.

Figure 4:
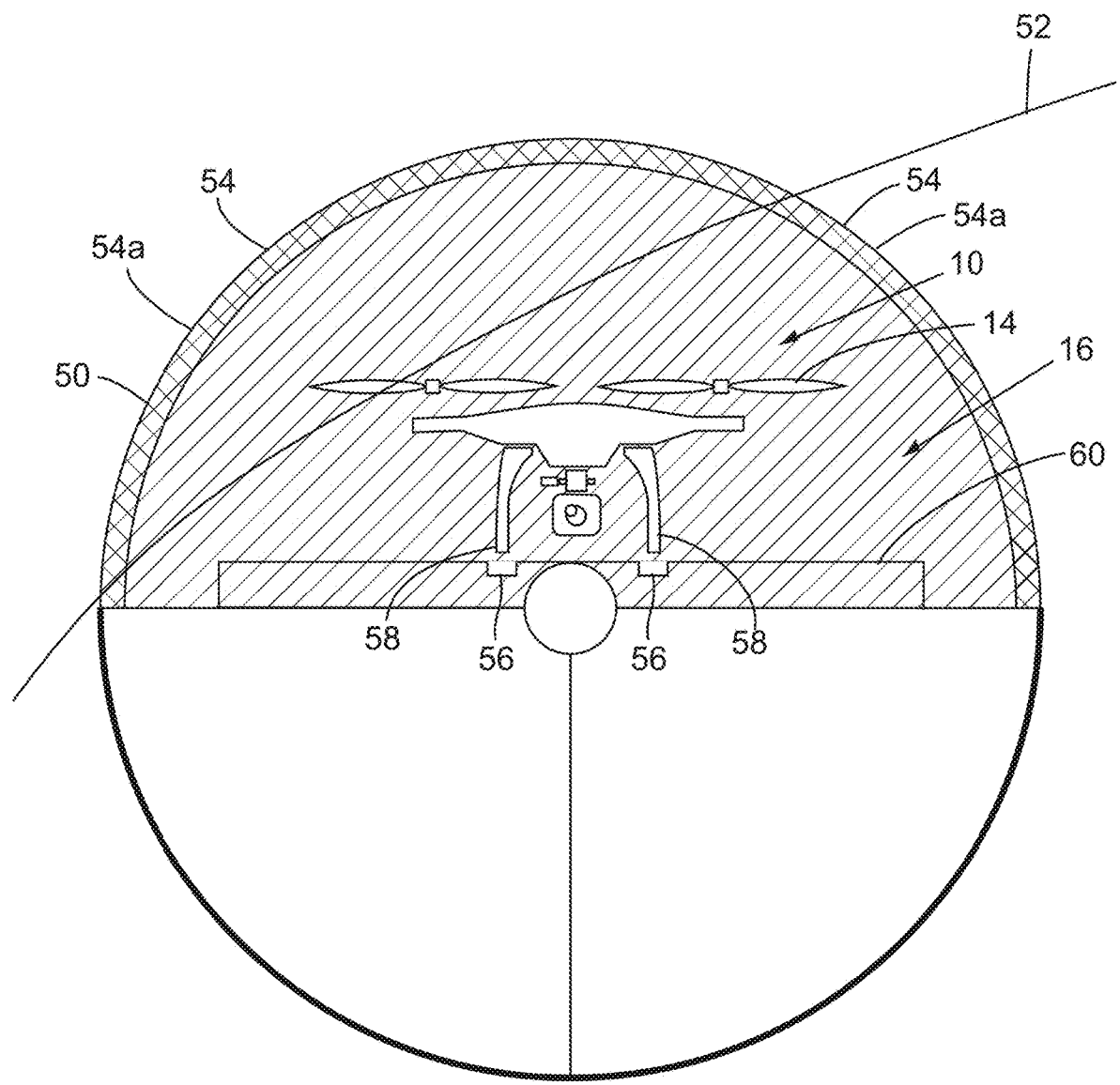
FIG. 4 illustrates an example of a drone protection chamber, such as drone hanger.

With reference to FIG. 4, the drone 12 may also be protected from theft and during take-off and landing by use of a drone protection chamber, such as a drone hanger 50. In some embodiments, the drone hanger 50 may be configured in the form of a clamshell with a door 54, or set of doors 54a and 54b, that may be configured to move forward or backward with respect to the primary direction of travel of the vehicle 20. One will appreciate that the doors 54 can be configured to move sideways with respect to the vehicle primary direction of travel or can be configured to open and close in other ways.

The drone hanger 50 may be positioned so that it is entirely above the surface 18 or 34, entirely internally to or congruous with the surface 18 or 34, or partly contained internally to the surface 18 or 34. In one embodiment shown in FIG. 4, the drone hanger 50 is contained partly above and partly below an air foil 52 of a non-passenger vehicle 20, such as a truck.

Figure 5:
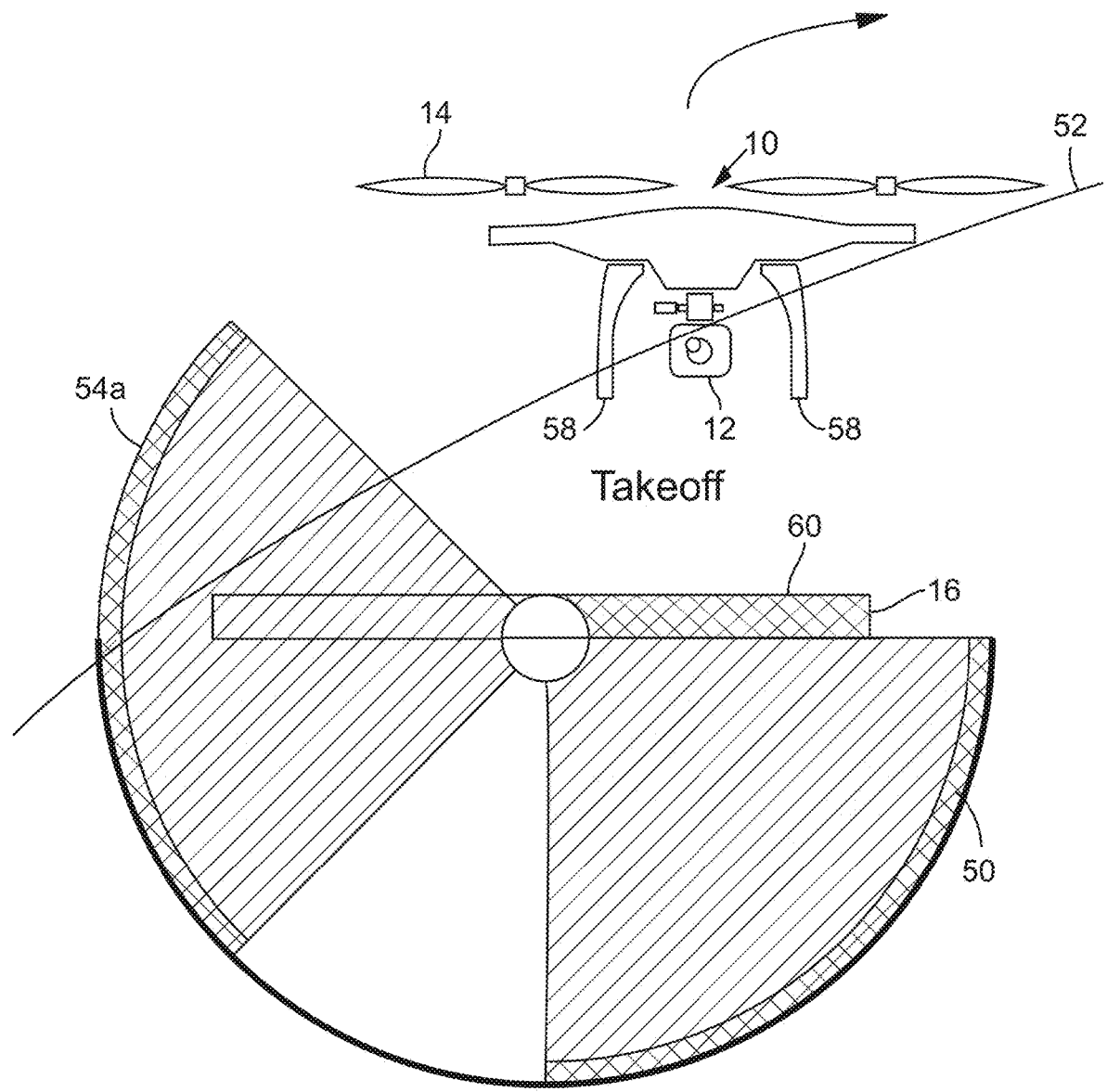
FIG. 5 illustrates a how a hanger door may operate during a drone takeoff.

FIG. 5 illustrates how a forward door 54a can assist in drone takeoff. A rearward door 54b can be completely opened. Then, the forward door 54a moves so that it is only partly opened. Its unopened portion may block wind to permit the drone 10 to have more stable lift off conditions. The respective docking systems 16 and 22 of the vehicle 20 and the drone 10 may utilize, for example, docking mechanisms that employ magnetic charging contacts 56 and/or magnetic feet 58 that also serve as part of the respective external charging station 26 and the on-board charge-receiving system 36. The charging contacts 56 may be flush with the surface of a landing pad 60 of the docking system 16, or they may be recessed (or elevated) to provide for a more stability while docked (or accessibility during docking).

The magnetic hold downs are generally easy to control, and they may be very effective for holding the drone 10 to the landing pad 60, especially when it is protected by a drone hanger 50 with protective doors 54. Magnetic hold downs may not be as useful when landing and resting drones while out on an operation. Moreover, most trailers for trucks are aluminum and not magnetic. Hence, a drone 10 may employ a variety of other tools 12 as attaching mechanisms. For example, the tool 12 may include a clamp or clamping mechanism. Some embodiments of clamps may be configured to hold on to both sides of a corner; and if height is critical, the drone 10 can hang down from the top corner of a trailer, such as later described.

Figure 6:
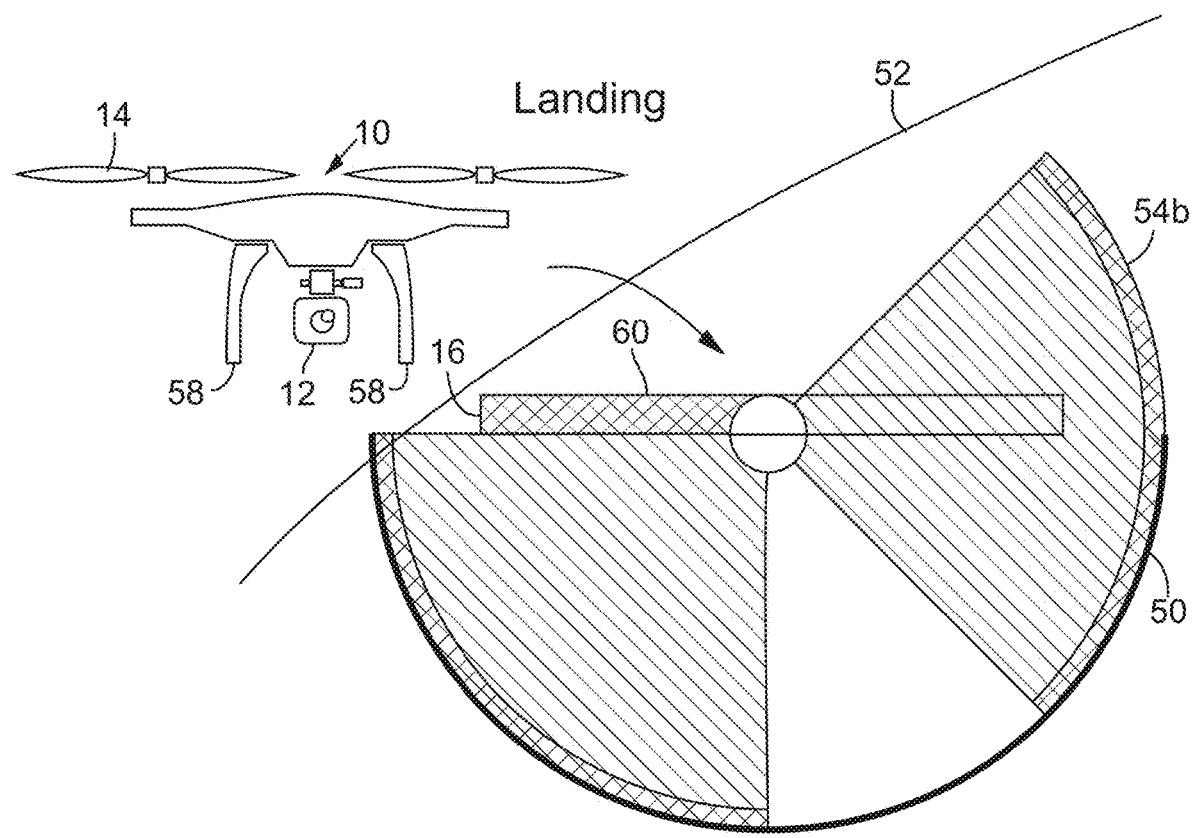
FIG. 6 illustrates how a hanger door may operate during a drone landing.

FIG. 6 illustrates how a rearward-moving door 54b may be configured for drone landing. The forward door 54a may be completely opened so that it may provide the drone 10 with greater approach options for landing. The rearward door 54b may be only partly opened to shield the drone 10 from the elements and/or wind shear while it lands.

The drone 10 may also include a communication system, such as a mobile or cellular system. A communication system may additionally or alternatively include one or more of visual (strobe frequency, Morse code, binary), thermal, audio, tactical chemical signals, laser, lidar, or radar. The communication system may relay instructions and data to a discrete remote device, such as a vehicle computer, a stationary computing system, an artificial intelligence system, a cell phone, or other device equipped to receive communications. Some specific examples of communication with remote devices are provided later.

The drone 10 may also include one or more tools that may include one or more of: sensors; probes; docking aids; emitters for sound, light, or fluid; launchers for projectiles; clamps; and mechanisms to support different types of loads.

Figure 7:
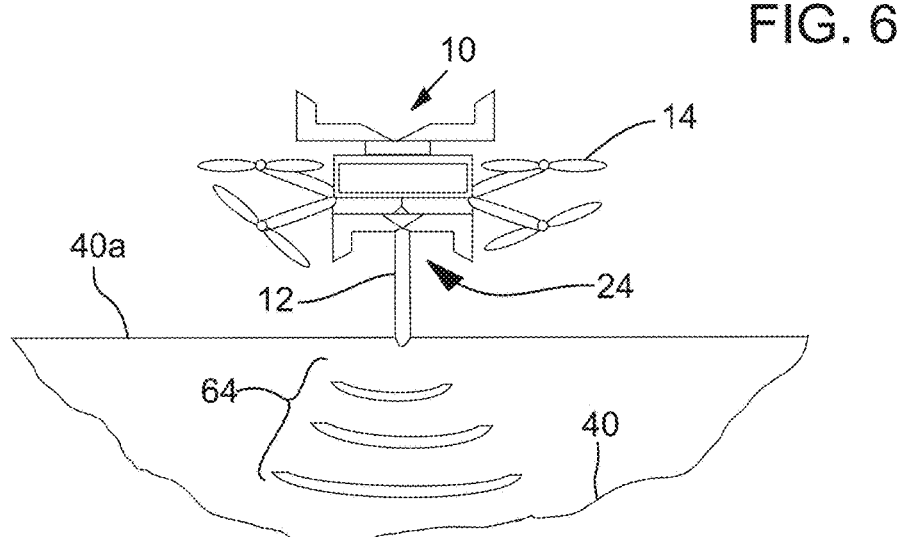
FIG. 7 illustrates a drone with a tool deployed.

FIG. 7 illustrates the drone 40 with a tool 12 deployed as it approaches an apparent surface 40a. In one embodiment, the tool may be a sensor that is affixed to or deployed from the drone 10. The sensor may be employed to determine whether the surface 40a is a suitable surface for landing upon. In one embodiment, the sensor is an ultrasonic sensor that may assist determination of the solidity of the ground, such as mud, or determine the depth of a fluid between the surface 40 and the more solid ground 40 beneath underneath. The sensor may be used without contacting the surface 40a. However, if the sensor is an ultrasonic sensor, air may limit the utility of emitted ultrasonic sound waves. In such cases, the drone 10 can descend its height to a level such that the sensor touches the surface 40a; or, the drone 10 may stay at a safer height above the surface 40a and lower the sensor on a cable so that the sensor can contact the surface 40a. This type of sensor, with or without the aid of other sensors, may be able to determine whether the depth and current would allow the vehicle 20 to proceed through the trough, as later discussed.

In another embodiment, the surface 40a could be associated with an external docking station. With reference again to FIG. 7, sensors on the drone 10, sensors on the vehicle 20, and/or sensors on the external docking system 16 may individually or cooperatively guide the drone 10 to (and into) the external docking system 16. For example, the drone 10 may hover above the external docking station 16 and then with guidance from the sensors contact the pad 60 of the external docking station 16. The drone 10 may deploy a tool 12, such as a docking pin that is mated to a docking hole in the external docking station 16.

In another embodiment, the drone 10 may hover below the external docking station 16 and then with guidance from the sensors contact the external docking station 16 with the on-board docking system 22 from the drone upper surface 38. When positioned correctly, the drone 10 may deploy one or more drone tools 12, such as a spring load tensioner or the equivalent to firmly engage the drone 10 into the external docking system 16, as shown in FIG. 3. Alternatively, the external docking system 16 may deploy a gripping mechanism to firmly engage the drone 10 into the external docking system 16.

Drones 10 are useful for a wide variety of applications. For example, as surveillance tools, drones 10 can be used as scouts, can be used to coordinate traffic between autonomous vehicles 20, can be used to warn of oncoming traffic around corners, can be used to determine whether a parking lot has an empty parking space, can be used to guide a truck while backing up, and can be used to track or spy on people, including recording activities or listening to conversations. Additionally, drones 10 can be used to warn people or animals in the path of a vehicle 20. Drones 10 can be used to deliver items such as packages from retailers, medicines or other supplies to remote areas, or batteries or fuel to recharge autonomous vehicles 20. Drones 10 can also be used for remote, difficult to reach, or in-motion repairs. Finally, drones 10 can be equipped with defensive or offensive mechanisms.

As a navigational aid, drones 10 can communicate with a driving/navigating app such as Waze™, Google Maps™, orMaps™. A person can enter start and destination information into the app. Alternatively, the app may know the start location from cellular GPS information provided by a cellular device. The apps, with different degrees of accuracy, provide or utilize information about accidents and police activity and may actively reroute the travel path to avoid such obstacles.

A person can sync their cellular phone to the drone 10 and/or insert their (spare) cellular phone into a pocket of the drone 10 with Waze or similar app running in it (and have a camera view the screen and a slightly wet, slightly salty robotic touch finger interact with the screen just like a human would), and the drone 10 may interact with the navigation app like a person would. Moreover, the drone 10 can use the simpler Waze page with turn arrows on it and/or can listen to voice commands (such as from a person's non-spare phone or Sync from their car audio, etc.). For another example of connecting drone, car, and smartphone, see https://www.dronemobile.com, which is incorporated herein by reference.

Smartphones or other mobile devices can also be used to control drones 10 more generally, i.e., not just for navigation. Other instructions might include when or how to perform operations such as battery replacement, repair, or video or audio recording. For examples of controlling robots (such as drones) from smartphones, see https://www.bing.com/videos/search?q=cell+phone+navigate+lego+robot+ap&view=detail&mid=87D55FF84C32B0F633B287D55F-F84C32B0F633B2&FORM=VIRE, which is incorporated herein by reference, and https://www.bing.com/videos/search?q=cell+phone+navigate+lego+robot+ap&view=detail&mid=7E15053A83A4839063-FE7E15053A83A4839063FE&FORM=VIRE, which is incorporated herein by reference, and https://www.instructables.com/id/Cellphone-operated-Robot/, which is incorporated herein by reference.

Drone navigation can be accomplished with or without GPS. See https://gadgets.ndtv.com/others/news/new-autonomous-flying-drones-dont-require-gps-to-navigate-696750, which is incorporated herein by reference.

The drone's image/map can be combined with the vehicle's image/map which allows for a more accurate estimation of objects. This in turn may allow for more accurate compensation for complex avoidance scenarios. One will appreciate that navigation apps may include incomplete or inaccurate information about infrastructure, occasionally directing vehicles to drive through large bodies of water or take routes through non-existing streets. Navigation systems tend to have particular problems with large properties, often directing vehicles to non-existing entrances. A drone 10 employed as an advance scout in such situations may save a vehicle from following incorrect information from a navigation app.

These avoidance scenarios are not limited to mere navigation. They also include banking of the shocks and suspension to redistribute loading, so a vehicle can still drive onto a soft berm on one side of the road, while avoiding a human (or other animal) walking out in front of the truck (or other vehicle) on the other side of the road. Moreover, with appropriate sensors, the drone can act like, or take the place of a Velodyne Lidar, Inc. navigation system. The appropriate sensors and other components can be found at https://velodynelidar.com/press-release/velodyne-lidar-puck-lite-navvis-vlx-mapping-system/, which is incorporated herein by reference.

As needed, a drone 10 may fly ahead of the vehicle 20, such as a tractor trailer, to identify potential hazards. For example, where turns in mountain roads mean that buses and tractor trailers or other long or wide vehicles have to cross the center into the other lane to make the blind turn or navigate around slow or stopped traffic, the drone 10 may be out ahead, not only making sure the way is clear, but also to flash lights and run interference to keep people or other vehicles from entering into the lane. Similarly, the drones 10 can be used to identify (and direct traffic with respect to) oncoming vehicles on single-lane, two-way traffic roads.

A drone 10 can also provide a warning of a forthcoming overhanging rock formation as well as information about its height from the road surface and the distance the formation overhangs the road. Information from the drone 10 may be fed into a vehicle navigation system. Similarly, a drone 10 may scout shoulderless cliff-side roads and help prevent a vehicle from coming too close to the edge.

A drone 10 may also be employed to warn of humans or other animals on the road and may be able to pre-spook them off of the road. For example, a drone 10 may employ warning sounds and/or lights to pre-spook an animal so that it leaves the road. In some embodiments, the drone 10 or software in communication with the drone 10 may identify the animal and determine the most effective warning signal that may include specific sound and/or light frequencies and emission patterns to spook the particular animal. This warning signal correlation with specific animal may be accomplished through a lookup table or by alternative means.

In another embodiment, the drone 10 may act like a flashing strobe as a visual collision avoidance warning. This technology is commercially available and describe at https://lumencube.com/products/strobe, which is herein incorporated by reference, and can be adapted for drone use.

Moreover, the drone 10 may utilize sound or light signals as a frequency communicator (such as Morse code) to convey information to a third-party person or other system that the drone communication system cannot interface with. In this manner, even probes or vehicles can interpret the signals (or a code can be used if it is secret to only intended receiver) without a direct interface.

Of course, two drones 10 can use visual, ultrasound, or radar to communicate with each other and/or avoid colliding, but Morse code is robust to wireless frequency changes across international borders, so it potentially allows an operator to continue driving across a continent and not worry about interference. The drone 10 can also use triangulation of the other strobe position plus frequency to locate (when not in Morse code mode).

In flood conditions, a drone 10 may also be able to send a weight or a sensor down into water to sense water depth and undertow speed to see whether a vehicle 20 can make it through the water without washing downstream. Alternatively, the drone 10 may sonically determine water depth via onboard sensors that are not sent into the water. For example, piezoelectric devices are light weight and can produce ultrasound that can be directed at the water. See https://www.piceramic.com/en/piezo-technology/generating-ultrasound-with-piezo-components/, which is incorporated herein by reference.

A drone 10 may also help a vehicle 20, such as a truck (whether autonomous or with a driver) back into a loading dock. This can be accomplished with drone cameras working as visual aids; or the visual and other sensors on the drone 10 can communicate directly with the vehicle navigation and operation systems to directly guide the vehicle 20 into position. Moreover, before entering an area with a truck for example, the drone 10 may determine whether the truck can even get into and out of the area safely, not only due to path and object constraints, but also if the area is too muddy or slippery.

Drones 10 may assist automated trucks (or trucks with drivers) in many additional ways. With reference to FIGS. 12A, 12B, 12C, and 12D (collectively FIG. 12), a drone 10 may help affix sensors to, or use its on-board sensors at, front corners 70 at a top 72 and side 74 of a trailer, such as at the highest point of the trailer, so that sensors can best determine if the tractor trailer assembly is going to fit under an upcoming bridge or bridge along a specified route.

One will appreciate that if the drone 10 rests on the top 72 of the trailer, the sensors on the drone 10 may be at an angle with respect to an upcoming bridge. One will also appreciate that some sensors that are working at angles with respect to what they are intended to detect may suffer from scatter.

Figure 12A:
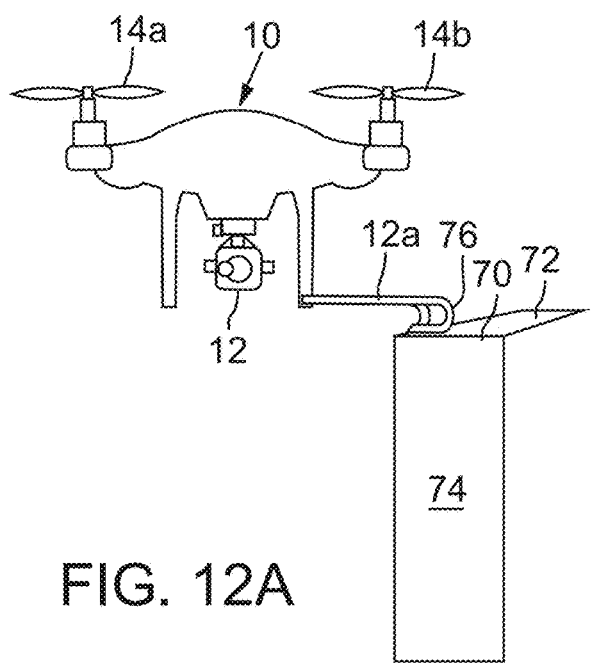
FIGS. 12A-12D illustrate how a tilt enabled rotor assembly can assist with drone attachment to a side of a vehicle.

In an alternative to resting on the top 72 of the trailer, the drone 10 may fly alongside the top of the trailer. The drone 10 may perform this task based on on-board sensors that can determine and maintain its relative position to the front corner 70 of the trailer. Additionally, or alternatively, the drone may have a tool 12a that rests on the surface of the top 72 of the trailer, such as depicted in FIG. 12A. This tool may provide information that helps to level the drone 10 at the correct height.

Figure 12B:
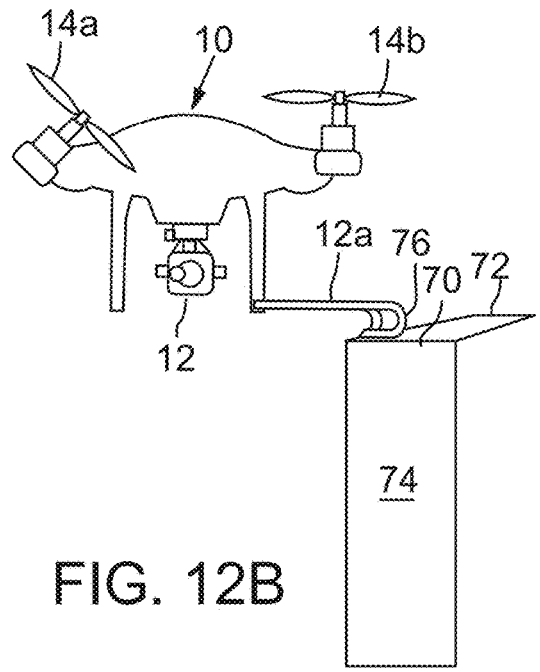
Figure 12C:
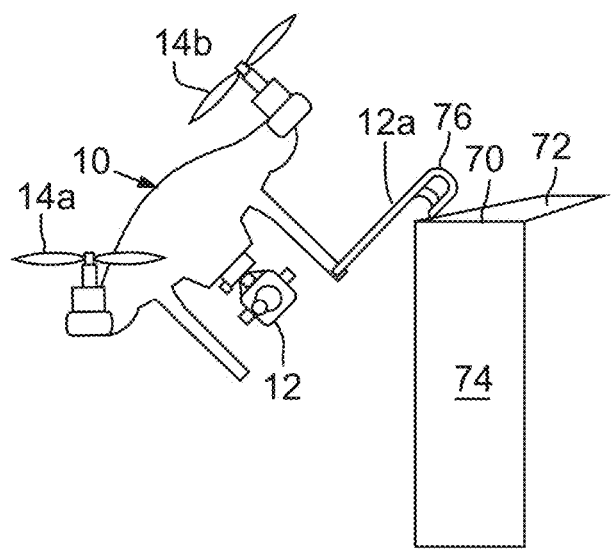
Figure 12D:
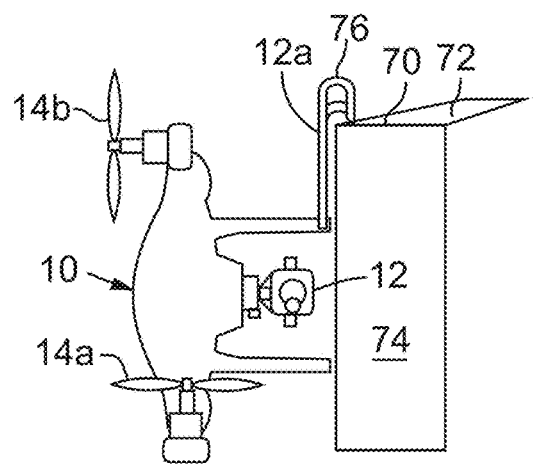

Also, in some cases, clearance between an upcoming bridge and the top 72 of the trailer may be close to or less than the height of the drone 10. The drone 10 may employ a tool 12a that helps it rest or affix itself to the trailer such as alongside the top, or the drone 10 may fly alongside the top of the trailer. The tool 12a may include an appendage, a hook, and/or clamp 76 that may be initially positioned as shown in FIG. 12A. FIG. 12B shows that the angle of one or more of its rotors 14a can be adjusted to gently lower the drone 10 alongside the trailer. The hook or clamp 76 may act as a pivot point as the drone 10 is further lowered with the rotor 14b helping to keep the hook or clamp 76 close to and at the top of the trailer, as shown in FIG. 12C. FIG. 12D shows the drone 10 in a sideways resting position alongside the trailer with rotors 14an and 14b in perpendicular orientations.

In some embodiments, the clamps 76 (whether used for grasping truck corners or other objects to stabilize the drone 10 or to perform other operations disclosed herein) may employ a solenoid to engage, and the clamps 76 may release power to disengage. However, a reverse default scenario may be employed, depending on safety concerns. Clamping may be non-optimal when grasping any surface, even a flat surface, if contact is nit uniform. The force applied across the entire surface of the clamp 76 can be optimized in order to maintain a consistent coefficient of friction everywhere. See "Robot Trajectory Control Employing A Novel Neural Architecture," Getman, Anna L, Engineering Master's Thesis: Rensselaer Polytechnic Institute, Troy, N.Y., December 1992, which is incorporated herein by reference.

The two solenoid control strategies may be optimized via a cost function that may be created from a factory default, and the optimization of the strategies may drift via use to reflect both wear and tear, as well as short term considerations such as the current environmental conditions. Solenoid based clamping may be used for an initial and/or primary attachment mode, but fine adjustments and real time positional stability may be achieved via piezo actuation as described later in detail. However, one will appreciate that the clamping or grasping can be accomplished solely with piezoelectric actuators.

The drone may also fly ahead to provide real-time measurements of the height from the road surface to the lowest most portion on the underside of the bridge. One will appreciate that a bridge might sag or a road surface may lift over time and that map-specified clearance information may not be completely accurate.

A drone 10 may help with charging: wired or wireless. In particular, the drone 10 may be configured to facilitate bidirectional charging. For example, when a battery of a vehicle 20 becomes defective or a light is left on depleting its energy, the drone 10 and its energy storage system can be employed to provide enough charge to start the vehicle 20. After the vehicle 20 has been started, the drone 10 can gain the energy back from the vehicle 20, either from the jumper cables to the vehicle battery or from the drone-specific external charging station 26 on the vehicle 20.

A drone 10 can be used for maintenance of an automated truck. For example, the drone 10 can clean the truck lights (incandescent or LED), the drone 10 can replace lights or other parts, and the drone 10 can perform visual inspection of damage. These operations can be accomplished while the vehicle 20 is stationary or while the vehicle 20 is in motion.

A drone 10 may assist with refueling/recharging or swapping (electric or internal combustion engine) batteries. For example, a drone 10 may deliver diesel fuel; or, a drone 10 may help install extra battery packs under, or in front of, the trailer of an electrically powered vehicle to convert a short-distance haul to a long-distance haul. Alternatively, or additionally, the depleted batteries may be exchanged for fresh batteries during a long-distance haul. Such battery exchange could also be implemented to extend the range of noncommercial electric vehicles.

As mentioned previously, a drone 10 may be employed to look around blind corners (such as on roads or at destination on a busy block or at a set of buildings) then either use signals or its body to block oncoming traffic; or, the drone 10 with the assistance of a navigation system may help plot one or more routes for a best path, or plot backup angles, so as to help the truck to not get stuck.

A drone 10 may also be useful in helping a stranded automated truck get assistance from any other trucker. If the truck is all electric and has lost all power, and is stuck in a lane of traffic, the helping trucker can bump up against the back bumper of the stuck vehicle 20, and the drone 10 can help steer the automated truck to the side of the road. If the drone 10 carries enough charge in its own battery, it can plug into the steering unit of the automated truck and give it just enough power to steer while the trucker pushes. Similarly, such a drone 10 could supply power to a dead or low battery of an internal combustion engine to help with starting the vehicle, as previously discussed.

One difference between the controls for a regular drone 10, such as associated with a vehicle 20 having a driver, and drone 10 for an autonomous vehicle 20 is that the drone-vehicle coordinated system will encounter unique scenarios and then know how to respond to them. Therefore, the drone-vehicle system can be equipped with the ability to categorize scenarios, such where the tractor trailer is actually physically stuck where it can't find a path out of its situation and needs the drone 10 to actively move traffic, for example.

Typical technologies employed to accomplish the various drone tasks may include lookup tables of prior examples, where an where an inference engine https://en.wikipedia.org/wiki/Expert_system, which is incorporated herein by reference, and https://en.wikipedia.org/wiki/Inference_engine, which is incorporated herein by reference, supplies priorities based on confidence level/likelihood. In some embodiments, this confidence level/likelihood can be obtained with a fuzzy-logic controller that is essentially an overlapping gain scheduler. Examples can be collected by clustering and data fusing data from multiple sensors, though it can also just be from one sensor. Deep learning and/or artificial intelligence, as later described, can be used to differentiate true objects and/or paths of concern from false alarms in the environment. Also, a similar approach can be used for troubleshooting/identifying operation, sabotage, and/or maintenance issues within a drone-vehicle system.

For example, this algorithm would allow a drone 10 to continue to navigate when GPS is scrambled or blocked in tunnels, under heavy tree growth, inside and among buildings, blocked by a vehicle, or blocked by a larger drone. See "DGPS/INS integration using neural network methodology," Ibrahim, et al., ICTAI 2000: 114-121 [-] 1990-1999. The Algorithm described in https://ieeexplore.ieee.org/document/4938730 "Detection of Mobile Machine Damage Using Accelerometer Data and Prognostic Health Monitoring Techniques," Getman et al., (2009), Paper #15026 in Computational Intelligence in Vehicles and Vehicular Systems, IEEE Workshop on CIVVS/SSCI '09, which is herein incorporated by reference, would allow a drone 10 to anticipate and/or detect damage to itself or others.

Algorithms may help a drone 10 determine unhealthy operation in any kind of repetitive combustion process in a vehicle 20, if drone 10 can sense the resulting vibrations or other disturbances to the machine itself or the surrounding environment. See "An Automated Network for Detecting Diesel Engine Misfire," Getman et al., Application of Modern Machine Learning Methods to Improving Performance and Efficiency of Automotive Systems, IEEE IJCNN, page 3017-3021, which is incorporated herein by reference, and https://ieeexplore.ieee.org/document/4371441, which is incorporated by reference, in which describes an easily online adaptive misfire algorithm is developed, capable of extrapolating to unforeseen engine speeds, similar yet different engines, and new combinations of misfiring cylinders. Proven, repeatable algorithms are used, with an eye on easy calibration for totally new engine types. Several methodologies are compared to this approach, at idle and with varying rpm, not only for accuracy, but also for portability and adaptability.

For additional adaptive control algorithms, see U.S. Pat. Nos. 5,761,626, 6,236,908, 6,272,426, 6,014,447, 6,314,342, 6,480,102, 6,658,355, 6,807,448, 6,811,515, 7,054,727, 7,058,488, 7,161,472, and 8,165,770, which are incorporated herein by reference, and U.S. Patent Publication Nos. 2004/0085196, 2007/0233361, and 2009/0093928, which are incorporated herein by reference, and "An SPN-Neural Planning Methodology for Coordination of two Robotic Hands with Constrained Placement," Bourbakis et al., Journal of Intelligent and Robotic Systems 19(3):321-337, (1997), https://link.springer.com/article/10.1023/A:1007985805475, which is incorporated herein by reference.

In some embodiments, the drone-vehicle system may be defined as the autonomous vehicle tractor and its sensors/controls/actuators/wheels, motors, and batteries; the drone 10 and its clamping components, flying mechanism, umbilical power cables, controller, communication systems, batteries, and charging system; any sensors and/or batteries that the drone 10 needs to temporarily uninstall/install off/on the trailer; the random trailers/flatbeds/other tractors/spare batteries that are to be transported, both on highway and off highway (some on bad surfaces, others in crowded environments); and the possible interaction with other tractor trailers, which might be automated, or human operated, including the drone's voice communications with a human tractor-trailer driver, or electronic communications with an automated tractor trailer.

As previously touched upon, the drone 10 may utilize one or more different types of scanners or sensors, such as radiation scanners or sensors. The radiation scanners or sensors may include one or more of light or sound scanners or sensors. The light scanners or sensors may employ visible light, UV light, or IR light. The sound scanners or sensors may employ audible sound, radio waves, or ultrasound. The drone 10 may also deploy sensors or scanners that can descend from a retractable line from the drone 10, such as to touch the top surface of a body of water (or lower into its depth). Examples of sensors are later described.

Drones 10 have great capabilities but may also have some constraints, especially drones 10 that work in tandem with vehicles 20. One constraint is self-preservation. Drones 10 are typically relatively small and have relatively light weight to maximize distance and carrying capacity including tools 12 and transport loads. The drones 10 may also have relatively fragile, exposed components, such as rotor blades, that may be subject to damage.

Also, although battery technology has been improving, especially the charge to weight ratio, drone operations are limited by the amount of weight and energy they can carry. For example, if the drone power source is a battery or fossil fuel, then the drone 10 should be configured to operate with the weight of these items; and, the weight of these items may significantly impact the amount of extra weight that the drone 10 can carry. These factors also influence how long a drone 10 can perform an operation before the drone 10 needs to return to a re-charging station (or refueling station). For purposes of this disclosure, a charging station 10 will be considered to include electrical energy and other types of fuel-based energy (including fossil fuels).

Occasionally, drones 10 may be caught with insufficient power to return to an external charging station 26. Drones 10 may also be caught in unexpected situations, such as storms or other situations that may prove dangerous to the drones 10. So, the drone 10 may need to find a safe location to land or to grip onto an object and potentially hide and/or re-charge away from the external charging station 26.

Self-energizing may be accomplished in a number of ways. For example, scientists Jun Yao & Derek Lovely of UMass Amherst, have recently unveiled "Air-gen," a generator that uses a natural protein to create electricity from moisture in the air. See https://www.goodnewsnetwork.org/device-uses-protein-to-generate-electricity-from-thin-air/, which is incorporated herein by reference. Accordingly, a drone 10 thus equipped with such a generator can be configured to acquire energy from the air. Drones 10 may also be equipped with solar cells. However, the flying configuration of the drones 10 equipped with these technologies may not provide sufficient energy generation to keep the drone 10 in the air efficiently or at all if dependent on simultaneous charging to supply the flying power. For example, solar panels may be configured to maximum surface area to maximize the capture of sun rays, but unlike solar planes, conventional drones are not configured with large flat surface areas during flight. Accordingly, a drone 10 as described herein can be configured to secure itself to a location, change its configuration to optimize remote charging to build a sufficient supply of energy to return to the external charging station 26, and then reconfigure itself for efficient flying to effect the return.

Because of their size, weight, and utility, drones 10 may make an attractive item for theft, especially when they are at rest, such as when a drone 10 may be performing a long term or stealth operation, when a drone 10 may be low on energy, and/or when the home vehicle 20 is parked. Similar opportunities can lead to a drone being vandalized.

For its protection, the drone 10 may have tools 12, such as appendages and/or clamps 76 that facilitate mounting the drone 10 in a hidden and/or protected location. Generic appendages can rest on, roll along, be swallowed up by, drill into, grip, melt into, fuse with, intertwine with, Velcro to, press against, repel from something else, hook, stick, magnetically attach, and/or chemically bond (then break off when no longer needed) to another surface, or with another drone in a series or cooperating cluster.

While hidden and/or protected, the drone 10 may capable of locating itself, such as via GPS bouncing a signal off of the ground surface 40 if the drone 10 is hidden under the vehicle 20. The hidden and/or protected drone 10 may be capable of extending an appendage to where sunlight can be intercepted for recharging. Ideally a vehicle 20 will be equipped to charge its drone 10 via conductive contact and/or wirelessly, as previously discussed. However, if the vehicle's battery is drained (purposely, or by accident), the drone 10 can actually charge the vehicle 20 just enough to allow it to start the vehicle engine, which can then run and charge both, as previously discussed. Also, if the recharging apparatus at the external charging station 26 on the vehicle 20 is not functional, or the drone 10 is borrowed by a truck or other vehicle 20 with no drone-charging capability, the drone 10 may benefit from the ability to charge itself, i.e., the drone 10 may benefit from having a self-energizing system as later described.

As extending an appendage for charging exposes the drone 10 to potential damage and/or theft, the drone 10 may benefit from being capable to sense a possible intruder and quickly retract (not unlike a tape measure). This drone capability can combine inexpensive and miniature motion, heat, infrared/visual, ultrasonic, height, pressure, and or sound sensors to trigger a retraction, using a cross correlation to cluster trained data and/or a database stored in its software.

See Engineering PhD Dissertation, "Diagnostic & Adaptive Redundant Robotic Planning & Control," Getman, Anya L, Binghamton University, Binghamton, NY, May 1995, which is incorporated herein by reference, and discusses redundant robot planning and control hierarchy, including: joint friction, mass, and stiffness diagnostic networks, including localized compensation to approximate ideal stiff robot, lifting object category networks, touch sensor neurofuzzy tip and slip control (adaptive to surface friction and shifting center of gravity), neural network task planning trained by stochastic Petri nets. See also "An SPN-Neural Planning Methodology for Coordination of two Robotic Hands with Constrained Placement," Bourbakis et al., J. Intell. Robotic Syst. 19(3): 321-337 (1197), which is incorporated herein by refernce.

Once the vehicle 20 is in motion, the priorities of the drone 10 shift to those of a proactive drone 10 in a proactive state. The position of the drone 10 and its attachment to vehicle 20 when not flying ahead may also shift. The specific tools 12, including appendages and sensors, of the drone 10 may be re-positioned to be more accessible or prioritized for flying operations.

The drone 10 may prioritize where it is most useful. This prioritization can be a direct command from the driver and/or vehicle's controller, or it can be from the drone's own perception of greatest threat. As previously discussed, and with possible assistance of trajectory software (from route planning like Waze, to localized path planning and obstacle avoidance), the drone 10 may fly ahead to: block another vehicle from colliding with its assigned vehicle 20; get a closer look at the road surface ahead; attempt to flush out or deter wildlife from crossing the roadway; to travel down a blind alley to see if its assigned vehicle 20 can turn around or leave once entering; or attach itself at the highest possible point on the vehicle 20 to determine whether or not there is sufficient overhead clearance for the vehicle 20 (facing a bridge, tunnel, parking garage, or the underside of a tractor trailer that is not being properly recognized as such).

As previously discussed, active sensors and passive stereo sensors are often challenged with a lot of signal scatter when observing an object at an oblique angle. Successful and useful filtering of this scatter can be complicated and slow. It is therefore beneficial to place sensors as close to the same elevation from the ground as the object being sensed. In the case of an overpass, for example, it is beneficial to mount the sensor as high up on the vehicle 20 as possible. This location is often precarious for the drone 10, with non-ideal attachment points, airflow, and exposure to weather, thrown gravel, and other debris.

The drone 10 therefore may benefit from the ability to rearrange its appendages from a concealed state, such as stationed underneath the vehicle 20, or inside of a protected space, where it may use suction and/or magnetism and/or push outward to stay tight inside its space, where it might avoid theft and/or vandalism, to a proactive state.

In a proactive state, the drone 10 may rearrange its tools 10 such as appendages and sensors, to positions, orientations, and accessibility that facilitate or maintain stable attachment, such as by clamping, magnetism, and/or suction and facilitate or maintain stable sensor position and orientation. The piezo actuation capabilities as later described that allow for extension and retraction and for solar scale deployment and tilt can also be used for real time sensor jitter and bounce compensation, not unlike the head of a chicken while its two legs bounce its body along the ground. See https://www.youtube.com/watch?v=LEGZ7hGaMNI and https://www.youtube.com/watch?v=UytSNIHw8J8, which are incorporated herein by reference. Technology to accomplish similar stabilization is available in the Fuji triple-stabilized X-S1; and, Mercedes has Ride quality: MAGIC BODY CONTROL with improved and now with CURVE function. The S-Class made a technological statement of superiority in 2013 with ROAD SURFACE SCAN. The system detects bumps ahead of the vehicle and adjusts the ACTIVE BODY CONTROL suspension accordingly. In the new S-Class this suspension control is further improved: The stereo camera of the system now scans the road even more thoroughly, even in dusk and at speeds up to 180 km/h. Another comfort enhancement is the CURVE curve-tilting function, available in the S-Class Saloon for the first time. The body tilts to the inside of the turn by up to 2.65 degrees and thereby reduces the centrifugal forces perceived by the passengers. The drone 10 can use this technology in several ways, such as for more stabilized recordings, more accurate placement of tools, better flight control, etc.

In this regard, the drone 10 may incorporate a piezoelectric skin and/or one or more piezoelectric substructures. Piezoelectric actuators may convey a variety of types of movement. Piezoelectric cells can change dimensions when an electric potential is applied. They are commercially available in stacks of thin layers that extend when voltage is applied to them. They can provide a variety of types of motion, including lateral motion or bending motion See https://www.youtube.com/watch?v=fHp95e-CwWQ, which is incorporated herein by reference. They can provide motion like that of a centipede or snake for locomotion. See https://www.youtube.com/watch?v=i4hORCb2sfs, which is incorporated herein by reference.

Figure 9:
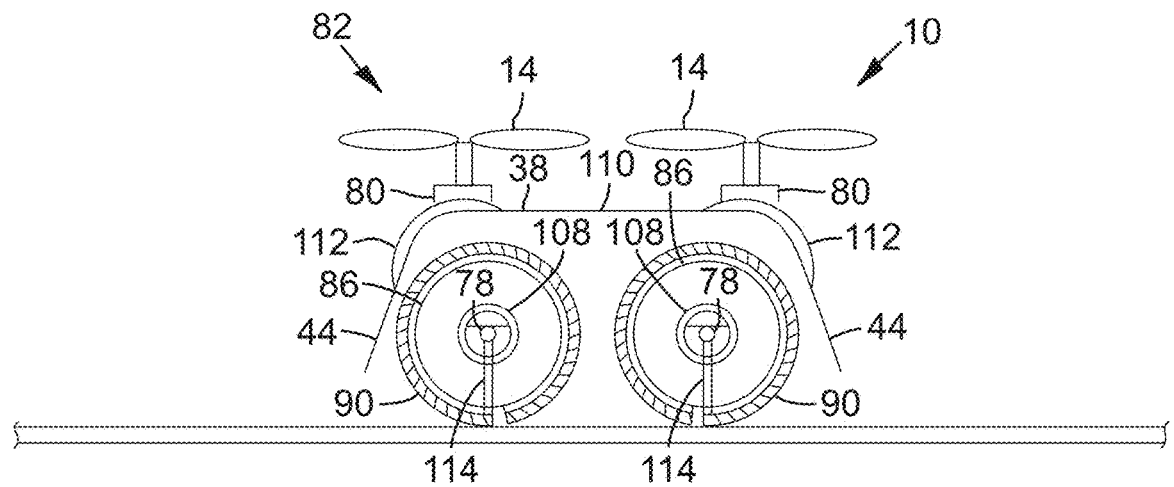
FIG. 9 is a sketch of a piezoelectrically configurable drone shown in a condensed configuration.
Figure 10:
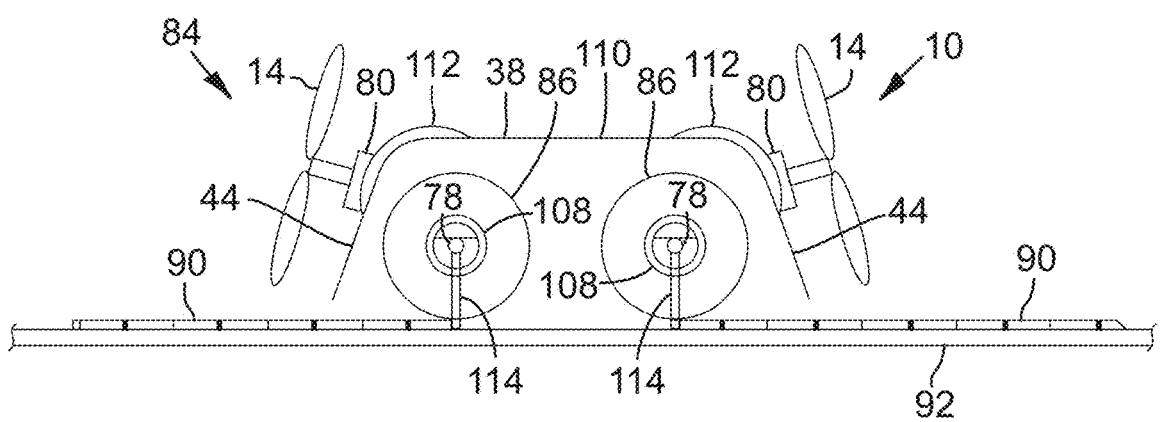
FIG. 10 is a sketch of a piezoelectrically configurable drone shown in an expanded configuration.

FIG. 9 is a side view of an example of a piezoelectrically configurable drone 10 shown in a retracted, compact, or condensed configuration 82 such as for flying, spying, or hiding; and FIG. 10 is a side view of an example of a piezoelectrically configurable drone 10 shown in an expanded configuration 84 for self-energizing. With reference to FIGS. 9 and 10, in some embodiments, the drone 10 has a tool 12 and/or substructure 86, such as a roller drum with an optional geared motor or piezoelectric actuator, that cooperates with one or more actuated strips 90 (e.g., piezoelectric strips, such as https://piezodirect.com/strip-bending-actuators/, which is incorporated herein by reference) that may coil up to fly or to preserve or defend itself. However, the actuated strips 90 may spread out flat to fit on a support surface 92, such as a windowsill or on a vehicle upper surface 18 or on external charging station 26 (so that the drone 10 can wirelessly charge) or under an overhang where the drone 10 can stay dry, or atop a fence or along the back of a metal shelf where the drone 10 can hide. For example, some embodiments may employ a strip-ending actuator that coils up like a snake or like a snake with each joint a piezoelectric actuator.

When the drone 10 lands, the actuator strip 90 may stretch out to get sunlight, as the actuator strip 90 may employ or support a solar array 94 of solar panels or solar cells 96 to enable the drone 10 to self-energize and obtain enough energy to fly away after performing the drone task, such as traffic control or spying. One will appreciate that that non-piezoelectric actuated strips can alternatively be employed and that the strips 90 may be deployed by actuator mechanisms that are not integrated into the strip itself.

However, in another embodiment, piezoelectric actuator strips 90 and/or piezoelectric fabrics can be used to deploy one or more solar arrays 94 in suitable positions for remote charging. Lightweight, thin flexible solar arrays (or solar films) are available from PowerFilm Solar, Inc. and can be modified to work with the piezoelectric actuator strips 90. These solar arrays 94 can be relatively flat and roll out like a sheet of paper as pushed or pulled by and actuator or actuator strip 90 (like the tape from a tape measure), or they can be pushed or pulled from a folded and rolled condition.

Figure 8A:
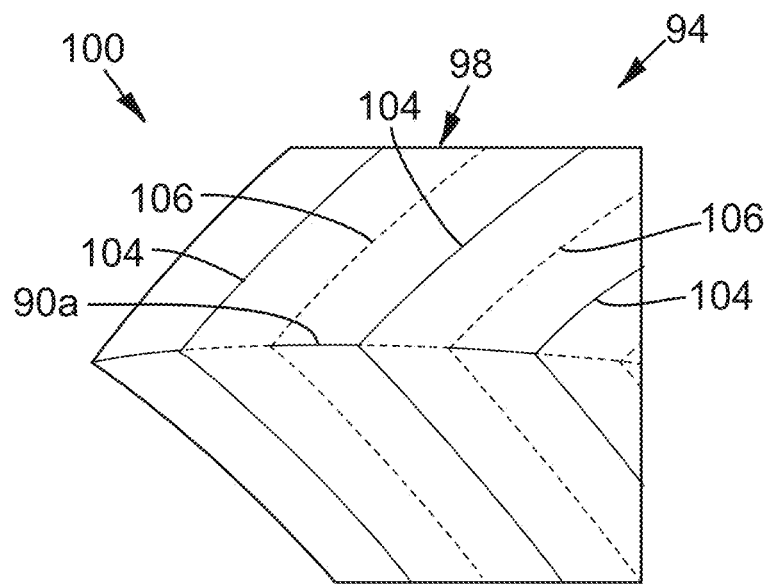
FIG. 8A illustrates an example of a crease pattern in a solar material that can be deployed on a drone.
Figure 8B:
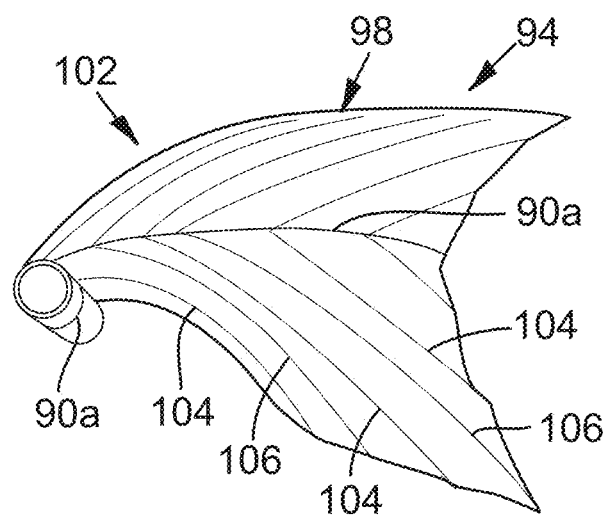
FIG. 8B illustrates an example of folding a solar material that can be deployed on a drone.

FIG. 8A illustrates an example of a bendable solar array 94 exhibiting a crease pattern 98 in open or slightly folded configuration 100 with ridges 104 and bottoms 106 laterally displaced, and FIG. 8B illustrates the bendable solar array 94 exhibiting a crease pattern 98 in a more significantly folded (with ridges 104 and bottoms 106 laterally closer together) and partly rolled configuration 102. See https://pdfs.semanticscholar.org/d703/9c7a2b6eb8fff98cd19085fc210cd5e5a603.pdf, which is incorporated herein by reference, and https://gizmodo.com/nasa-is-working-on-origami-solar-arrays-that-unfurl-in-1622328583, which is incorporated herein by reference, for more detail regarding implementation concepts on foldable packaging.

With reference to FIGS. 8A, 8B, 9, and 10, an actuated cable 90a can be substituted for the actuator strip 90. The actuated cable 90a may employ piezoelectric actuators, itself, or the actuated cable 90a can be pulled by an optional actuator or motor 108 connected to an optional tool 12 or appendage 114. The motor 108 and/or the substructure 86 may rotate around an axis or axle 78 that may be connected to the appendage 114. As the actuated cable 90a is extended out from a rolled condition, the ridges 104 and bottoms 106 spread apart laterally; and, as the actuated cable 90a is retracted into the rolled condition, the ridges 104 and bottoms 106 laterally narrow to permit rolling. The piezoelectric actuators may also provide resonance to keep vibrating until the solar array 94 is fully deployed or collapsed back down (like ruffling of feathers). For examples, see https://arxiv.org/ftp/arxiv/papers/2002/2002.08166.pdf, which is incorporated herein by reference, https://res.mdpi-.com/d_attachment/applsci/applsci-10-03771/article_deploy/applsci-10-03771-v2.pdf, which is incorporated herein by reference, and https://www.mdpi.com/2076-3417/10/11/3771/htm, which is incorporated herein by reference (same paper), https://www.mri.psu.edu/mri/research-capabilities/traditional-research/polymeric-systems/polymer-nanocomposites, which is incorporated herein by reference.

Figure 13:
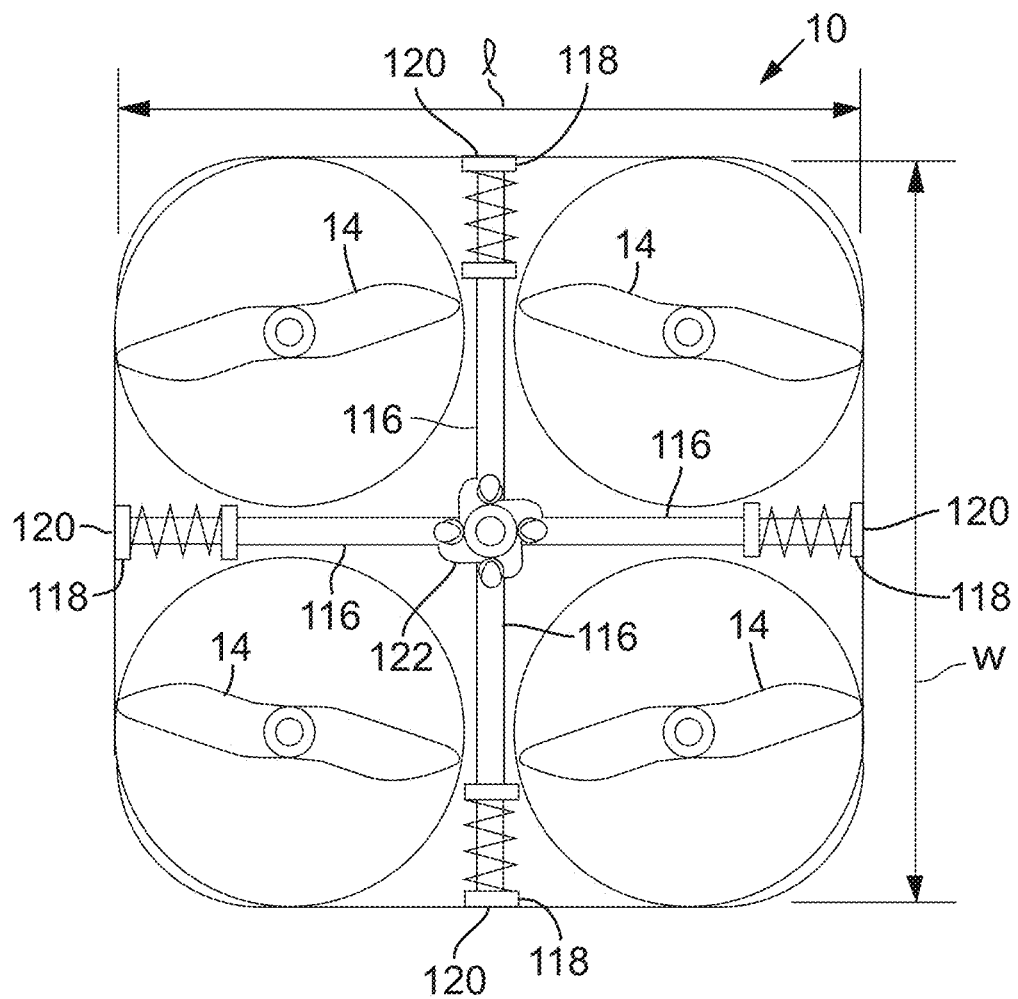
FIG. 13 illustrates another embodiment of a drone in a compact configuration.
Figure 14:
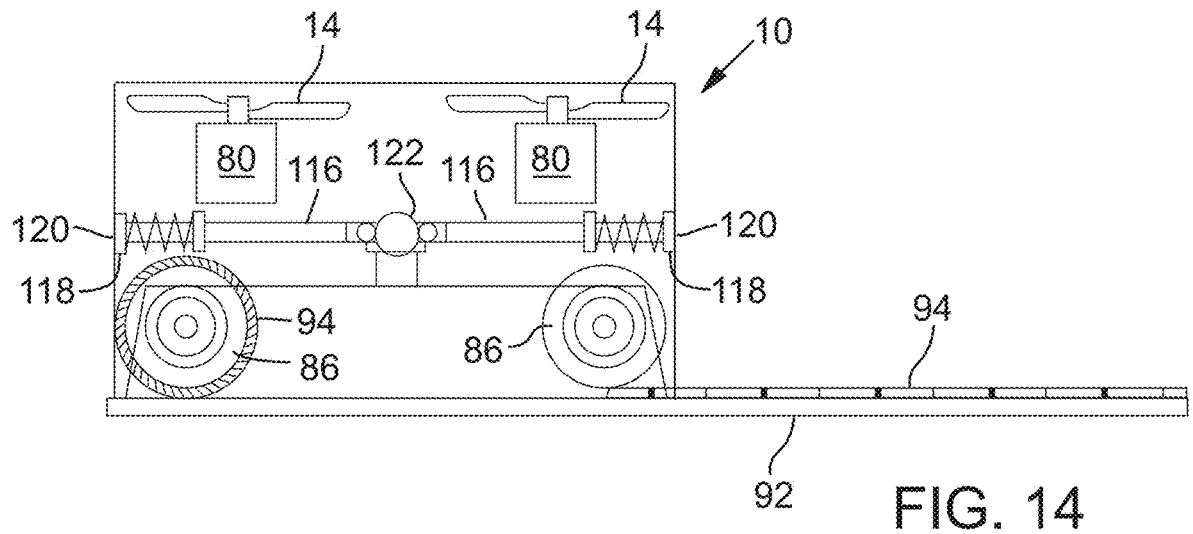
FIG. 14 is a side view of a drone, illustrating a solar cell array in an extended state and a solar cell array in a retracted state.
Figure 15:
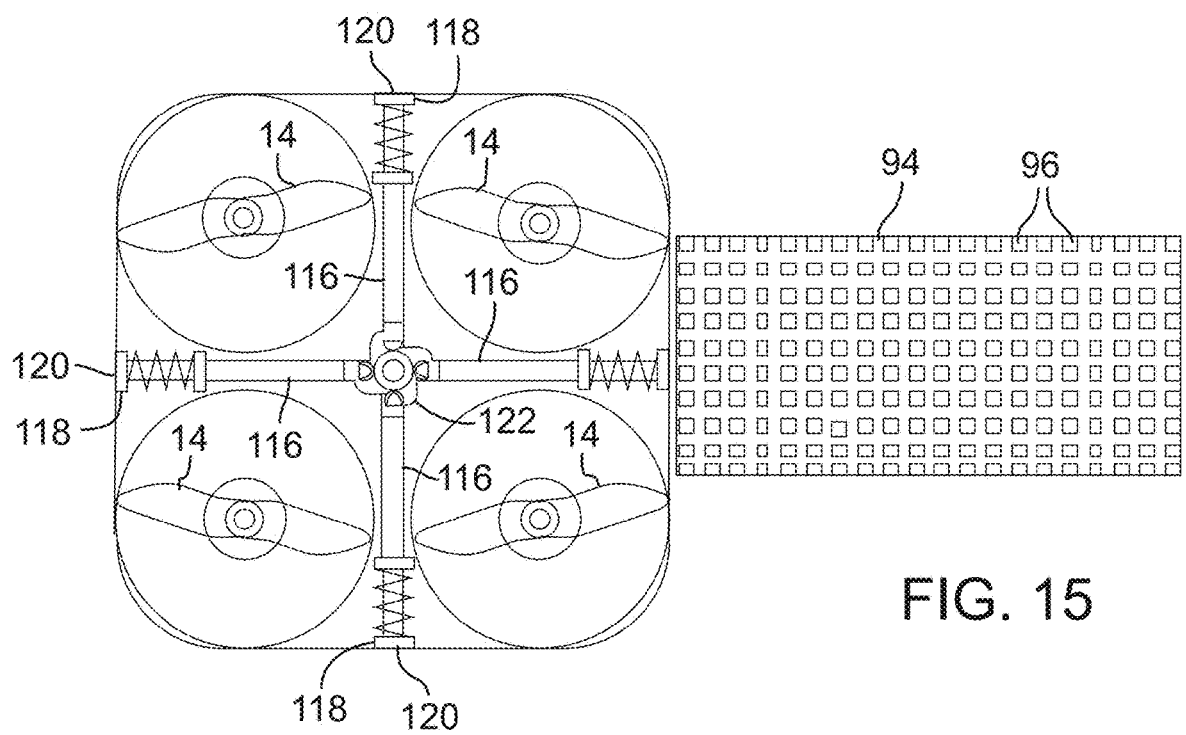
FIG. 15 is a top view of a drone, illustrating a solar cell array in an extended state.
Figure 16:
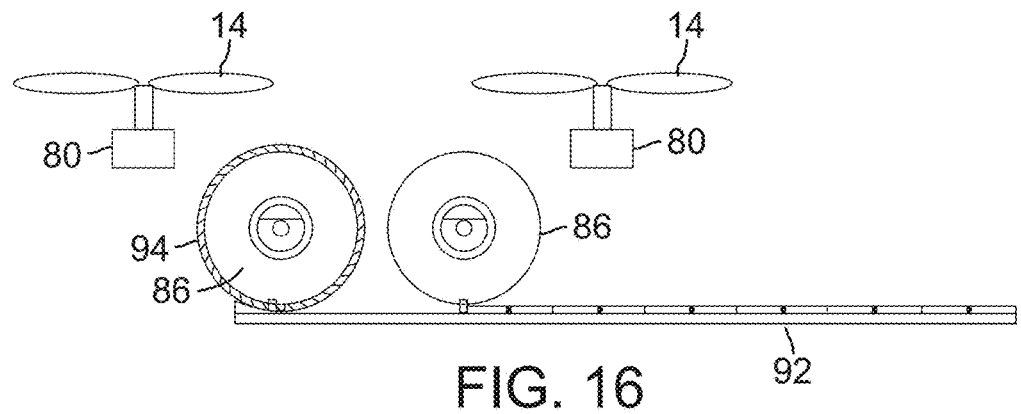
FIG. 16 is a simplified side view of at drone (with parts removed), illustrating a solar cell array in an extended state and a solar cell array in a retracted state.

FIG. 13 illustrates another embodiment of a drone 10 in a compact configuration 82; FIG. 14 is a side view of the drone 10 with a solar cell array 94 in an extended state and a solar cell array 94 in a retracted state; FIG. 15 is a top view of the drone 10 with one of the solar cell arrays 94 in an extended state; and FIG. 16 is a simplified side view of the drone 10 (with parts removed) with one of the solar cell arrays 94 in an extended state.

With reference to FIGS. 13-16, in some embodiments, the compact configuration of the drone 10 may be relatively small, such as less than or equal to six inches per length 1 and width w, especially with the rotors 14 tucked in. The height may also be very small, such as less than or equal to twelve inches.

The drone 10 may employ little extendible and retractable claws, stickers, and/or suction cups (any tool 12 or combination of tools 12 that may be positioned along additional actuator strips 90 or other structural components such as appendages 116 (e.g. cam arms), so that the drone 10 can attach to multiple surfaces along different sides 44 of the drone 10 and/or at different angles to the drone 10. One will appreciate that the particular appendages 116, gripping mechanism, gripping angles, and gripping elevation may be the same or different. Examples of gripping mechanisms include a magnet 118 that may be covered with a rough rubbery gripping surface 120 or a rubbery suction cup, such as for attaching to a smooth surface such as glass. An extension cam 122 may be employed to lock the appendages 116 with their gripping surfaces in place to provide a compression form of attachment. The cam 122 may for example lock with a 90-degree rotation. Piezoelectric actuators or other motors may be employed to extend the appendages 116 and/or lock the cam 122.

Figure 17:
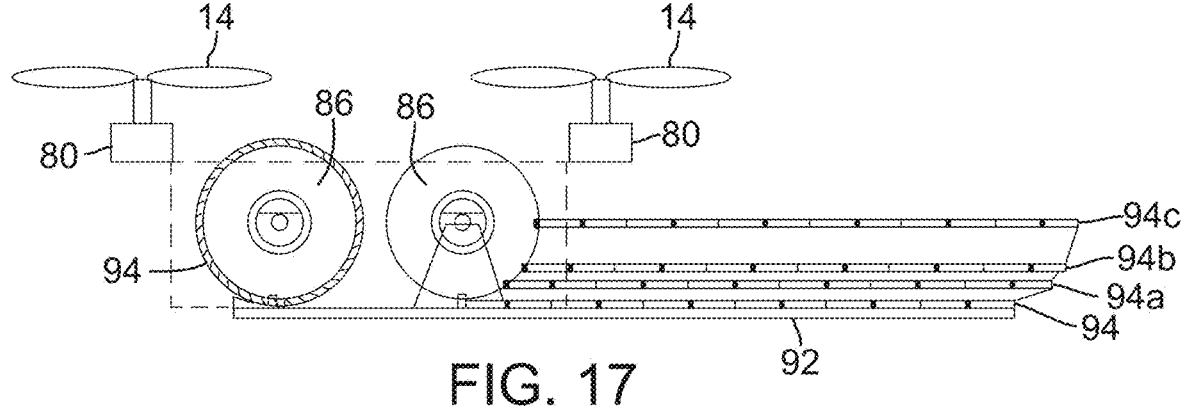
FIG. 17 is a side view of a drone, illustrating a solar cell array in alternative extended state tilt positions.

FIG. 17 is a side view of a drone 10, illustrating a solar cell array 94 in alternative extended state tilt positions 94a, 94b, and 94c. The drum substructure 86 may rotate or actuator strips may move the solar array 94 in a fully expanded configuration 84. Further rotation of the drum substructure 86 or movement of the actuator strips will raise the edge of the solar array 94 nearest the drum substructure 86 into one or more of the tilt positions 94a, 94b, or 94c. These tilt positions 94a, 94b, and 94c may be preset or they may be variable. Sensors on the drone 10, may detect the angle of the sun or direction of a different light source, and the data collected may be used to determine the most appropriate tilt position 94a, 94b, or 94c.

Figure 18:
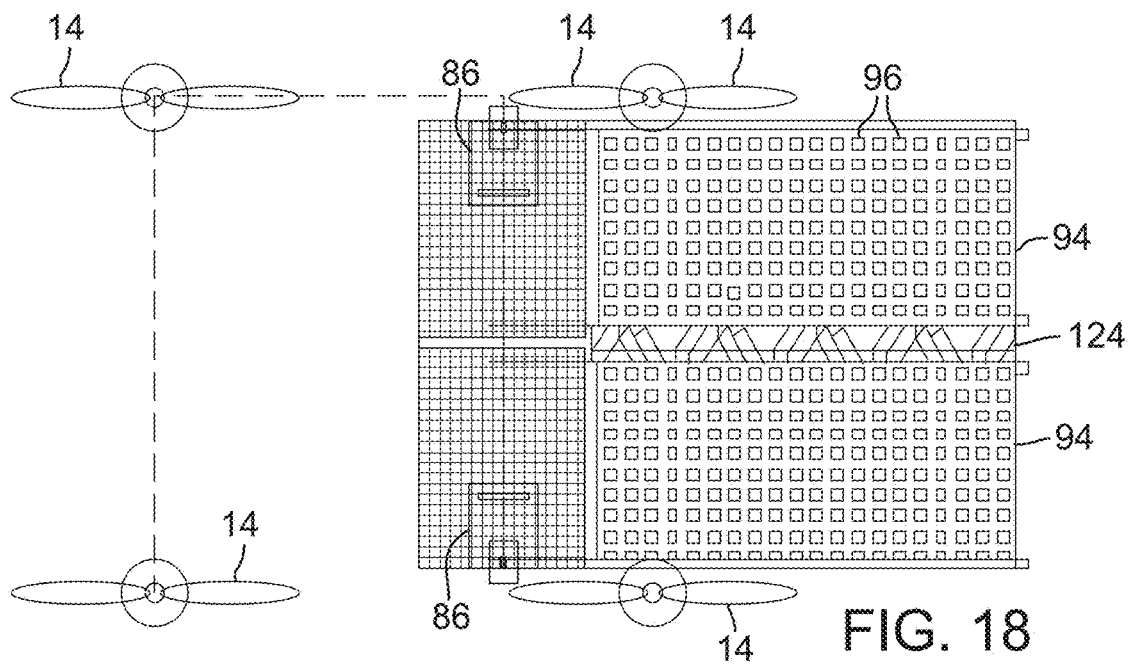
FIG. 18 is a top view of a drone, illustrating a double-wide solar cell array in an extended state.

FIG. 18 is a top view of drone 10 having a double-wide solar cell array 94 in an expanded configuration 84. With reference to FIG. 18, two solar arrays 94 may be connected through a flexible joint 124. The solar arrays 94 may be moved around a drum substructure 86 by a motor or the flexible joint may be connected to or incorporate actuator strips. The solar arrays 94 may lay relatively flat, or they can be angled at the same or different angles to maximize light absorption.

In another embodiment, the drone 10 may be configured to support a solar array 94 on the upper surfaces of the drone body 110. In such configuration, the drone 10 may be able to re-charge while it is flying. Alternatively, the drone 10 may be configured to support a cassette on the upper surfaces of the drone body 110. The cassette may contain one or more solar arrays that can be deployed when the drone 10 is at rest.

The drone 10 may have a body 110 or a skin that incorporates one or more piezoelectric strips or piezoelectric fabrics, such as along its upper surface 38 or its sides 44. Using the piezoelectric components, the drone 10 may be able to configure its shape, such as contract to minimize its noticeability along an edge, move to an optimal flying position, or move to a defensive position.

A drone 10 may even be configured to change shape while flying. See https://robohub.org/a-new-drone-can-change-its-shape-to-fly-through-a-narrow-gap/, which is incorporated herein by reference. Piezoelectric actuators can accomplish these changes faster, more substantially, and with less weight. Propellers (rotors 14), feet, and other features may be positioned along the length of the piezoelectric strips. Various sections can be added end-to-end based on function and the final size of the drone 10. Piezoelectric actuators may be employed to move or rotate supports 112 for the rotors 14 or their motors 80. Although not depicted, the rotors may be positioned so that one or two blades 126 may rest against a deployed solar array 94 to help keep it from rolling up during deployment.

Figure 11A:
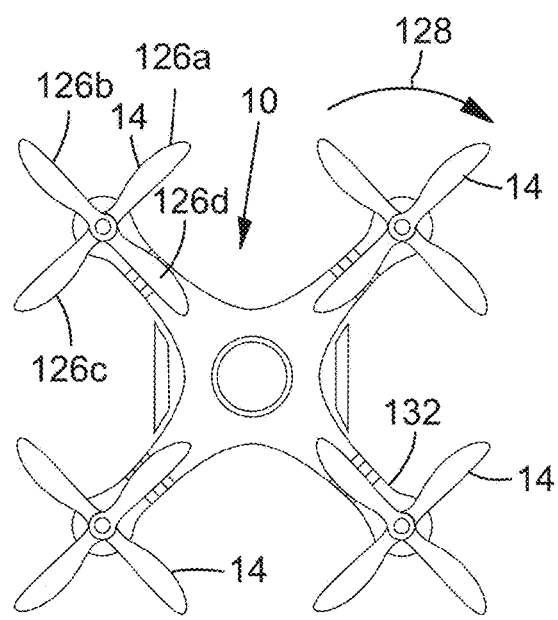
FIG. 11A illustrates a drone with four blades per rotor.
Figure 11B:
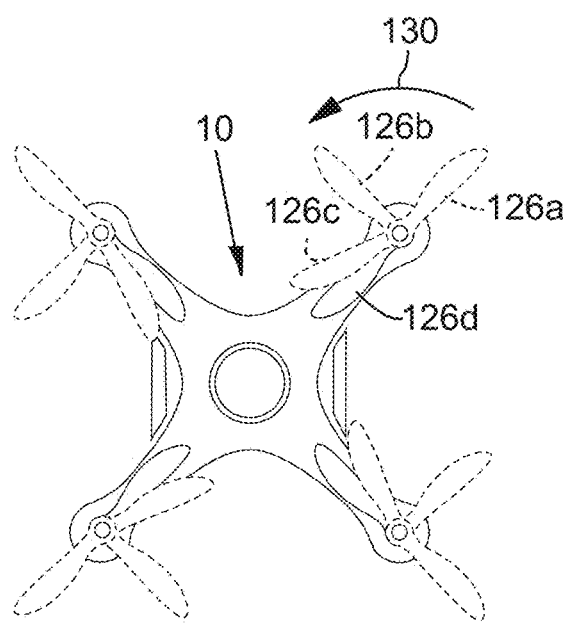
FIG. 11B illustrates how the blades may be spirally retracted for protection.
Figure 11C:
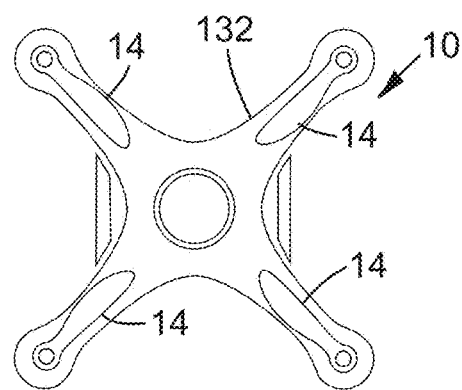
FIG. 11C illustrates how the blades can be stacked for maximum protection.

FIG. 11A illustrates a drone 10 with four blades 126a, 126b, 126c, and 126d (collectively blades 126) per rotor 14 that may have a lift spin direction 128 to provide lift. FIG. 11B illustrates how one or more of the blades 126 may be spirally retracted for protection by reversing the spin direction of the motor 80 so that the blades 126 move in a retraction spin direction 130. The most exposed blade 126a can be retracted, or all of the blades can be retracted. The blade 126d may have a preset stop location over the drone arm 132 in the retraction spin direction 130. FIG. 11C illustrates how the all blades 126 can be stacked over the drone arm 132 over or under the blade 126d for maximum protection. Spinning the blades 126 in the lift spin direction 128 may return them to their preset lift spacing.

In addition to being capable for scouting out a path and other navigational applications and surveillance applications, the drone 10 may be good for traffic control and for performing repair and other operations, as previously mentioned. For example, some embodiments of the drone 10 may be capable of aim lasers, diodes, and/or LEDS to sense, touch, observe, place markings, weld cut, or flash. In particular, piezoelectric actuators have been used to aim and focus laser light. See https://www.pi-usa.us/en/tech-blog/laser-beam-focus-control-in-cutting-welding-applications-with-high-speed-deformable-mirror/, which is incorporated herein by reference. A drone 10 may block a lane and flash colors to warm drivers of a problem until emergency personnel arrive. A drone 10 may position itself above a malfunctioning traffic light and flash appropriate signals of the correct color, such as red, green, or yellow.

A piezoelectrically-enhanced drone 10 may have a variety of functionality. Piezoelectric technology may be adapted to help a drone 10 perform many of the previously discussed tasks or operations, including but not limited to sensing, grabbing, clinging, hanging, injecting, spraying (lubricants for maintenance, repellents for insects or pit bulls), lighting, and lasing). A drone 10 may employ a large number of piezoelectric actuators or amplify the effect of one or more actuators for a more significant effect.

The drone 10 can swap its own end effectors. See https://www.therobotreport.com/robotic-piece-picking-more-flexible-ai-enabled-adaptive-tooling/, which is incorporated herein by reference. XYZ's vision-guided tool changer can swap out end effectors in about half a second. The drone 10 may employ this technology. For vision, the time to identify the piece picking points is 0.1 sec. with VGA, and at 720p, it is 0.3 see. In addition, the tool changer has locating pins, so the robot knows the gripper is engaged in a specific orientation. XYZ Robotics uses a combination of standard and custom end effectors with its tool changer. A suction cup may come from off-the-shelf vendors, but the bag cup may utilize the XYZ design. The XYZ grippers are driven by vacuum, but there are many kinds of commercially available grippers—some, like Schunk, are electric, and others are pneumatic, like SMC's A two-fingered soft vacuum gripper ca n be used for picking items that are not graspable by suction cups, such as lipsticks, measuring spoons, and screwdrivers. Moreover, the work tools 12 can be changed quickly and easily in a manner of seconds, See https://en.wikipedia.orgF/wiki/Quick coupler, which is incorporated herein by reference.

Examples of motors 108 may include piezoelectric actuators that can operate down to the size level of nanometers for precise control. Piezoelectric actuators are well suited for applications associated with a drone 10. Piezoelectric materials can cause mechanical movement in response to electrical stimulation, and they can create electrical charge when mechanically stressed. Moreover, piezoelectric materials can also be used as sensors to measure changes in pressure, acceleration, temperature, strain, or force by converting them to an electrical charge. Piezoelectric actuators can change dimensions when an electric potential is applied, and they can provide a variety of types of motion, including lateral motion or bending motion. They are commercially available in stacks of thin layers that extend when voltage is applied to them.

The motors 108 may operate based on a range of drive types. One drive technique uses piezoelectric ceramics to push a stator. These piezoelectric motors 108 are basically stepping motors and are also known as "inchworm motors." Another type of drive force for employs piezoelectric motors 108 that produce surface acoustic waves to generate a linear or rotational motion. A version of a direct drive mechanism for these nanometer-sized motors, include piezoelectric elements bonded orthogonally to a nut, such as for a squiggle motor. The ultrasonic vibrations from these motors 108 can rotate a central lead screw.

In particular, piezoelectric motors 108 may produce forces up to 1000 Newtons (N), may have sub-nanometer (nm) resolution, and may be are self-locking. Some piezoelectric motors 108 operate by producing ultrasound at 1 um/sec to 500 mm/sec, with fast step and settle mechanisms. These types of piezoelectric motors 108 can be applied for linear and/or rotary motion, or the ultrasound vibrations themselves may be useful for some applications.

Some piezoelectric motors 108 have 20 nm resolution with position encoders. Some piezoelectric motors 108 may act as mini-rods with nanometer resolution, sensor options, and application of 10 N force.

The motor 108, whether piezoelectric or not, may be employed to activate or actuate one or more drone tools 12, such as a grasping tool, a piercing tool, or a scraping tool. A grasping tool may be configured as a tweezer, or pliers, and/or with forked or hooked teeth to allow for firmly grasping a targeted branch or twig. They may be spring based and retractable. These capabilities may be provided by piezoelectric actuators as previously discussed or by other types of micromotors. Piezoelectric tools 12 may be able to bend, grab, or ratchet. A forceps-like actuated grasping tool is described in U.S. Pat. No. 6,322,578 of Houle et al. This forceps-like device could be modified by employing small enough piezoelectric actuators to function as a drone tool 12.

Some embodiments for manipulating drone tools 12 may incorporate recent advances in robotic technology. See https://www.ncbi.nlm.nih.gov/pubmed/17406589 and https://www.ncbi.nlm.nih.gov/pubmed/10099992). Piezoelectrically driven grasping, injecting, and piercing tools can also be robotically controlled.

In some of these protocols, a piezoelectric micromotor effects crystal deformation in response to an externally applied voltage. This results in propelling a microinjection needle tip forward in a precise and rapid movement.

Alternatively, or additionally, a drone tool 12 can be configured to emit a sound from electrostatic or piezoelectric speakers. The sounds may be in the human audible range, ultrasonic, or in the radio-wave spectrum. Resonance mode and sound pressure may be produced by circular diaphragms of electrostatic and piezoelectric speakers. Examples of how these sounds are produced from electrostatic or piezoelectric speakers are described in https://www.sciencedirect.com/science/article/abs/pii/S0003682X17302712, which is incorporated herein by reference, https://www.american-piezo.com/standard-products/buzzers.html, which is incorporated herein by reference, and https://www.edn.com/piezoelectric-driver-finds-buzzers-resonant-frequency/, which is incorporated herein by reference.

Piezo buzzer actuation can be used to continue to resonate the clamps 76 until their entire contact surface has uniform friction (as measured by translational and/or rotational slip) and/or the solar scales or arrays are fully deployed or ruffled back into a flattened state for retraction and storage. See https://www.edn.com/piezoelectric-driver-finds-buzzers-resonant-frequency/, which is incorporated herein by reference. When a buzzer's resonant frequency is achieved, which might shift due to changes in the drone 10 and/or its mounting surface and/or its payloads, the buzzer may greatly multiply its amplitude, which will speed up response time. See https://www.piceramic.com/en/piezo-technology/generating-ultrasound-with-piezo-components/, which is incorporated herein by reference.

When fixed to a metallic diaphragm and excited with an alternating voltage, the diameter of the disc varies by a small amount, this causes dishing of the diaphragm which gives a much louder sound. One can extend the concept of diaphragm dishing beyond that of a speaker or buzzer. One can activate a suction cup, a tiny valve, a tiny lever, a tiny drill by a tiny turn, a tiny plunger, a tiny scraper, a tiny scratch awl to weaken a glass surface, or even pull a tiny incremental vacuum. When the drone 10 has a long period of time to act, with a small but steady source of power, and it needs to be quiet, it can very slowly fix and/or weaken something that it is interacting with, such as bugs or rust.

Piezoelectrically actuated ultrasound allows for a car smaller package that is more readily transported by a small drone 10, and/or a drone 10 that is carrying a plethora of sensor technologies. Ultrasound most optimally performs when the sensor is touching the surface of the object it is analyzing, so this technology is ideal for determining characteristics of a surface that the drone 10 has just landed upon. See https://www.intechopen.com/books/piezoelectric-materials/piezoelectric-materials-in-rf-applications, which is incorporated herein by reference. This piezo technology allows the drone sensors to do their own adaptive filtering and switching in real time, allowing for potential dual use of the actuators already on board for other purposes.

Piezoelectric technology may also be employed to help charge the drone 10. For example, textiles woven with piezoelectric wires can generate power when pressed or twisted. See http://theconversation.com/dead-battery-charge-it-with-your-clothes-26097, which is incorporated herein by reference. The drone 10 may acquire energy in response to wind hitting it surfaces. Such energy may be sufficient to support ongoing operation of electronics, for example.

Moreover, a piezoelectric material can also be used to measure changes in pressure, acceleration, temperature, strain, or force by converting them to an electrical charge. Because a piezoelectric mesh can generate an electric charge when placed under mechanical stress, a piezoelectric mesh can be used to sense the force. If the locations from where the electrical charges originate is known, then the sensed force can indicate the strain on an object interacting with the piezoelectric mesh. In other words, a properly configured piezoelectrically enhanced drone 10 may provide information beyond what is available to imaging and image sensing techniques.

Like the drone 10 itself, piezoelectric actuators can be robotically controlled. See https://www.ncbi.nlm.nih.gov/pubmed/17406589, which is incorporated herein by reference, and https://www.ncbi.nlm.nih.gov/pubmed/10099992, which is incorporated herein by reference. Piezoelectric actuators or a piezoelectric adaptive mesh can be controlled by a piezo master controller or a drone master controller. The master controller may operatively communicate to a user interface through wireless connection, such as previously mentioned. Examples of a user interface include a smart phone or other electronic device with or without a virtual assistant.

The piezoelectric actuator or piezoelectric adaptive mesh or its master controller may operatively communicate with a trainable artificial intelligence (AI) system. The trainable AI system may comprise one or more of a neural network, a probabilistic technique such as Bayes or Markov algorithm, a kernel method (like SVM, decision trees/random forest, Gaussians, PCA . . . ), reinforcement learning that can have nothing to do with artificial neural networks, artificial reasoning a.k.a. "good old fashioned AI," many path-planning and intelligent control-systems methods that correspond to "classical AI" (not the same as GOFAI), Alife (swarms, cellular automata . . . ), agents and chaos systems, and/or any algorithm or group of algorithms that optimize a value function (reinforcement learning and linear dynamic programming).

The trainable AI system can make constant adjustments in real time with or without user input. A user can choose settings through the master controller and the trainable AI system can readily respond to known and unknown situations, and in some cases provide predictive instructions to the piezoelectric actuators.

The piezoelectric adaptive mesh can be utilized as a single layer mesh or as a multiple layer mesh. Each piezoelectric fiber can act as both a sensor and an actuator. Alternatively, the piezoelectric adaptive mesh can be controlled so that the weft acts as sensors and the warp acts as actuators or vice versa. The fiber acting as sensors and actuators can, however, be equally distributed between weft and warp. In yet another embodiment, each mesh layer can be operable to act as either a sensor layer or an actuator layer. One will appreciate that the trainable AI system can modify the location and distribution between sensor and actuator at any time.

Piezoelectrics have many benefits and are used in a host of applications. Piezoelectric devices are small, fit better on small drones 10, and are great for small movements where high accuracy is critical to avoid detection or making a noise. With their thin form factor, they can convert mechanical energy (motion) to electrical energy for sensing or energy harvesting. Converting an electrical signal into motion/force for actuating, such as providing haptic feedback. The piezoelectric transducer has good frequency response. Piezoelectric structures are available in desired shapes, have rugged construction, have negligible phase shift, and offer high output that be measured in an electronic circuit.

Many piezoelectric actuators in a mesh can allow for fairly large objects to be manipulated by a small drone 10 with a limited battery. The large movements often require a large amperage. The capabilities of piezoelectric devices in a mesh are disclosed in U.S. patent application Ser. No. 16/837,071, which is herein incorporated by reference. These capabilities can be used by a drone 10 to do things in dangerous hard to access places (such as where police or fire departments conventionally send robots); however, drones 10 can enter at higher and or smaller access points where robots can't go.

The drone 10 may also have all the functionality of a medical scanning device such as described in U.S. patent application Ser. No. 16/836,704, which is herein incorporated by reference.

In some embodiments, the tool 12 may be configured as an insulation application assembly 150 for applying insulation to a power line that has been established or deployed. For purposes described in the context of power lines, the terms "established" and "deployed" may be interpreted to mean a power line at its relative position of use between two locations.

Figure 19:
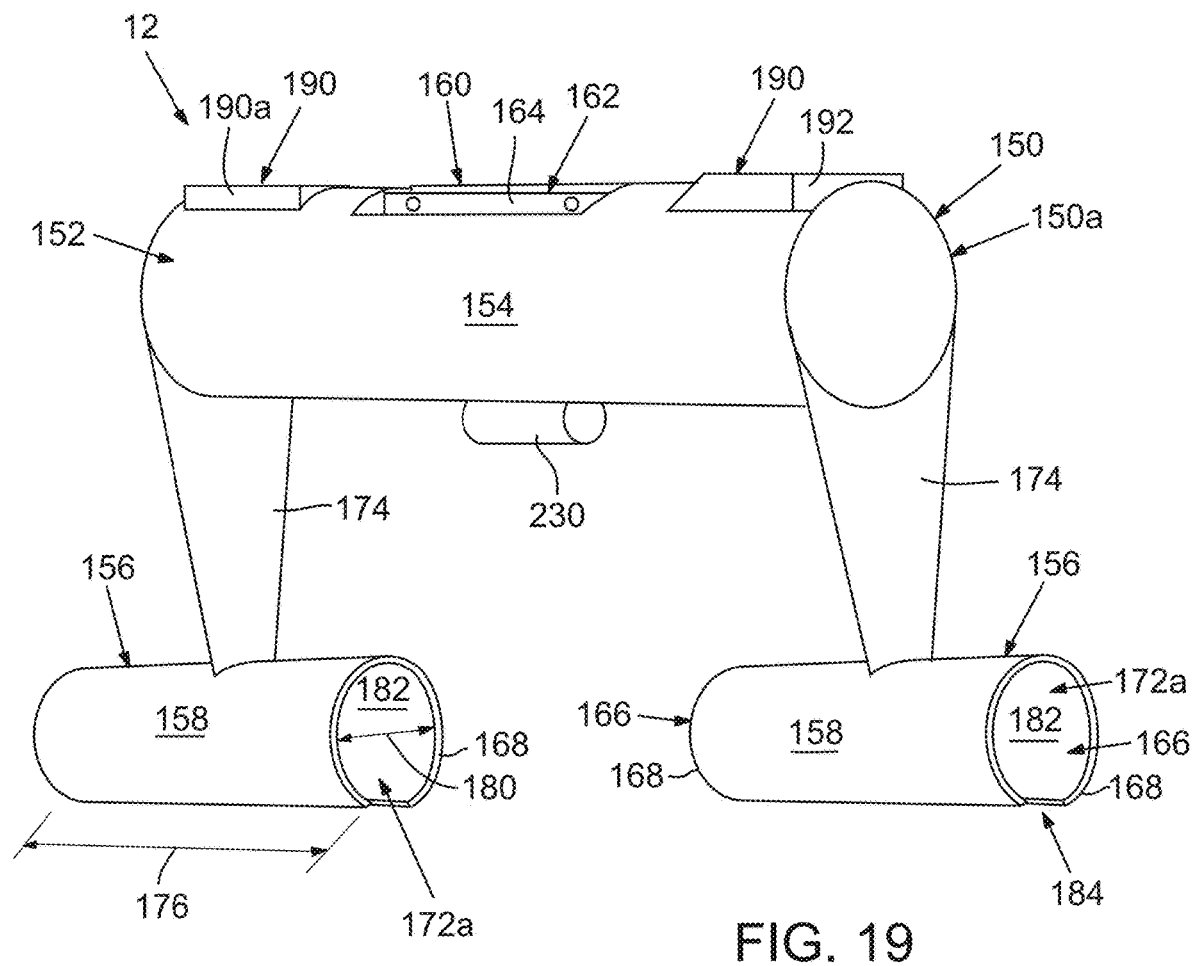
FIG. 19 is a side elevation view of an insulation application device that includes an insulation storage tank and an open-ended enclosure.

FIG. 19 is a side elevation view of an embodiment of an insulation application assembly 150, such as insulation application assembly 150*a*, that includes insulation storage 152, such as a storage tank 154, and one or more open-ended enclosures 156, such as cable covers 158. With reference to FIG. 19, the insulation application assembly 150 may be employed to apply electrically insulating material via a drone 10 or an insulated pole (not shown) from the ground. The insulation application insulation application assembly 150 can be easy to use and ready to deploy by a certified utility electrician, a park ranger, an animal rescue volunteer, or any other person having a minimal knowledge of how to avoid electrocution (e.g., being familiar with a tutorial on why most birds don't electrocute (as long as they only contact one wire): https://www.youtube.com/watch?v=rtnmCf2QFTc.

The insulation application assembly 150 may include one or more coupler interfaces 160 for attachment to a drone 10 or to an insulated pole, such as an insulated telescoping pole. The coupler interface(s) 160 may allow for a drone 10 (or pole) to clamp onto the coupler interface 160 in a way similar to how robots or Caterpillar™ machines can swap end effectors with quick couplers. Caterpillar™ quick-couple options, such as accessed by this link https://www-.cat.com/en_US/products/new/attachments/couplers-excavator.html are herein incorporated by reference and provide some examples of coupler interfaces 160. Moreover, any of the previously described clamping, grasping, or docking techniques could be employed with the interface couplers 160 to connect the drone 10 (or pole) to the insulation application device 150. The coupler interface 160 can be "quick" as discussed; however, a "slow" coupler, such as one or more screw-type fasteners, could alternatively be employed.

The coupler interface(s) 160 may be completely mechanical, or the coupler interface(s) 160 may include couplers for any desirable communication wires, electrical conduits, or mechanical actuators. In one embodiment, the coupler interface 160 may include a narrow profile grip 162 with opposing grip surfaces 164. The grip 162 may be recessed into an upper region of a storage tank 154 (or other feature) such as shown, or the grip 162 may be formed externally to the storage tank 154 or other features at similar or different relative positions and orientations.

One will appreciate that the coupler interface 160 may take many other forms and may include shear-resistant features. The coupler interface(s) 160 may be relatively symmetrical or asymmetrical. If multiple coupler interfaces 160 are employed, they can be relatively identical or intentionally different. Multiple coupler interfaces 160 may include different coupler interfaces 160 for a pole and a drone 10.

The insulation storage 152 may include one or more storage tanks 154 or one or more rollers or reels 170 (FIG. 23) as later described. Thus, insulation material (or insulating material) may be carried as a fluid, such as a gas, liquid, or compressed liquid, in a tank 154; or, the insulation material may be carried as a film on a reel 170. The storage tank 154 may be configured to be cooled or heated. It may alternatively be configured to be pressurized and/or provide a hypoxic or anaerobic environment. Similarly, the reel 170 may be heated or cooled or it may be maintained in a chamber that is heated, cooled, hypoxic, or anaerobic.

The size of the tanks 154 or reels 170 may be partly determined by the ability of the drone 10 or human to properly lift and control when the tanks 154 or reels 170 are full. The size of the tanks 154 or reels 170 may be partly determined by the space between the wire to be coated and other obstructions, such as other wires, tree limbs, or other objects, such that the insulation storage 152 does not adversely affect the ability of the insulation application assembly 150 to access a single power line or rapidly deplete battery power to prevent a practical amount of insulation application.

In some embodiments, the insulation storage 152 is configured to hold sufficient insulation material to cover greater than or equal to than 10 meters of power line. In some embodiments, the insulation storage 152 is configured to hold sufficient insulation material to cover greater than or equal to than 20 meters of power line. In some embodiments, the insulation storage 152 is configured to hold sufficient insulation material to cover greater than or equal to than 30 meters of power line. In some embodiments, the insulation storage 152 is configured to hold sufficient insulation material to cover greater than or equal to than 50 meters of power line. In some embodiments, the insulation storage 152 is configured to hold sufficient insulation material to cover greater than or equal to than 75 meters of power line. In some embodiments, the insulation storage 152 is configured to hold sufficient insulation material to cover greater than or equal to than 100 meters of power line.

In some embodiments, the storage tank 154 is configured to hold greater than or equal to one liter. In some embodiments, the storage tank 154 is configured to hold greater than or equal to three liters. In some embodiments, the storage tank 154 is configured to hold greater than or equal to five liters. In some embodiments, the storage tank 154 is configured to hold greater than or equal to ten liters. In some embodiments, the storage tank 154 is configured to hold greater than or equal to 25 liters.

In some embodiments, the storage tank 154 may have a cylindrical shape; however, any suitable shape can be employed. The storage tank 154 may be configured with interior baffles, partitions, or other structures to dampen slosh or other movement of fluid within the tank 154 so as to minimize interference with drone control and drone positioning. Partitions may also be used to separate different ingredients that can be combined at the spray heads or at the surface of the power line from different spray heads.

In some embodiments, the storage reel 170 is configured to hold greater than or equal to than 10 lineal meters of film. In some embodiments, the storage reel 170 is configured to hold greater than or equal to than 20 lineal meters of film. In some embodiments, the storage reel 170 is configured to hold greater than or equal to than 30 lineal meters of film. In some embodiments, the storage reel 170 is configured to hold greater than or equal to than 50 lineal meters of film. In some embodiments, the storage reel 170 is configured to hold greater than or equal to than 75 lineal meters of film. In some embodiments, the storage reel 170 is configured to hold greater than or equal to than 100 lineal meters of film.

If an insulation project requires more fluid or film than can be carried by the insulation application assembly 150, the drone 10 or pole can be lowered for multiple refills of the tank 154 or the reel 170. Once applied, such as sprayed or rolled on, the insulation material can set or dry via evaporation, or the tank 152 or spray head (as later described) can be heated, and the insulation material may harden upon cooling.

Examples of insulating materials that may be applied include, but are not limited to, polymers, such as polymer films or Kevlar™, or such as conformal coatings for circuit boards, Electrical Insulating Sealer 1601-C or 1602-R made by 3M™, and Black Spray Liquid Tape by Gardner Bender. Conformal coating materials generally have base formulations of acrylic, polyurethane, copolymer (acrylate polyurethane), and/or silicone. Conformal coating materials may be selected by considering the environment in which the power lines will be operating.

Figure 20:
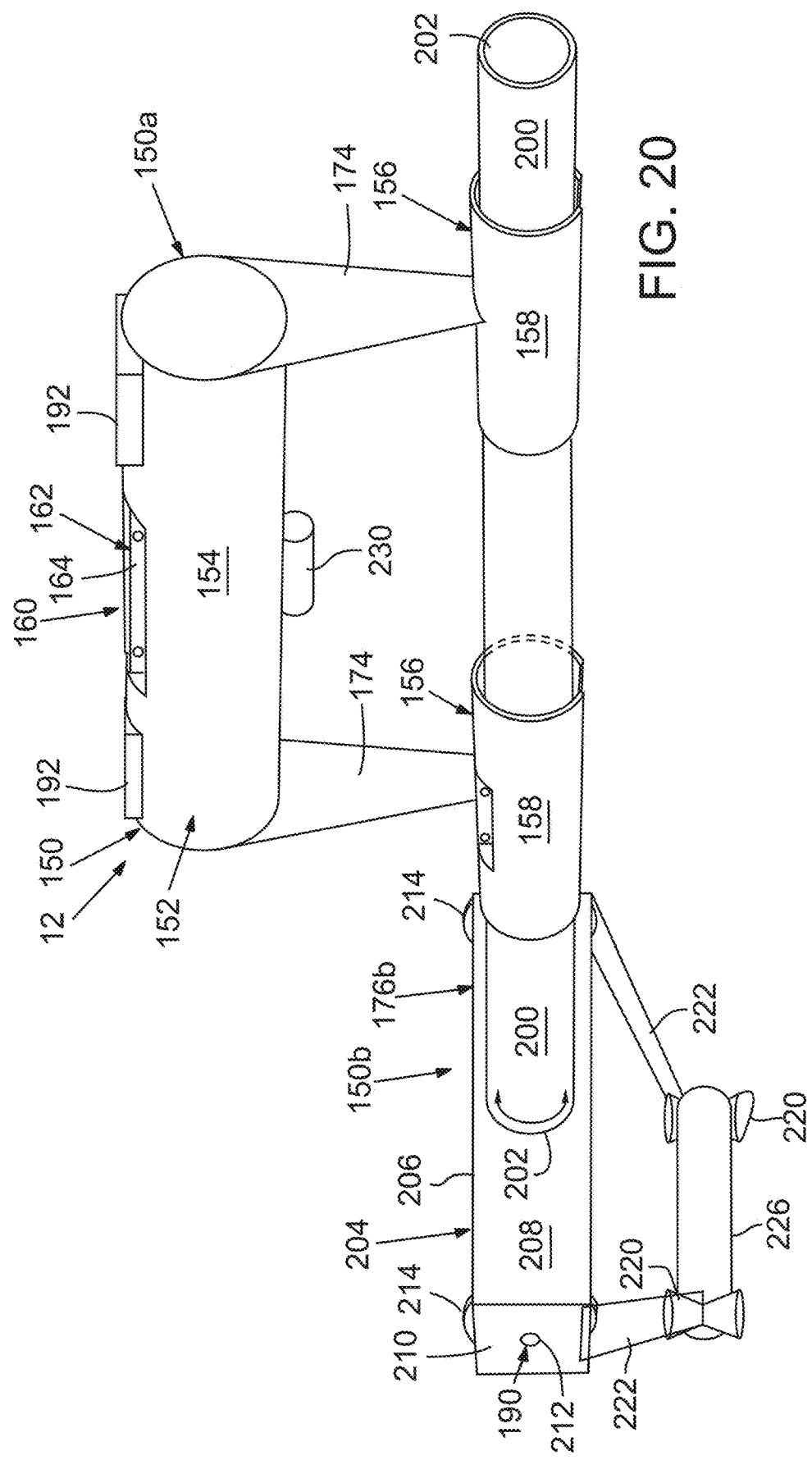
FIG. 20 is a side elevation view of an insulation application device of FIG. 19 employing the open-ended enclosure to support an optional roller dispenser mechanism.
Figure 21:
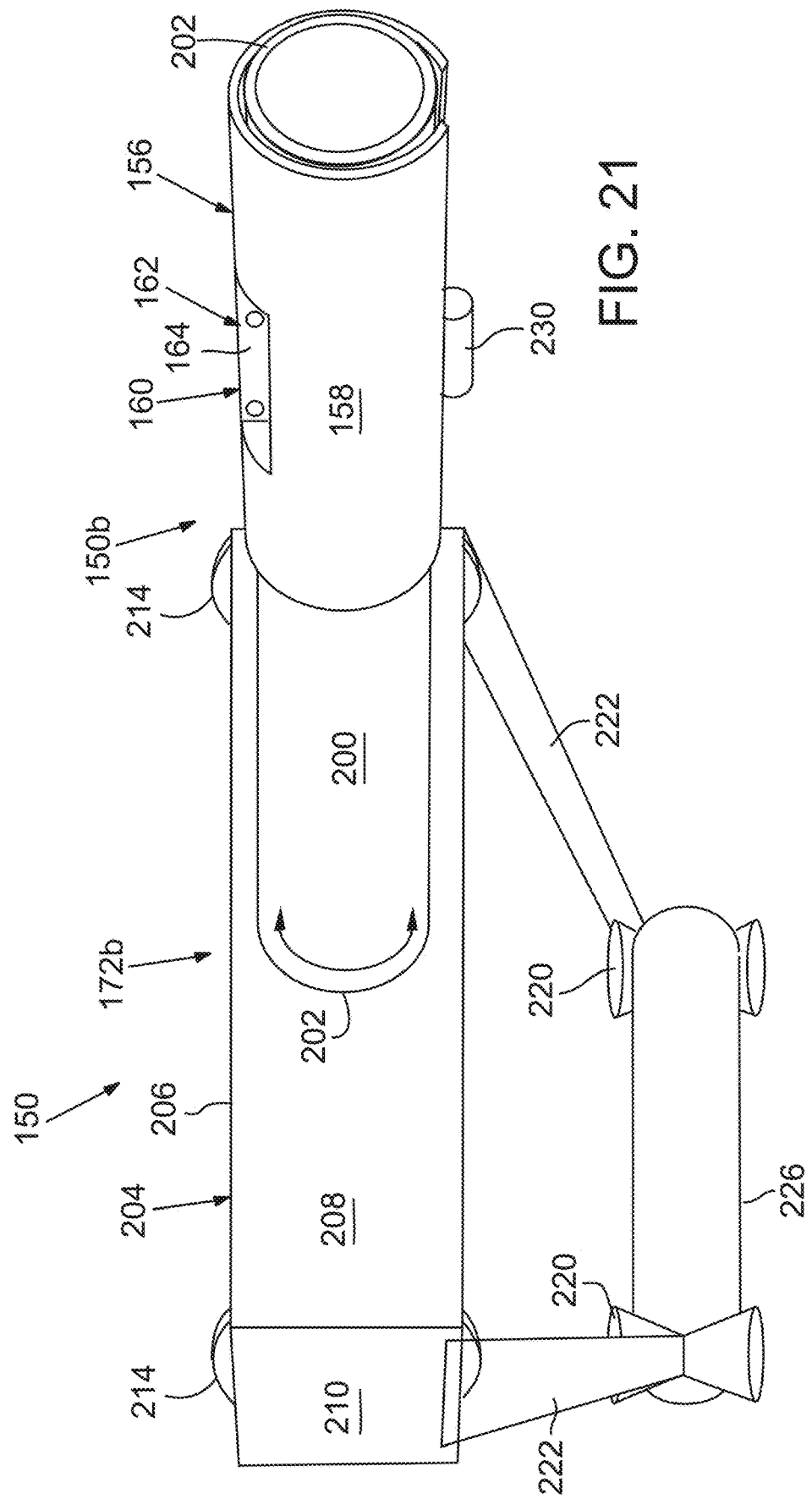
FIG. 21 is an isometric view of an insulation application assembly employing roller dispenser mechanism that can be employed without a storage tank.
Figure 22:
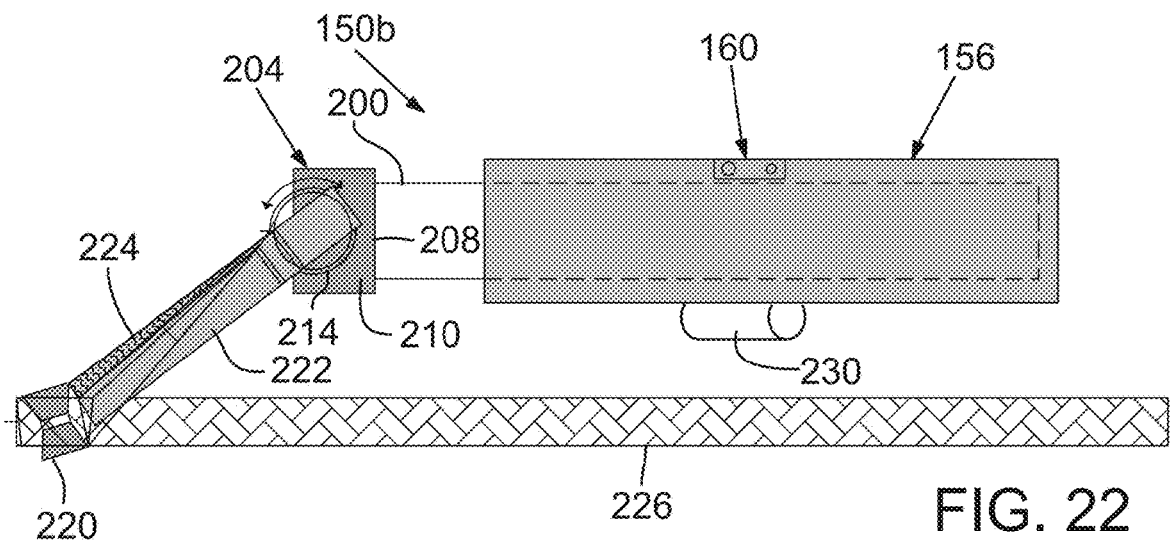
FIG. 22 is side view of an insulation application assembly employing roller dispenser mechanism that can be employed without a storage tank.
Figure 23:
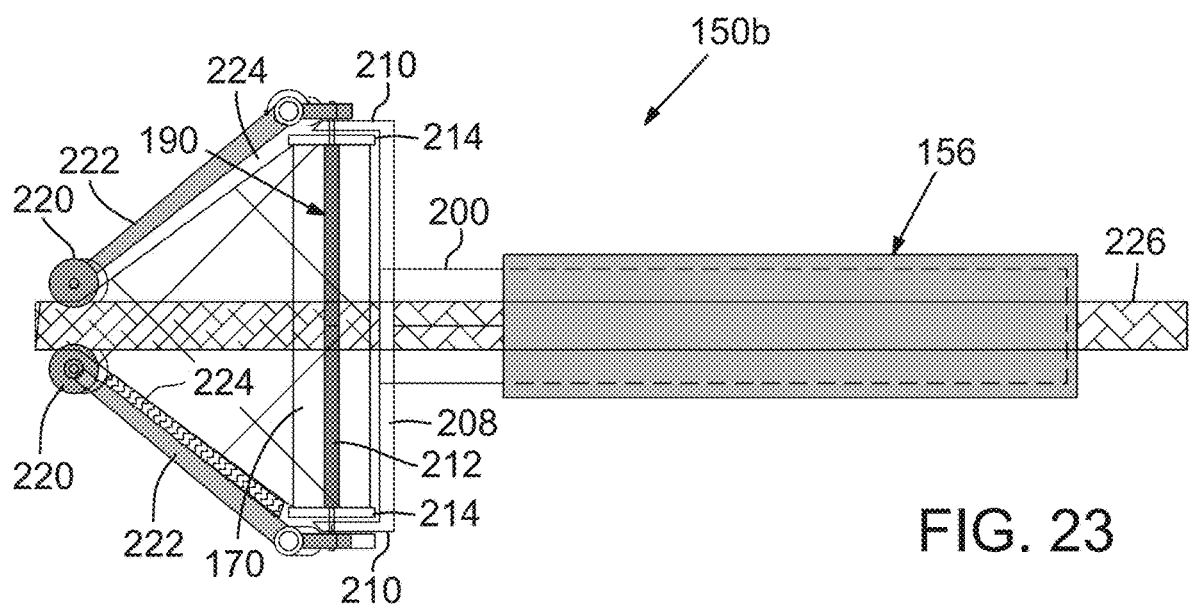
FIG. 23 is top plan view of an insulation application assembly employing roller dispenser mechanism that can be employed without a storage tank.
Figure 24:
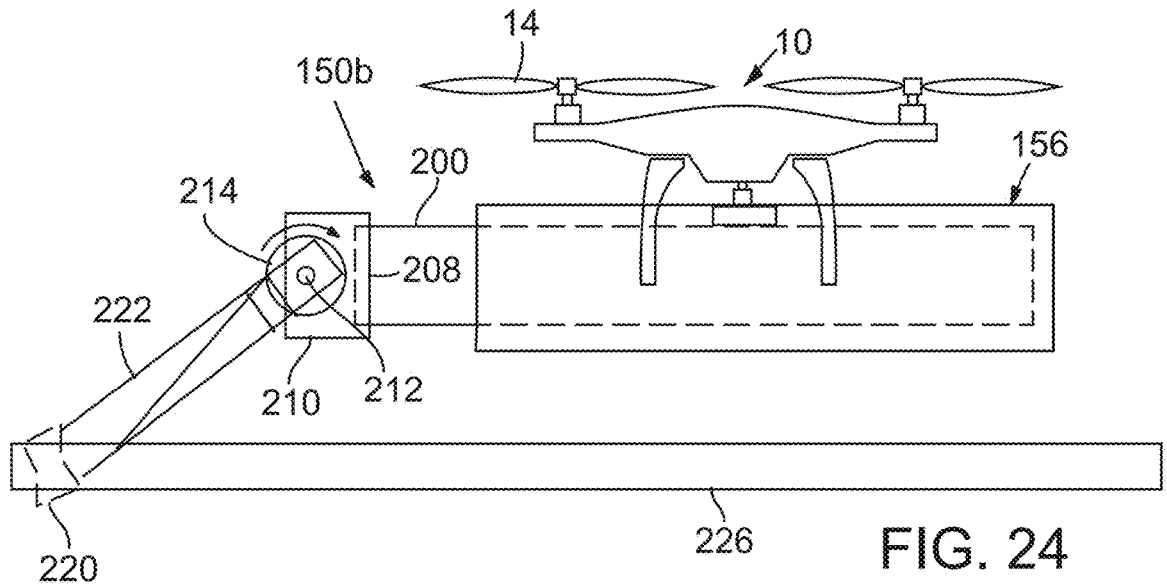
FIG. 24 is side view of a drone supporting the insulation application assembly of FIG. 22.
Figure 25:
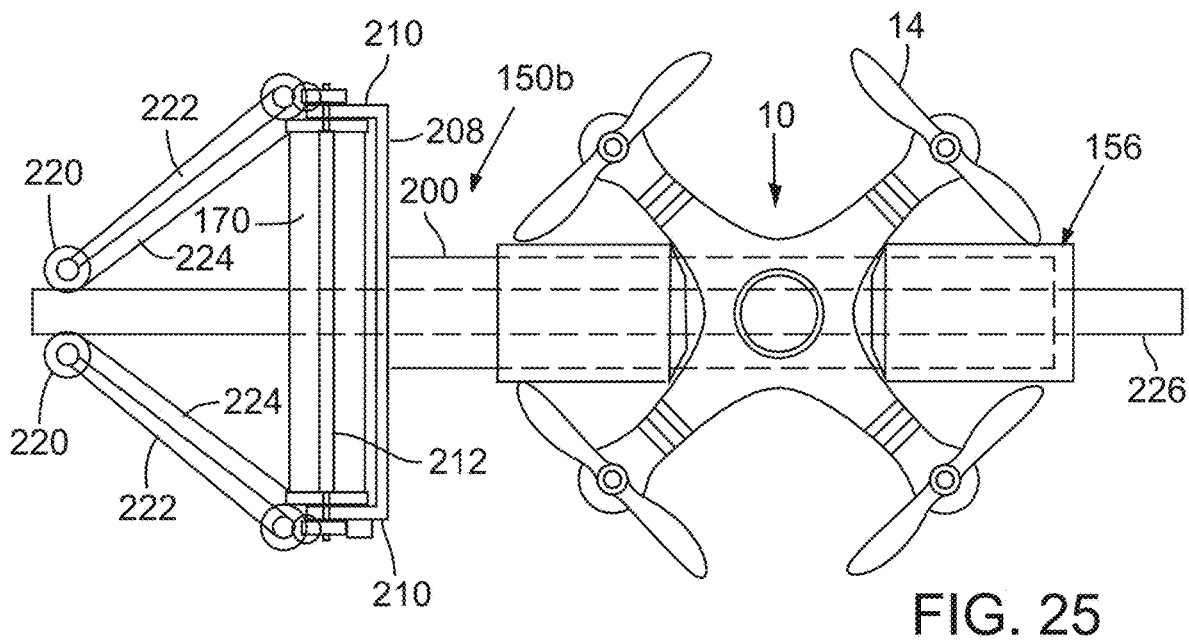
FIG. 25 is top plan view of a drone supporting the insulation application assembly of FIG. 23.

The insulation application assembly 150 may include one or more open-ended enclosures 156 that have opposing openings 166 at opposite ends 168 through which a power line extends when the cable covers 158 are in position for deploying a fluid insulation material. FIG. 19 shows an insulation application assembly 150 that supports open-ended enclosures 156 (in the form of cable covers 158 including a dispenser mechanism 172a) from struts 174 descending from a storage tank 154, and FIG. 20 shows an insulation application assembly 150 similar to that of FIG. 19 that employs open-ended enclosures 156 to support an alternative dispenser mechanism 172b. FIG. 21 shows an insulation application assembly 150 that may support dispenser mechanism 172b without a storage tank 154; FIG. 22 is side view of the insulation application assembly 150 of FIG. 21; FIG. 23 is top plan view of the insulation application assembly of 150 of FIG. 21; FIG. 24 is side view of a drone 10 supporting the insulation application assembly of 150 of FIG. 22; and FIG. 25 is top plan view of a drone 10 supporting the insulation application assembly of 150 of FIG. 23.

With reference to FIGS. 19 to 25, the open-ended enclosure 156 may be sized and shaped to partly or fully enclose a linear segment of a power line. The length 176 of an open-ended enclosure 156 may be any practical length dependent on a number of variables including, but not limited to, lifting capacity of a drone 10 or a human operator via a pole (in consideration of the distance and angle of lift, the weight of the insulation application assembly 150, and the strength of a human operator), the amount of insulation material (in terms of lineal coverage and/or weight) carried by the insulation application assembly 150, the battery life, the design and capabilities of the carrier drone 10, and the number of open-ended enclosures 156 deployed in the insulation application assembly 150.

The open-ended enclosure 156 may have a width 180 between opposing interior surfaces 182 that may be any practical width dependent on a number of variables including, but not limited to, the diameter(s) of the power lines that are the intended targets and the desirable spacing between the interior surfaces 182 and the power line. In particular, the desirable spacing between the interior surfaces 182 may be configured to account for spacer bearings or wheels or one or more insulation material applicators 188, such as spray heads, brushes, or spring-loaded ball rollers, for applying a fluid insulation material.

The desirable spacing between the interior surfaces 182, their cross-sectional shape, and the amount of enclosure may also be configured to provide even application of the insulation material on the power line. The shape and amount of enclosure may facilitate application techniques employing controlled temperature and/or pressure. The shape and amount of enclosure may also minimize or prevent the spread insulation material into the environment. The cross-sectional shape of the interior surface(s) may employ a partly concave, oval, partly oval, or partly elliptical, circular, semi-circular, partly circular shape, polygonal, or partly polygonal.

The open-ended enclosure 156 may include one or more structures configured to open and close like a clam shell. These structures may be attached to each other by a hinge or other mechanism, or they can be completely separated until they are coming into a closed position. Any conventional movement mechanism, such as piezo-electric devices or clamps previously discussed, may be employed to move one or more of the halves (or other fractions) of the open-ended enclosure 156. In some embodiments, these halves are configured to be semicircular cable covers 158. In embodiments where the open-ended enclosure 156 is configured to fully enclose a segment of power line, the opening and closing mechanism may be designed, in case of malfunction or as a default, to partly open so that the drone 10 or telescoping pole can flip the entire insulation application assembly 150 upside down to disengage it from the power line.

In some embodiments, the open-ended enclosure 156 may have a stationary longitudinal opening 184 sufficient to partly enclose the power line and allow the power line to enter and exit the open-ended enclosure 156. In some embodiments, the interior surface(s) may be configured to enclose greater than or equal to 10% of the circumference of the power line, to enclose greater than or equal to 20% of the circumference of the power line, to enclose greater than or equal to 30% of the circumference of the power line, to enclose greater than or equal to 40% of the circumference of the power line, to enclose greater than or equal to 50% of the circumference of the power line, to enclose greater than or equal to 60% of the circumference of the power line, to enclose greater than or equal to 70% of the circumference of the power line, or to enclose greater than or equal to 80% of the circumference of the power line.

In some embodiments, the interior surface(s) 182 may be configured to enclose greater than or equal to 10 degrees of the circumference of the power line, to enclose greater than or equal to 40 degrees of the circumference of the power line, to enclose greater than or equal to 90 degrees of the circumference of the power line, to enclose greater than or equal to 120 degrees of the circumference of the power line, to enclose greater than or equal to 150 degrees of the circumference of the power line, to enclose greater than or equal to 180 degrees of the circumference of the power line, to enclose greater than or equal to 210 degrees of the circumference of the power line, to enclose greater than or equal to 250 degrees of the circumference of the power line, to enclose greater than or equal to 280 degrees of the circumference of the power line, or to enclose greater than or equal to 310 degrees of the circumference of the power line.

The interior surface(s) 182 may include sensors and tools that engage the power line directly or at a close distance. Sensors of the open-ended enclosure 156 may include, but are not limited to contact sensors, wind speed sensors, temperature sensors, and moisture sensors. Some of these sensors may alternatively be positioned elsewhere on the insulation application assembly 150 or the drone 10 or the pole. The tools may include, but are not limited to heating elements, IR lights, UV lights, or any type of LEDs or lasers, other curing sources. Some of these tools may alternatively be positioned elsewhere on the insulation application assembly 150 or the drone 10 or the pole. Some of these sensors or tools may be protected behind a clear protective barrier.

An insulation material applicator 188 for applying fluids may include, but are not limited to spray heads, brushes, or rollers that may be mounted to the interior surface(s) 182 of the open-ended enclosure 156. An insulation material conveying mechanism 190 for applying fluids may employ a pump, such as a motorized pump 192. In one embodiment, spring-loaded ball rollers, nested inside each open-ended enclosure 156 in the form of a semicircular applicator collar, may be located forward of spray-head nozzles (closest to the power line), and just after UV sources.

With reference again to FIGS. 19 to 25, a fluid-based insulation application assembly 150a such as shown in FIG. 19 can carry, as an attachment, an additional insulation application assembly 150, such as a film-based insulation application assembly 150b. With reference to FIG. 20 in particular, the open-ended enclosure(s) 156 may support a shaft 200 instead of enclosing a segment of a power line. The shaft 200 may have a cross-sectional shape that matches the cross-sectional shape of the interior surface(s) 182. In some embodiments, the shaft 200 has a circular cross-section so that the shaft 200 can be rotated within the open-ended enclosure(s) 156; however, the shaft 200 (and interior surfaces 182) may intentionally be configured with cross-sectional shapes that prevent rotation of the shaft 200. The shaft 200 may be solid or hollow; however, a strong, hollow, light weight material may be preferred for some embodiments.

The shaft 200 may be supported by a single open-ended enclosure 156 or by multiple open-ended enclosures 156. At least one end 202 of the shaft 200 may be directly connected to roller dispenser mechanism 172b that may include a reel holder 204. In some embodiments, both ends 202 of the shaft 200 each support roller dispenser mechanism 172b. The reel holder 204 may be directly or indirectly attached to the shaft 200 in a manner (such as rotatably mounted) that permits the reel holder 204 to be rotated around the end of the shaft 200. The rotatable connection may permit rotation in either direction, or the rotatable connection may permit rotation in only a single direction. However, if the shaft 200 is itself capable of rotation within the open-ended enclosures 156, then the reel holder 204 may be connected to the shaft 200 in a manner such that they do not move with respect to each other.

The reel holder 204 may have a frame 206 that may include a back panel 208 and two side panels 210. The frame 206 may be relatively open at the front, bottom, and/or top; however, the frame 206 may be configured to almost completely enclose the storage reel 170, such as having only a feed slot for the dispensing the insulating film.

The storage reel 170 may include an axle 212 that may be affixed to the reel 170 and may rotate with reel 170. However, the storage reel 170 may rotate freely about the axle 212 which can be replaceably secured into the frame 206 of the reel holder 204. The axle 212 may protrude through the side panels 210 or connected directly or indirectly to their interior surfaces. The storage reel 170 may be connected to rims 214 at its sides. Movement of the storage reel 170 may be created by rotation of the axle 212 or rotation of the rims 214, either one of which may be independently powered. However, they may not be equipped for independent movement as the drone 10 or a pole may provide the force for moving the axle 212 or the rims 214. For convenience, the axle 212 or the rims may be considered to be a conveying mechanism 190.

The frame 206 of the reel holder 204 may additionally support one or more guide rollers 220 that may be suspended by spring-loaded brackets 222 or equivalent support mechanisms that may employ retention springs 224. The guide rollers 222 may function to maintain the reel holder 204 of the insulation application assembly 150b at a desirable position for dispensing insulating film. The guide rollers 222 may also function to press or secure the insulating film to a segment of power line 226. For convenience, the guide rollers 222 may be considered to be insulation material applicators. One will appreciate that the motion of the drone 10 or pole may also be used to facilitate application of insulation material. In particular, the linear speed of the drone 10 may be adjusted to cooperate with the properties of the insulation material, its application parameters, and ambient conditions. In some embodiments, the drone 10 may be employed to partly or completely rotate around the power line.

The dispenser mechanism 172b may be configured to move only in a single direction such as the direction toward the open-ended enclosure 156. One will appreciate, however, that the dispenser mechanism 172b can be configured to move in the direction away from the open-ended enclosure 156, or the dispenser mechanism 172b can be configured to move bi-directionally.

If the insulation application assembly 150 includes more than one open-ended enclosure 156, then the dispenser mechanisms 172 supported by both can be employed to apply insulation material simultaneously. One will also appreciate that the dispenser mechanisms 172 supported by multiple open-ended enclosures 156 may apply different insulation materials or different aspects of the insulation materials sequentially. For example, a first dispenser mechanisms 172 supported by a first open-ended enclosure 156 may apply an insulation material and a second dispenser mechanisms 172 supported by a second open-ended enclosure 156 may apply an overcoating laying or a curing agent, or a first the dispenser mechanism 172 may apply an insulation material film and a second the dispenser mechanisms 172 may apply an overcoating film.

One will further appreciate that if the insulation application assembly 150 includes more than one open-ended enclosure 156, their dispenser mechanisms 172 can be employed only one at time. The insulation storage 152 may hold the same insulation material for each of the dispenser mechanisms 172 and hold the second dispenser mechanism 172 in reserve, such as in case of malfunction of a first the dispenser mechanism 172. However, the insulation storage 152 may hold different insulation materials for each of the dispenser mechanisms 172. For example, different insulation materials may be employed under different ambient conditions.

The insulation application assembly 150 may also include a controller board, a wired and/or wireless communication network or port, indicators, and/or a direct or indirect human machine interface (HMI). The capabilities of these features are previously described with respect to the drone 10. Some or all of these may be embodied on the drone 10 or pole or may be paired with cooperative elements on the drone 10 or pole. If a drone 10 is used, communication may employ via a wireless communication module, or wired via a contact that touches via the quick coupler.

A battery 230 for the insulation application assembly 150 may be provided. The battery 230 may be installed at the bottom of the storage 152, storage tank 154, or open-ended enclosure 156 for weight stability, such as when the tank 154 is empty. The battery 230 may be replaced or charged while the tank 154 is empty or contains insulating materials. The battery 230 for the insulation application assembly 150 may be distinct from the drone battery or may be connected to it. Moreover, the battery 230 for the insulation application assembly 230 may be charged in any manner that the drone 10 may be charged as previously described, or the battery 230 for the insulation application assembly 250 may be charged in a different manner. Furthermore, the drone 10 may employ structures of the insulation application assembly 150 to charge the drone battery from the power lines 226 before applying insulation material to the power lines 226.

The insulation application assemblies 150a and 150b may have their have their own batteries 230 and controller boards, so these assemblies 150 can be activated manually and/or remotely by a user. The user can indicate via a user interface (laser, lidar, and/or camera with hand/verbal commands) the power line 226 to be insulated, and the start and end points of that segment of the power line 226 to be insulated. One or more control algorithm may plan out a viable point path along the power line 226 that avoids obstacles. The control algorithm(s) may shorten the desired insulation length due to inability to apply the insulation safely along the entire desired segment. If the user has both types of carriers (a pole and a drone 10), the algorithm(s) may suggest which carrier and which type of insulation application assembly 150a or 150b is the best approach for greater or safer coverage.

The telescoping pole or drone 10 may quick couple with the appropriate type of insulation application assembly 150 when insulation application assembly 150 and the carrier are brought into close physical proximity. If a pole is used as the carrier, the user may manually manipulate the assembly 150 to where the visual indicators (LED, sound, etc) direct it to be taken. If a drone 10 is used as the carrier, the drone 10 flies the assembly to where the flight control algorithm directs it.

The application of insulation material that is stored as a fluid may entail different steps than the application of insulation material that is stored as a film. With regard to the application of fluid insulation material, the carrier in cooperation with the insulation application assembly 150a may orient itself so that the storage tank 154 is above the power line 266 near the start via point. The carrier the positions the open-ended enclosure(s) 156 to partly surround the power line 266, making physical contact with spring-loaded ball rollers, for example. If the open-ended enclosures 156 are configured to open and close, they may close upon the power line segment possibly fully surrounding it.

After the open-ended enclosures 156 are optimally positioned and engaged, the conveying mechanism 190 (pump 192) directs insulation material to the applicators (spray heads) to spray the insulation material onto the segment of power line 266 surrounded by the open-ended enclosure 156. The carrier may move (or rotate) the open-ended enclosure 156 from side to side to allow perpendicular pressure to be applied across as much of the power line segment as possible as the insulation is sprayed and optionally cured (such as with UV light or heat). The amount of rotation or other movement may be dependent upon the flow characteristics of the insulation material, environmental conditions at the time, and potential obstacles at any given via point.

The carrier moves the insulation application assembly 150a along the power line 226 at a rate, as modified to suit ambient conditions, that allows the insulation to stick to the power line 226 permanently. Regardless of how insulated all of the equipment is, every precaution should be taken to avoid creating a path to ground, or a path to a power line with lower or higher voltage. Once the desired length of the power line 226 is insulated, the carrier can move the insulation application assembly 150a can move onto the next section of the power line 226, or the carrier can return with the assembly 150a to a ground or other landing location close to the user for spray head cleaning and/or tank refilling, and/or for other maintenance, such as recharging the drone 10 or the battery 230 or cleaning the spray heads to avoid clogging and/or uneven dispensing.

With regard to the application of insulation material stored as film, the carrier in cooperation with the insulation application assembly 150b may orient itself so that it is above the power line 266 near the start via point. The reel 170 may feed the film via actuators or springs to the guide rollers 220 that lower the insulator film onto the power line 226.

The guide rollers 220 may increase the pressure on the dispensing film and may also optionally increase the intensity of UV curing, until the film remains affixed to the power line 226. The reel holder 204 may optionally rotate to more evenly apply perpendicular pressure and UV lighting to insulating film as it is applied to the power line 226. The carrier moves the insulation application assembly 150b along the power line 226 at a rate, as modified to suit ambient conditions, that allows the insulation to stick to the power line 226 permanently.

Once the desired length of the power line 226 is insulated, the carrier can move the insulation application assembly 150a can move onto the next section of the power line 226, or the carrier can return with the assembly 150a to a ground or other landing location close to the user for replacement of the film reel 170 and/or for other maintenance, such as recharging the drone 10 or the battery 230.

As previously noted, the heating, UV lighting, and/or other curing sources may be employed to help cure or solidify the insulating material. These sources may be mounted inside of the open-ended enclosure, outside the open-ended enclosure, or on the guide rollers 220, and/or on the real holder 204, depending on the type of the insulation application assembly 150.

Also as previously noted, sensors may be employed to provide feedback to an optimization control algorithm, which may decide the rate of dispense, temperature, UV intensity, pressure applied, feed speed, and/or other parameters. These sensors may be positioned inside of the open-ended enclosure, outside the open-ended enclosure, or on the guide rollers 220, on the real holder 204, and/or on the drone 10 or the pole, depending on the type of the insulation application assembly 150. These sensors may include any conventional sensors, such as those previously described with respect to the drone 10. These sensors may interact with one or more sensors, such as wind speed and/or direction sensors, on the drone 10, or the sensors of the insulation application assembly 150 may be completely independent.

If a drone 10 is used, a feed speed command may be sent directly to a drone 10 to fly in a manner that approximates the commanded trajectory vector, which is in 3D space. Given real world disturbances, a neural network-based controller may be useful for this application. The controller for this attachment can do all of these calculations, sending direct position and rotation commands to the drone 10. The sensor(s) and/or controller(s) of insulation application assembly 150 may communicate with a trainable artificial intelligence (AI) system, such as previously described. The software of the insulation application assembly may be distinct from that of the drone 10, may be independent from that of the drone 10, or may be partly integrated with that of the drone 10.

If a telescoping pole is used, the control module can display, via LEDs/sound, which way and how quickly, the human needs to direct the pole for the best application results. The HMI may employ any conventional type of HMI or any type of HMI previously described, such as a mobile phone.

Lidar or a camera may be used to initially confirm alignment with the power line 226, aid in obstacle detection, and find items that might be interfering with insulation application. The lidar or camera may procure active distance measurements as well. These measurements can utilize structural features or points on the insulation application assembly 150, or measurement points may be indicated by a laser, which point is read by a camera, and the locations may be stored in a simplified 3D representation of the real world. See previous description and https://pubmed.ncbi.nlm.nih.gov/29047928/; https://shop.leica-geosystems.com/blog/7-questions-ask-you-buy-laser-distance-meter-ldm; and https://blog.hexagongeosystems.com/7-key-questions-to-help-you-choose-a-laser-scanning-solution/for examples. Lidar or camera control algorithms may be incorporated with their hardware or may be located on the controller board or in the drone software.

Users may make via point decisions as to which power lines 226 are to be coated, and the start and end points along these power lines 226. These can be directed by physically moving the drone or pole to these via points, or they can be indicated by a laser, which is read by a camera, and the locations are stored in a simplified 3D representation of the real word. A supervisory algorithm may arbitrate signals given by the various algorithms, and any human user input, to decide which final actions are executed. The HMI may employ any conventional type of HMI or any type of HMI previously described, such as a mobile phone. The HMI may include an actual or virtual button that can be depressed to interrupt, resume, or completely stop any operation.

The structural components of the insulation application assembly may be made of lightweight, well-insulated or nonconductor material. Many of the components may be manufactured by molding or made from a 3D printer-friendly resin with electrically insulating properties—typical of most thermoplastics. The entire insulation application assembly 150 may be readily scalable to the size and spacing of the power lines 266 for a given locale. A spreadsheet or other user interface can be used to input typical expected dimensions, and the assembly 150 can be scaled to best suit, with constraints of controller board, quick coupler, batteries, and other off-the-shelf components limiting the minimum size allowed. Larger diameters of power lines 266, with more generous line spacing, and fewer close proximity obstacles, can accommodate a larger assembly 150, with more raw material on board.

An operator may employ wearable sensors for better exact remote control of drone and/or end effector on the pole that is connected to the insulation application assembly. Alternatively, the insulation application assembly may be configured to provide light displays, such as coded color displays from the tank 154 that indicate conditions, such as based on aspects of what is happening above on the power line 266, such as actively applying insulation, starting to sense excessive voltage jumping anywhere in the system, that might signal to others a risk to the operator or others. The wearable sensors may be made from or embedded within a piezoelectric mesh such as described with respect to U.S. patent application Ser. No. 16/837,071, filed Apr. 1, 2020, for Piezoelectric Adaptive Mesh, which is herein incorporated by reference. One will also appreciate that the insulation application assembly 150 may be configured to be deployed from a pole, such as a ground-based pole, instead of from a drone 10 or as well as from a drone 10.

CONCLUSION

The terms and descriptions used above are set forth by way of illustration and example only and are not meant as limitations. Those skilled in the art will recognize that many variations, enhancements and modifications of the concepts described herein are possible without departing from the underlying principles of the invention. For example, skilled persons will appreciate that the subject matter of any sentence or paragraph can be combined with subject matter of some or all of the other sentences or paragraphs, except where such combinations are mutually exclusive.

The scope of the invention should therefore be determined only by the following claims, claims presented in a continuation patent application, and equivalents to the foregoing claims.

The invention claimed is:

1. An insulation application assembly configured for applying insulation to a power line, comprising:
    an open-ended enclosure configured or configurable to partly or fully enclose a segment of the power line, wherein the open-ended enclosure has an interior surface;
    one or more sensors or tools connected directly or indirectly to the open-ended enclosure;

an insulation material applicator connected directly or indirectly to the interior surface of the open-ended enclosure;
insulation storage configured for storing insulation material;
an insulation material conveying mechanism configured for causing the insulation material to move from the insulation storage to the insulation material applicator;
a communication port or network configured for conveying sensor information directly or indirectly from one or more of the sensors, for conveying instructions directly or indirectly to the insulation material conveying mechanism or the insulation material applicator, or for both conveying sensor information directly or indirectly from one or more of the sensors and for conveying instructions directly or indirectly to the insulation material conveying mechanism or the insulation material applicator; and
an energy conveyance mechanism configured for conveying energy to the insulation material conveying mechanism and/or the insulation material applicator.

2. The insulation application assembly of claim 1, wherein the interior surface is partly concave, partly oval, partly elliptical, or partly circular.

3. The insulation application assembly of claim 1, wherein the one or more sensors comprise one or more of a pressure sensor, an optical sensor, a camera, a lidar mechanism, a wind speed sensor, and a wind direction sensor.

4. The insulation application assembly of claim 1, wherein the one or more sensors or tools are connected directly or indirectly to the interior surface of the open-ended enclosure.

5. The insulation application assembly of claim 1, wherein the insulation material applicator comprises a spray head or spray nozzle.

6. The insulation application assembly of claim 1, wherein the insulation material applicator comprises a roller.

7. The insulation application assembly of claim 1, wherein the insulation material applicator comprises a drone movement controller.

8. The insulation application assembly of claim 1, wherein the insulation material applicator comprises an open-ended enclosure actuator.

9. The insulation application assembly of claim 1, wherein the insulation storage comprises a storage tank that is configured for storing pressurized fluid insulation material.

10. The insulation application assembly of claim 1, wherein the insulation storage is configured for providing heated insulation material.

11. The insulation application assembly of claim 1, wherein the insulation material conveying mechanism comprises a roller.

12. The insulation application assembly of claim 1, wherein the insulation material conveying mechanism comprises a pump.

13. The insulation application assembly of claim 1, wherein the insulation material conveying mechanism comprises a piezoelectric device.

14. The insulation application assembly of claim 1, wherein the communication port comprises a wire or wire connector.

15. The insulation application assembly of claim 1, wherein the communication port comprises a wireless communication system.

16. The insulation application assembly of claim 1, wherein the energy conveyance mechanism comprises a wire.

17. The insulation application assembly of claim 1, wherein the energy conveyance mechanism is connected directly or indirectly to an energy storage system that is connected directly or indirectly to the storage tank.

18. The insulation application assembly of claim 1, further comprising an attachment interface configured for directly or indirectly attaching the insulation application assembly to a positioning device.

19. The insulation application assembly of claim 18, wherein the positioning device is a pole.

20. The insulation application assembly of claim 18, wherein the positioning device is a drone.

21. The insulation application assembly of claim 18, wherein the attachment interface comprises an energy connector configured for connecting the energy conveyance mechanism to an energy storage system and/or wherein the attachment interface comprises a communication port connector configured for connecting the communication network or port to a software processing system.

22. The insulation application assembly of claim 18, wherein the attachment interface comprises a controller connector configured for connecting the insulation material conveying mechanism or the insulation material applicator to one or more controllers.

23. The insulation application assembly of claim 1, wherein the power line comprises an established power line.

24. The insulation application assembly of claim 1, wherein the open-ended enclosure includes two relatively moveable halves.

25. The insulation application assembly of claim 1, wherein the power line has a circumference, and wherein the interior surface is configured to enclose greater than or equal to 5% of the circumference.

26. The insulation application assembly of claim 1, wherein the power line has a circumference, and wherein the interior surface is configured to enclose greater than or equal to 30% of the circumference of the power line.

27. The insulation application assembly of claim 1, wherein the power line has a circumference, and wherein the interior surface is configured to enclose greater than or equal to 70% of the circumference of the power line.

28. The insulation application assembly of claim 1, wherein the power line has a circumference, and wherein the interior surface is configured to enclose greater than or equal to 180 degrees of the circumference.

29. The insulation application assembly of claim 1, wherein the power line has a circumference, and wherein the interior surface is configured to enclose greater than or equal to 270 degrees of the circumference.

30. The insulation application assembly of claim 1, further comprising:
an on-board charge-receiving system configured to directly or indirectly connect with an external charging station operable to provide energy; and
an energy storage system directly or indirectly connected to or connectable to the on-board charge-receiving system, wherein the energy storage system is configured to store energy provided by the external charging system.

31. The insulation application assembly of claim 1, further comprising drone components, including:
multiple sensors or actuators;
a wireless communication system;

an on-board charge-receiving system configured to directly or indirectly connect with an external charging station operable to provide energy;

an energy storage system directly or indirectly connected or connectable to the on-board charge-receiving system, wherein the energy storage system is configured to store energy provided by the external charging system; and a flight mechanism powered by the energy storage system.

32. The insulation application assembly of claim 1, wherein the power line has a circumference, wherein the interior surface is configured to enclose greater than or equal to 50% of the circumference of the power line, wherein the one or more sensors or tools are connected directly or indirectly to the interior surface of the open-ended enclosure, wherein the insulation material applicator comprises a spray head or spray nozzle, wherein the insulation storage comprises a storage tank, and wherein the insulation material conveying mechanism comprises a pump.

33. A drone comprising:
multiple sensors or actuators;
a wireless communication system;
an on-board charge-receiving system configured to directly or indirectly connect with an external charging station operable to provide energy;
an energy storage system directly or indirectly connected or connectable to the on-board charge-receiving system, wherein the energy storage system is configured to store energy provided by the external charging system;
a flight mechanism powered by the energy storage system; and
an insulation application assembly configured for applying insulation to a power line, wherein insulation application assembly comprises: an open-ended enclosure configured or configurable to partly or fully enclose a segment of the power line, wherein the open-ended enclosure has an interior surface; one or more sensors or tools connected directly or indirectly to the open-ended enclosure; an insulation material applicator connected directly or indirectly to the interior surface of the open-ended enclosure; insulation storage that is configured for storing insulation material; an insulation material conveying mechanism configured for causing the insulation material to move from the insulation storage to the insulation material applicator; a communication network or port configured for conveying sensor information directly or indirectly from one or more of the sensors, for conveying instructions directly or indirectly to the insulation material conveying mechanism or the insulation material applicator, or for both conveying sensor information directly or indirectly from one or more of the sensors and for conveying instructions directly or indirectly to the insulation material conveying mechanism or the insulation material applicator; and an energy conveyance mechanism configured for conveying energy to the insulation material conveying mechanism and/or the insulation material applicator.

34. A method for insulating a segment of an established power line, comprising:
positioning an open-ended enclosure of an insulation application assembly around the segment of the power line, wherein the open-ended enclosure has opposing interior cover surfaces that are spaced apart from and partly surround the power line;
applying an insulation material, from one or more insulation material applicators positioned in proximity to the interior surfaces of the open-ended enclosure, to the segment of the power line; and
displacing the insulation application assembly away from the power line.

35. The method of claim 34, wherein positioning the open-ended enclosure of the insulation application assembly around the segment of the power line employs a pole.

36. The method of claim 34, wherein positioning the open-ended enclosure of the insulation application assembly around the segment of the power line employs a drone.

37. The method of claim 34, wherein the insulation material applicator comprises a spray head or spray nozzle.

38. The method of claim 34, wherein the insulation material applicator comprises a roller.

39. The method of claim 34, wherein the insulation material applicator comprises a drone movement controller.

40. The method of claim 34, wherein the insulation material applicator comprises an open-ended enclosure actuator.

41. The method of claim 34, employing one or more of a pressure sensor, an optical sensor, a camera, a lidar mechanism, a wind speed sensor, and a wind direction sensor to facilitate the steps of positioning, applying, or displacing.

42. The drone of claim 33, wherein the multiple sensors comprise one or more of a pressure sensor, an optical sensor, a camera, a lidar mechanism, a wind speed sensor, and a wind direction sensor.

* * * * *